US011579080B2

(12) United States Patent
Arbore et al.

(10) Patent No.: US 11,579,080 B2
(45) Date of Patent: Feb. 14, 2023

(54) RESOLVE PATH OPTICAL SAMPLING ARCHITECTURES

(71) Applicant: Apple Inc., Cupertino, CA (US)

(72) Inventors: Mark Alan Arbore, Los Altos, CA (US); Matthew A. Terrel, Campbell, CA (US); Jason Pele, Sunnyvale, CA (US)

(*) Notice: Subject to any disclaimer, the term of this patent is extended or adjusted under 35 U.S.C. 154(b) by 0 days.

(21) Appl. No.: 16/650,804

(22) PCT Filed: Sep. 27, 2018

(86) PCT No.: PCT/US2018/053237
§ 371 (c)(1),
(2) Date: Mar. 25, 2020

(87) PCT Pub. No.: WO2019/067796
PCT Pub. Date: Apr. 4, 2019

(65) Prior Publication Data
US 2021/0199576 A1 Jul. 1, 2021

Related U.S. Application Data

(60) Provisional application No. 62/565,789, filed on Sep. 29, 2017.

(51) Int. Cl.
*G01N 21/49* (2006.01)
*G01N 21/47* (2006.01)

(52) U.S. Cl.
CPC ..... *G01N 21/49* (2013.01); *G01N 2021/4711* (2013.01); *G01N 2201/066* (2013.01); *G01N 2201/068* (2013.01)

(58) Field of Classification Search
CPC .......... G01N 21/49; G01N 2021/4711; G01N 2201/068; G01N 2201/066
See application file for complete search history.

(56) References Cited

U.S. PATENT DOCUMENTS 3,805,074 A 4/1974 McCormack
3,861,788 A 1/1975 Webster
(Continued)

FOREIGN PATENT DOCUMENTS

CN 101199413 6/2008
CN 101622566 1/2010
(Continued)

OTHER PUBLICATIONS

Aguirre, Aaron D., et al. "High speed optical coherence microscopy with autofocus adjustment and a miniaturized endoscopic imaging probe." Optics express 18.5 (2010): 4222-4239. (Year: 2010).*
(Continued)

*Primary Examiner* — Dominic J Bologna
(74) *Attorney, Agent, or Firm* — Brownstein Hyatt Farber Schreck, LLP

(57) ABSTRACT

Described here are optical sampling architectures and methods for operation thereof. An optical sampling architecture can be capable of emitting a launch sheet light beam towards a launch region and receiving a detection sheet light beam from a detection region. The launch region can have one dimension that is elongated relative to another dimension. The detection region can also have one dimension elongated relative to another dimension such that the system can selectively accept light having one or more properties (e.g., angle of incidence, beam size, beam shape, etc.). In some examples, the elongated dimension of the detection region can be greater than the elongated dimension of the launch region. In some examples, the system can include an outcoupler array and associated components for creating a launch sheet light beam having light rays with different in-plane launch positions and/or in-plane launch angles.

12 Claims, 33 Drawing Sheets

(56) References Cited

U.S. PATENT DOCUMENTS

| | | |
|---|---|---|
| 4,082,464 A | 4/1978 | Johnson, Jr. |
| 4,236,076 A | 11/1980 | Judge |
| 4,260,263 A | 4/1981 | Kummer |
| 4,286,327 A | 8/1981 | Rosenthal |
| 4,300,167 A | 11/1981 | Miller |
| 4,810,077 A | 3/1989 | Sting |
| 4,956,796 A | 9/1990 | Rogers |
| 4,975,581 A | 12/1990 | Robinson |
| 5,220,403 A | 6/1993 | Batchelder |
| 5,287,376 A | 2/1994 | Paoli |
| 5,430,787 A | 7/1995 | Norton |
| 5,475,235 A | 12/1995 | Phillips |
| 5,483,261 A | 1/1996 | Yasutake |
| 5,488,204 A | 1/1996 | Mead et al. |
| 5,488,678 A | 1/1996 | Taneya |
| 5,644,667 A | 7/1997 | Tabuchi |
| 5,652,654 A | 7/1997 | Asimopoulos |
| 5,737,078 A | 4/1998 | Takarada |
| 5,742,631 A | 4/1998 | Paoli |
| 5,818,629 A | 10/1998 | Kinoshita |
| 5,825,352 A | 10/1998 | Bisset et al. |
| 5,835,079 A | 11/1998 | Shieh |
| 5,880,411 A | 3/1999 | Gillespie et al. |
| 5,936,739 A | 8/1999 | Cameron |
| 6,048,755 A | 4/2000 | Jiang |
| 6,122,042 A * | 9/2000 | Wunderman ............ A61B 1/05 356/343 |
| 6,188,391 B1 | 2/2001 | Seely et al. |
| 6,198,531 B1 | 3/2001 | Nielsen |
| 6,236,459 B1 | 5/2001 | Negahdaripour |
| 6,248,988 B1 | 6/2001 | Krantz |
| 6,310,610 B1 | 10/2001 | Beaton et al. |
| 6,323,846 B1 | 11/2001 | Westerman et al. |
| 6,330,378 B1 | 12/2001 | Forrest |
| 6,393,185 B1 | 5/2002 | Deacon |
| 6,424,416 B1 | 7/2002 | Gross et al. |
| 6,519,033 B1 | 2/2003 | Quist |
| 6,594,409 B2 | 7/2003 | Dutt et al. |
| 6,628,686 B1 | 9/2003 | Sargent |
| 6,657,723 B2 | 12/2003 | Cohen |
| 6,690,387 B2 | 2/2004 | Zimmerman et al. |
| 6,795,622 B2 | 9/2004 | Forrest |
| 6,826,424 B1 | 11/2004 | Zeng et al. |
| 6,844,554 B2 | 1/2005 | Karlsson |
| 6,892,449 B1 | 5/2005 | Brophy et al. |
| 6,940,182 B2 | 9/2005 | Hilton et al. |
| 6,947,639 B2 | 9/2005 | Singh |
| 6,952,504 B2 | 10/2005 | Bi |
| 6,987,906 B2 | 1/2006 | Nakama et al. |
| 7,015,894 B2 | 3/2006 | Morohoshi |
| 7,054,517 B2 | 5/2006 | Mossberg |
| 7,058,245 B2 | 6/2006 | Farahi |
| 7,079,715 B2 | 7/2006 | Kish |
| 7,129,508 B2 | 10/2006 | Chen |
| 7,184,064 B2 | 2/2007 | Zimmerman et al. |
| 7,203,401 B2 | 4/2007 | Mossberg |
| 7,203,426 B2 | 4/2007 | Wu et al. |
| 7,209,611 B2 | 4/2007 | Joyner |
| 7,245,379 B2 | 7/2007 | Schwabe |
| 7,282,723 B2 | 10/2007 | Schomacker |
| 7,283,694 B2 | 10/2007 | Welch |
| 7,314,451 B2 | 1/2008 | Halperin et al. |
| 7,324,195 B2 | 1/2008 | Packirisamy et al. |
| 7,366,364 B2 | 4/2008 | Singh |
| 7,433,042 B1 | 10/2008 | Cavanaugh |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,526,007 B2 | 4/2009 | Chua et al. |
| 7,558,301 B2 | 7/2009 | Lin et al. |
| 7,623,233 B2 | 11/2009 | Freese et al. |
| 7,650,743 B2 | 1/2010 | Wehler et al. |
| 7,663,607 B2 | 2/2010 | Hotelling et al. |
| 7,680,364 B2 | 3/2010 | Nilsson |
| 7,720,328 B2 | 5/2010 | Yan |
| 7,884,933 B1 | 2/2011 | Kashyap |
| 7,885,302 B2 | 2/2011 | Eberhard |
| 7,885,492 B2 | 2/2011 | Welch |
| 7,974,504 B2 | 7/2011 | Nagarajan |
| 8,102,530 B2 | 1/2012 | Sperling |
| 8,300,994 B2 | 10/2012 | Welch et al. |
| 8,479,122 B2 | 7/2013 | Hotelling et al. |
| 8,498,681 B2 | 7/2013 | Wang et al. |
| 8,559,775 B2 | 10/2013 | Babie et al. |
| 8,564,784 B2 | 10/2013 | Wang et al. |
| 8,597,190 B2 | 12/2013 | Rule et al. |
| 8,619,177 B2 | 12/2013 | Perwass |
| 8,629,930 B2 | 1/2014 | Brueckner et al. |
| 8,724,100 B1 | 5/2014 | Asghari et al. |
| 8,731,638 B2 | 5/2014 | Butler |
| 8,920,332 B2 | 12/2014 | Hong et al. |
| 8,928,877 B2 | 1/2015 | Lim et al. |
| 8,951,472 B2 | 2/2015 | Kellner et al. |
| 8,958,056 B2 | 2/2015 | Wiethege et al. |
| 8,983,250 B2 | 3/2015 | Black et al. |
| 9,013,684 B2 | 4/2015 | Xalter et al. |
| 9,020,004 B2 | 4/2015 | Jeong |
| 9,024,252 B2 | 5/2015 | Chiarello et al. |
| 9,031,412 B2 | 5/2015 | Nagarajan |
| 9,062,957 B2 | 6/2015 | Yamada |
| 9,110,259 B1 | 8/2015 | Black |
| 9,135,397 B2 | 9/2015 | Denyer et al. |
| 9,176,282 B2 | 11/2015 | Pottier |
| 9,217,669 B2 | 12/2015 | Wu et al. |
| 9,287,314 B2 | 3/2016 | Toda |
| 9,322,773 B2 | 4/2016 | Coates et al. |
| 9,348,154 B2 | 5/2016 | Hayakawa |
| 9,370,689 B2 | 6/2016 | Guillama et al. |
| 9,377,396 B2 | 6/2016 | Goldring et al. |
| 9,405,066 B2 | 8/2016 | Mahgerefteh |
| 9,442,084 B2 | 9/2016 | Kakefuda |
| 9,459,201 B2 | 10/2016 | Gulati et al. |
| 9,494,535 B2 | 11/2016 | Sezginer |
| 9,543,736 B1 | 1/2017 | Barwicz et al. |
| 9,585,604 B2 | 3/2017 | Ruchti et al. |
| 9,620,931 B2 | 4/2017 | Tanaka |
| 9,739,663 B2 | 8/2017 | Haider et al. |
| 9,766,370 B2 | 9/2017 | Aloe et al. |
| 9,804,027 B2 | 10/2017 | Fish et al. |
| 9,829,631 B2 | 11/2017 | Lambert |
| 9,880,352 B2 | 1/2018 | Florjanczyk |
| 9,943,237 B2 | 4/2018 | Baker et al. |
| 9,948,063 B2 | 4/2018 | Caneau et al. |
| 9,955,111 B2 | 4/2018 | Mori |
| 10,009,668 B2 | 6/2018 | Liboiron-Ladouceur |
| 10,132,996 B2 | 11/2018 | Lambert |
| 10,139,278 B2 | 11/2018 | Fish et al. |
| 10,238,351 B2 | 3/2019 | Halperin et al. |
| 10,285,898 B2 | 5/2019 | Douglas et al. |
| 10,310,196 B2 | 6/2019 | Hutchison |
| 10,411,433 B2 | 9/2019 | Weber |
| 10,429,597 B2 | 10/2019 | ten Have et al. |
| 10,529,003 B2 | 1/2020 | Mazed |
| 10,551,605 B2 | 2/2020 | Arbore et al. |
| 10,687,718 B2 | 6/2020 | Allee et al. |
| 10,718,931 B2 | 7/2020 | Arbore et al. |
| 10,788,366 B2 | 9/2020 | Arbore et al. |
| 10,801,950 B2 | 10/2020 | Kangas et al. |
| 10,852,492 B1 | 12/2020 | Vermeulen et al. |
| 11,243,115 B2 | 2/2022 | Arbore et al. |
| 11,275,405 B2 | 3/2022 | Hotelling |
| 11,378,808 B2 | 7/2022 | Hargis et al. |
| 2001/0013936 A1 | 8/2001 | Nielsen et al. |
| 2003/0108821 A1 | 6/2003 | Mei |
| 2003/0138020 A1 | 7/2003 | Chen |
| 2004/0000643 A1 | 1/2004 | Karlsson |
| 2004/0212866 A1 | 10/2004 | Endo et al. |
| 2005/0045855 A1 | 3/2005 | Davidson |
| 2005/0053112 A1 | 3/2005 | Shams-Zadeh-Amiri |
| 2005/0063431 A1 | 3/2005 | Gallup et al. |
| 2005/0180639 A1 | 8/2005 | Trifonov et al. |
| 2005/0200853 A1 | 9/2005 | Mori et al. |
| 2006/0002443 A1 | 1/2006 | Farber et al. |

(56) References Cited

U.S. PATENT DOCUMENTS

| | | | |
|---|---|---|---|
| 2006/0100490 A1 | 5/2006 | Wang | |
| 2006/0158657 A1 | 7/2006 | De Lega et al. | |
| 2006/0178570 A1 | 8/2006 | Robinson et al. | |
| 2007/0057211 A1 | 3/2007 | Bahlman et al. | |
| 2007/0258083 A1 | 11/2007 | Heppell | |
| 2008/0044128 A1 | 2/2008 | Kish et al. | |
| 2008/0310470 A1 | 12/2008 | Ooi et al. | |
| 2009/0002697 A1 | 1/2009 | Freese | |
| 2009/0087925 A1 | 4/2009 | Wagner | |
| 2009/0310132 A1 | 12/2009 | Bennett et al. | |
| 2010/0220315 A1 | 9/2010 | Morrell et al. | |
| 2010/0225913 A1 | 9/2010 | Trainer | |
| 2011/0081064 A1 | 4/2011 | Hsu et al. | |
| 2011/0092784 A1 | 4/2011 | Butler | |
| 2011/0184260 A1 | 7/2011 | Robinson et al. | |
| 2011/0217698 A1 | 9/2011 | Rank et al. | |
| 2011/0228142 A1 | 9/2011 | Brueckner | |
| 2012/0015445 A1 | 1/2012 | Kellner | |
| 2012/0033211 A1* | 2/2012 | Wang | G01N 21/4795 356/300 |
| 2012/0059232 A1 | 3/2012 | Gross et al. | |
| 2012/0140240 A1 | 6/2012 | Hillman | |
| 2012/0147377 A1 | 6/2012 | Schleipen et al. | |
| 2012/0203089 A1 | 8/2012 | Rule | |
| 2012/0281258 A1 | 11/2012 | Sheblee et al. | |
| 2013/0114068 A1 | 5/2013 | Lim | |
| 2013/0215409 A1 | 8/2013 | Wiethege et al. | |
| 2013/0321792 A1 | 12/2013 | Shapiro | |
| 2014/0029943 A1 | 1/2014 | Mathai et al. | |
| 2014/0043620 A1 | 2/2014 | Ishii et al. | |
| 2014/0192355 A1 | 7/2014 | Froigneux et al. | |
| 2014/0226149 A1 | 8/2014 | Coates | |
| 2014/0303463 A1 | 10/2014 | Robinson et al. | |
| 2015/0011850 A1 | 1/2015 | Ruchti et al. | |
| 2015/0018642 A1 | 1/2015 | Gulati | |
| 2015/0109617 A1 | 4/2015 | Gilbert | |
| 2016/0091368 A1 | 3/2016 | Fish et al. | |
| 2016/0097716 A1 | 4/2016 | Gulati | |
| 2016/0202164 A1 | 7/2016 | Trainer | |
| 2016/0224750 A1 | 8/2016 | Kethman et al. | |
| 2016/0299061 A1 | 10/2016 | Goldring et al. | |
| 2017/0164878 A1 | 6/2017 | Connor | |
| 2018/0017491 A1 | 1/2018 | Arbore et al. | |
| 2018/0045566 A1 | 2/2018 | Fish et al. | |
| 2018/0238794 A1* | 8/2018 | Kangas | G01N 21/35 |
| 2018/0259762 A1* | 9/2018 | Fujimoto | G02B 21/367 |
| 2019/0128734 A1 | 5/2019 | Arbore et al. | |
| 2019/0204221 A1 | 7/2019 | Arbore et al. | |
| 2019/0339468 A1 | 11/2019 | Evans | |
| 2019/0342009 A1 | 11/2019 | Evans | |
| 2020/0152615 A1 | 5/2020 | Krasulick et al. | |
| 2020/0244045 A1 | 7/2020 | Bismuto et al. | |
| 2020/0253547 A1 | 8/2020 | Harris et al. | |
| 2020/0309593 A1 | 10/2020 | Bismuto et al. | |
| 2021/0010860 A1 | 1/2021 | Arbore et al. | |
| 2021/0018432 A1 | 1/2021 | Kangas et al. | |
| 2021/0033805 A1 | 2/2021 | Bishop et al. | |
| 2021/0302313 A1 | 9/2021 | Arbore et al. | |
| 2022/0074573 A1 | 3/2022 | Arbore et al. | |
| 2022/0136899 A1 | 5/2022 | Arbore et al. | |
| 2022/0236503 A1 | 7/2022 | Bishop et al. | |

FOREIGN PATENT DOCUMENTS

| | | | |
|---|---|---|---|
| CN | 101625319 | 1/2010 | |
| CN | 102038486 | 5/2011 | |
| CN | 102334021 | 1/2012 | |
| CN | 102439426 | 5/2012 | |
| CN | 102472664 | 5/2012 | |
| CN | 102519976 | 6/2012 | |
| CN | 102803930 | 11/2012 | |
| CN | 103842797 | 6/2014 | |
| CN | 104614084 | 5/2015 | |
| CN | 104733483 | 6/2015 | |
| CN | 105223163 | 1/2016 | |
| CN | 105438912 | 3/2016 | |
| CN | 108449957 | 8/2018 | |
| EP | 0168983 A1 * | 1/1986 | G02B 21/002 |
| EP | 0943950 A1 * | 9/1999 | G02B 21/0048 |
| EP | 1292134 | 3/2003 | |
| EP | 1403985 | 3/2004 | |
| EP | 1432045 | 6/2004 | |
| EP | 2320027 | 5/2011 | |
| GB | 2399220 | 9/2004 | |
| JP | 2000163031 A * | 6/2000 | |
| JP | 2002342033 A * | 11/2002 | G02F 1/13338 |
| JP | 2008262118 | 10/2008 | |
| JP | 2014163895 | 9/2014 | |
| KR | 20070092818 | 9/2007 | |
| KR | 1020110077598 | 7/2011 | |
| KR | 20130045189 | 5/2013 | |
| KR | 20090116731 A * | 10/2014 | G03F 7/70258 |
| KR | 1020140130702 | 11/2014 | |
| WO | WO 85/003575 | 8/1985 | |
| WO | WO 01/014929 | 3/2001 | |
| WO | WO 03/056876 | 7/2003 | |
| WO | WO 03/087787 | 10/2003 | |
| WO | WO 04/031824 | 4/2004 | |
| WO | WO 05/091036 | 9/2005 | |
| WO | WO-2006086566 A2 * | 8/2006 | A61B 5/14558 |
| WO | WO 07/121593 | 11/2007 | |
| WO | WO 08/032193 | 3/2008 | |
| WO | WO 11/090274 | 7/2011 | |
| WO | WO 13/126280 | 8/2013 | |
| WO | WO 15/101992 | 7/2015 | |
| WO | WO 16/106368 | 6/2016 | |
| WO | WO-2016106350 A1 * | 6/2016 | G01N 21/49 |
| WO | WO-2016109355 A1 * | 7/2016 | G01N 21/47 |
| WO | WO 17/040431 | 3/2017 | |
| WO | WO 17/184420 | 10/2017 | |
| WO | WO 17/184423 | 10/2017 | |
| WO | WO 19/152990 | 8/2019 | |
| WO | WO 20/065391 | 4/2020 | |
| WO | WO 20/106974 | 5/2020 | |

OTHER PUBLICATIONS

Si, Ke, Wei Gong, and Colin JR Sheppard. "Three-dimensional coherent transfer function for a confocal microscope with two D-shaped pupils." Applied optics 48.5 (2009): 810-817. (Year: 2009).*

Kurugol, Sila, et al. "Semi-automated algorithm for localization of dermal/epidermal junction in reflectance confocal microscopy images of human skin." Three-Dimensional and Multidimensional Microscopy: Image Acquisition and Processing XVIII. vol. 7904. SPIE, 2011. (Year: 2011).*

Lee, S. K., William Buxton, and Kenneth C. Smith. "A multi-touch three dimensional touch-sensitive tablet." Acm Sigchi Bulletin 16.4 (1985): 21-25. (Year: 1985).*

Rubine, Dean Harris. The automatic recognition of gestures. Carnegie Mellon University, 1991. (Year: 1991).*

Rubine, Dean. "Combining gestures and direct manipulation." Proceedings of the SIGCHI conference on Human factors in computing systems. 1992. (Year: 1992).*

International Search Report and Written Opinion dated Mar. 22, 2019, PCT/US2018/053237, 22 pages.

U.S. Appl. No. 17/254,810, filed Dec. 21, 2020, Bishop et al.

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

(56) References Cited

OTHER PUBLICATIONS

Worhoff et al., "Flip-chip assembly for photonic circuits," MESA+ Research Institute, University of Twente, Integrated Optical MicroSystems Group, The Netherlands, 12 pages.
Bogaerts, et al., "Off-Chip Coupling," *Handbook of Silicon Photonics*, CRC Press, Apr. 2013, 43 pages.
He et al., "Integrated Polarization Compensator for WDM Waveguide Demultiplexers," *IEEE Photonics Technology Letters* vol. 11, No. 2, Feb. 1999, pp. 224-226.
Sayli et al., "Two-distance partial pathlength method for accurate measurement of muscle oxidative metabolism using fNIRS," Proceeding of SPIE, Bellingham, Washington USA, vol. 6084, 2006, 8 pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

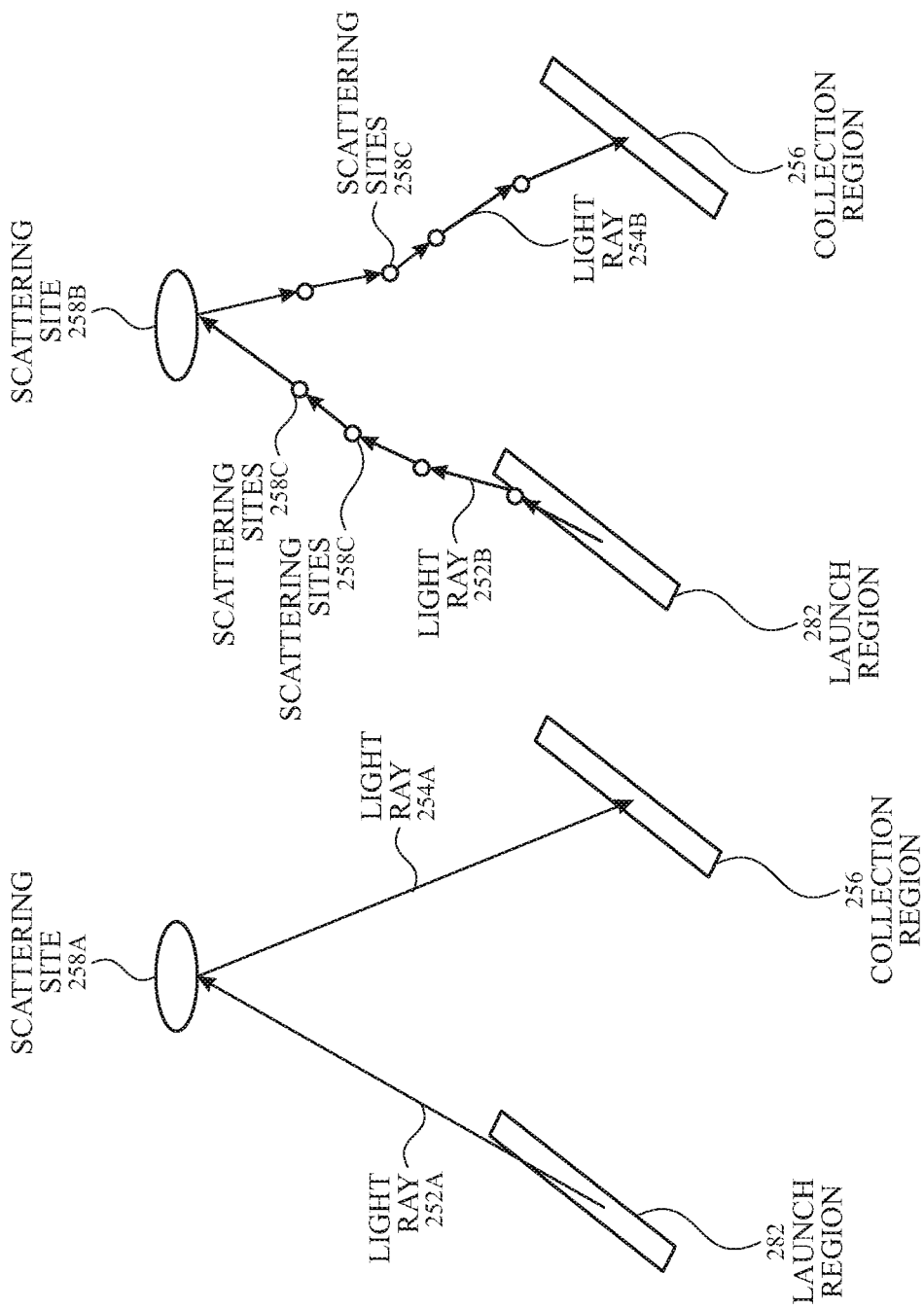

US 11,579,080 B2

RESOLVE PATH OPTICAL SAMPLING ARCHITECTURES

CROSS-REFERENCE TO RELATED APPLICATIONS

This application is a national phase application under 37 U.S.C. § 371 of PCT/US2018/053237, filed Sep. 27, 2018, which claims the benefit of U.S. Provisional Patent Application No. 62/565,789, filed on Sep. 29, 2017, which is hereby incorporated by reference in its entirety.

FIELD

The disclosure is directed generally to an optical sampling architecture capable of measuring one or more sample properties. More specifically, the architecture can measure the sample and average the measured signals over multiple scale lengths while controlling the optical path lengths and optical sampling depths of the measured signals.

BACKGROUND

Absorption spectroscopy is an analytical technique that can be used to determine the sample properties. Conventional systems and methods for absorption spectroscopy can include emitting light toward a sample. As light interacts with (e.g., reflects and/or transmits through) the sample, a portion of the light energy can be absorbed at one or more wavelengths. This absorption can cause a change in the properties of light that interacts with the sample. The properties of light interacting with the sample can be compared to the properties of light interacting with a reference, and the sample properties can be determined based on this comparison.

The properties of light that exits the sample can be measured by one or more detector pixels. In some instances, the light transmitting through the sample may undergo diffuse scattering. In some instances, the sample may be a heterogeneous sample, where the sample properties may vary across different volumes in the sample. Diffuse scattering may involve light interacting with a relatively small sample volume, which may lead to increased sensitivity to inhomogeneity of the sample. As such, measurements of a relatively small sample volume may not be representative of the sample as a whole. An optical sampling architecture capable of measuring properties of the sample and averaging the signals over multiple scale lengths while controlling the optical path lengths and optical sampling depths of the measured signals may be desired.

In some examples, optical measurements can include noise. Noise can take multiple forms including incoherent and coherent. Incoherent noise can be due to diffuse scattering that may occur as light transmits through the sample, and its properties may be independent of the phases of light incident on the detector. In some instances, the sample may be inhomogeneous, where the sample properties may vary across different volumes in the sample. The inhomogeneity of the sample may contribute to incoherent noise through random distributions of diffuse scattering and the like. Incoherent noise may also vary depending on wavelength. Coherent noise can be due to, e.g., speckle, and its properties can depend on the phases of light incident on the detector along with the spectral density of the source power. In some architectures, both incoherent and coherent noise may be present and may be with varying percentages. An optical sampling architecture capable of reducing both incoherent and coherent noise may be desired.

SUMMARY

Described here are optical sampling architectures and methods for operation thereof. In some examples, an optical sampling architecture can be capable of emitting a launch sheet light beam from a launch region and receiving a detection sheet light beam from a detection region, where the emission and detection regions are located at the system interface. The launch region can have one dimension (e.g., y-dimension) that is elongated relative to another dimension (e.g., x-dimension) such that light output from one or more waveguides can collectively form the launch sheet light beam. The detection region can also have one dimension elongated relative to another dimension such that the system can selectively accept light having one or more properties (e.g., angle of incidence, beam size, and/or beam shape that meet one or more criteria). In some examples, the elongated dimension of the detection region can be greater than the elongated dimension of the launch region. Additionally or alternatively, the optics included in the system can be configured to selectively accept light.

As described here, a light emitter may be configured to form a launch sheet light beam. In some examples, the light emitter can include one or more waveguides, one or more reflectors, and an outcoupler. The one or more waveguides can output light (e.g., including light rays oriented in certain directions) along a first plane (e.g., in the plane of the substrate) towards the reflectors. In some examples, the waveguides can form portions of coherent light sources. The reflectors can direct light towards the outcoupler along a first plane, and the outcoupler can direct light to a second plane (e.g., perpendicular to the first plane, 60° relative to the first plane, 45° relative to the first plane, etc.). In some examples, the light emitter can be an incoherent source. The components of the light emitter along with the detector, launch region, and detection region of the system can be configured based on a targeted intersection points of light in the sample.

Examples of the disclosure can further include an outcoupler array and associated components for reducing coherent and/or incoherent noise. The outcoupler array and associated components can create a launch sheet light beam having different in-plane launch positions and/or in-plane launch angles. The associated components can include a multiplexer and a phase control network. The different in-plane launch positions and/or in-plane launch angles can be created using, for example, a staggered arrangement for the outcouplers included in the outcoupler array. In some examples, the system can include multiple optics for spatially separating the emitted light from the light emitter. Additionally or alternatively, the system can include multiple spatially distinct detection regions. In yet another example, the system can include divergence optics to create divergence in the emitted light from the light emitter.

BRIEF DESCRIPTION OF THE DRAWINGS

FIGS. 2B-2C illustrate exemplary light that have undergone a single large-angle scattering event according to examples of the disclosure.

DETAILED DESCRIPTION

Figure 1A:
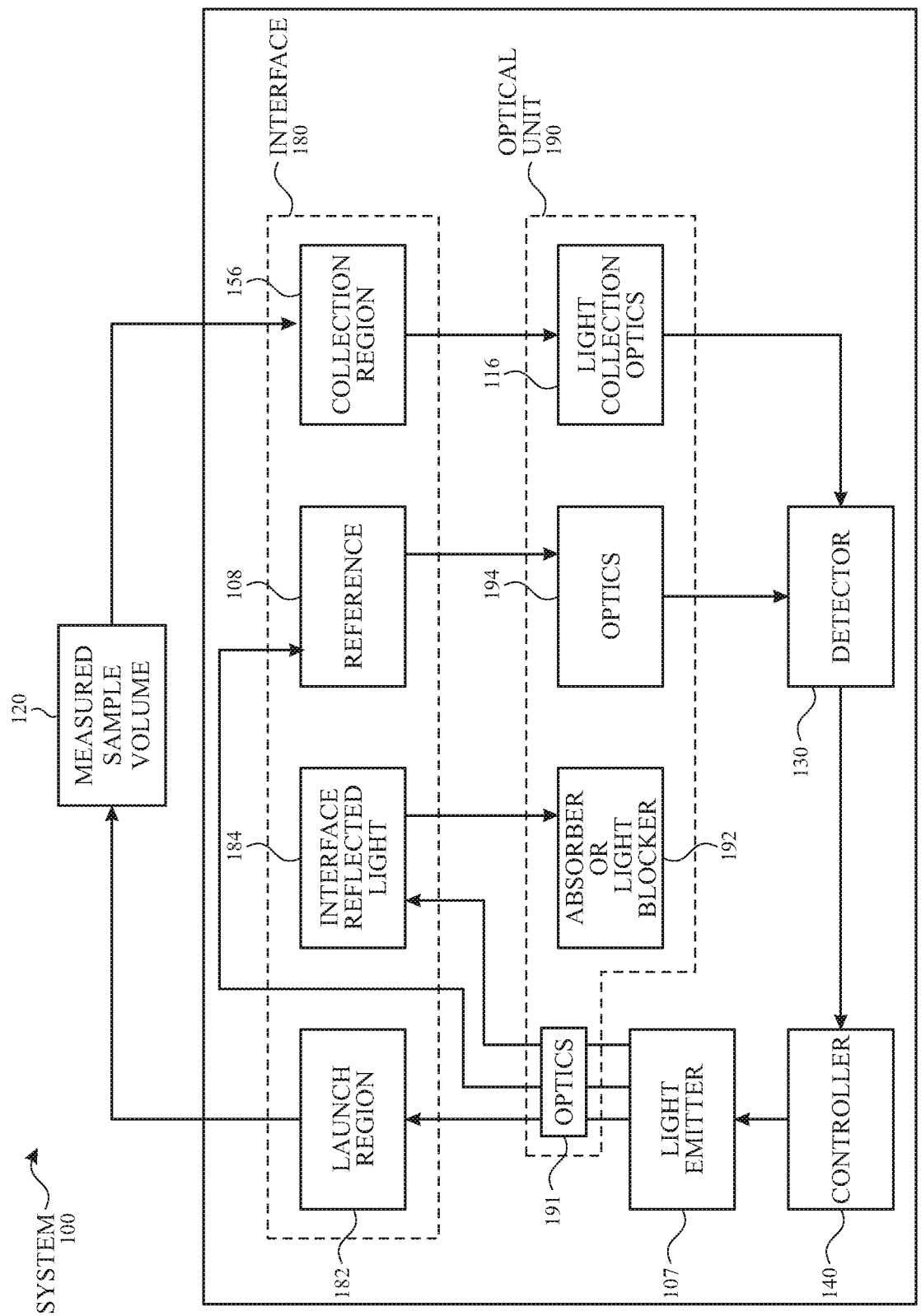
FIG. 1A illustrates a block diagram of an exemplary system according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Some samples may be heterogeneous with variations in sample properties along different areas within the sample. The varying structure of the sample can cause light emitted from the system to return (e.g., reflect, scatter, or otherwise be redirected) back toward the system, and the system can measure the return light. Additionally, the heterogeneous nature of a sample may lead to an inherit randomness in its optical absorption. This inherit randomness may lead to inaccurate measurements when the volume being measured in the sample is relatively small. In some instances, the measurements may have increased sensitivity to random scattering within the relatively small volume, where one or more factors (e.g., orientation, position, size of the particles, etc.) can lead to large deviations in the optical properties of the detected reflected light. These deviations can be reduced, the measurement accuracy can be enhanced, and the optical efficiency can be increased by increasing sample volume. The sample volume can include the volume to which emitted light traverses through the sample, undergoes a single scattering event, and can return to be received by the detector array. With an increase in the sample volume, the detector array can receive more light having useful signal information, where averaging of the received light can increase the signal-to-noise ratio. In some instances, configuring the system to measure and average the sample properties over a relatively larger sample volume (e.g., multiple scale lengths) can be more representative of the overall properties of the sample (instead of being representative of the local properties of the sample).

The heterogeneous nature of the sample can include the sample having multiple scattering sites, where light may deviate from its trajectory with scattering events (at the scattering sites). Different locations of the sample can have a pattern of noise, which may be wavelength dependent due to, e.g., different properties within the sample having different wavelength dependent absorption. The wavelength dependent pattern of noise can lead to decreased measurement accuracy.

To reduce or remove the noise included in the determination of the sample properties, the system can increase the percentage of measured signals having targeted optical path lengths and targeted optical sampling depths. Additionally or alternatively, the system may limit the light rays included in the analysis to those that have undergone a single scattering event. For example, the system can receive more light that has undergone a single scattering event relative to light that has undergone multiple scattering events. A single scattering event can occur when the emitted light and the detected light intersect in the sample. Thereby, at the single scattering event, the emitted light can turn around and reflect back towards the system to become the detected light. The likelihood of receiving light that has undergone a single scattering event can increase by controlling the parameters (e.g., beam shape, beam size, and angles) of light exiting the launch region and/or light entering the detection region.

In some instances, the emitted light may undergo multiple small-angle scattering events before reaching the single scattering event. In some instances, the output light may undergo multiple small-angle scattering events before reaching the detection region. Multiple small-angle scattering events may lead to a change in optical path length of light. In some examples, the change may be small enough such that the measurement accuracy may not be impaired and including such light may be lead to a better representation of the sample properties, as discussed below. A device capable of measuring over multiple scale lengths (e.g., multiple millimeters) within the sample while also controlling the optical path lengths and the optical sampling depths of the measured signals may be desired.

In some examples, optical measurements can include noise. Noise can take multiple forms including incoherent and coherent. Incoherent noise can be due to diffuse scattering that may occur as light transmits through the sample, and its properties may be independent of the phases of light incident on the detector. In some instances, the sample may be inhomogeneous, where the sample properties may vary across different volumes in the sample. The inhomogeneity of the sample may contribute to incoherent noise through random distributions of diffuse scattering and the like. Incoherent noise may also vary depending on wavelength. Coherent noise can be due to, e.g., speckle, and its properties can depend on the phases of light incident on the detector along with the spectral density of the source power. In some architectures, both incoherent and coherent noise may be present and may be with varying percentages. An optical sampling architecture capable of reducing both incoherent and coherent noise may be desired.

Described here are optical sampling architectures and methods for operation thereof. In some examples, an optical sampling architecture can be capable of emitting a launch sheet light beam from a launch region and receiving a detection sheet light beam from a detection region, where the emission and detection regions are located at the system interface. The launch region can have one dimension (e.g., y-dimension) that is elongated relative to another dimension (e.g., x-dimension) such that light output from one or more waveguides can collectively form the launch sheet light beam. The detection region can also have one dimension elongated relative to another dimension such that the system can selectively accept light having one or more properties (e.g., angle of incidence, beam size, and/or beam shape that meet one or more criteria). In some examples, the elongated dimension of the detection region can be greater than the elongated dimension of the launch region, where the planes of the elongated dimensions of both the detection region and the launch region can be parallel. Additionally or alternatively, the optics included in the system can be configured to selectively accept light.

Described here is a light emitter configured to form a launch sheet light beam. In some examples, the light emitter can include one or more waveguides, one or more reflectors, and an outcoupler. The one or more waveguides can output light along a first plane (e.g., in the plane of the substrate) towards the reflectors. In some examples, the waveguides can form portions of coherent light sources (also referred to as "coherent waveguides"). The reflectors can direct light towards the outcoupler along a first plane, and the outcoupler can direct light to a second plane (e.g., perpendicular to the first plane, 60°, 45°, etc.). In some examples, the light emitter can be an incoherent source. The components of the light emitter along with the detector, launch region, and detection region of the system can be configured based on the intersection points of light.

Examples of the disclosure can further include an outcoupler array and associated components configured to reduce coherent and/or incoherent noise. The outcoupler array and associated components can create a launch sheet light beam having different in-plane launch positions and/or in-plane launch angles. The associated components can include a multiplexer and a phase control network. The different in-plane launch positions and/or in-plane launch angles can be created using, for example, a staggered arrangement for the outcouplers included in the outcoupler array. In some examples, the system can include multiple optics for spatially separating the emitted light from the light emitter. Additionally or alternatively, the system can include multiple spatially distinct detection regions. In yet another example, the system can include divergence optics to create divergence in the emitted light from the light emitter.

Overview of the Integrated Photonics Device

Figure 1B:
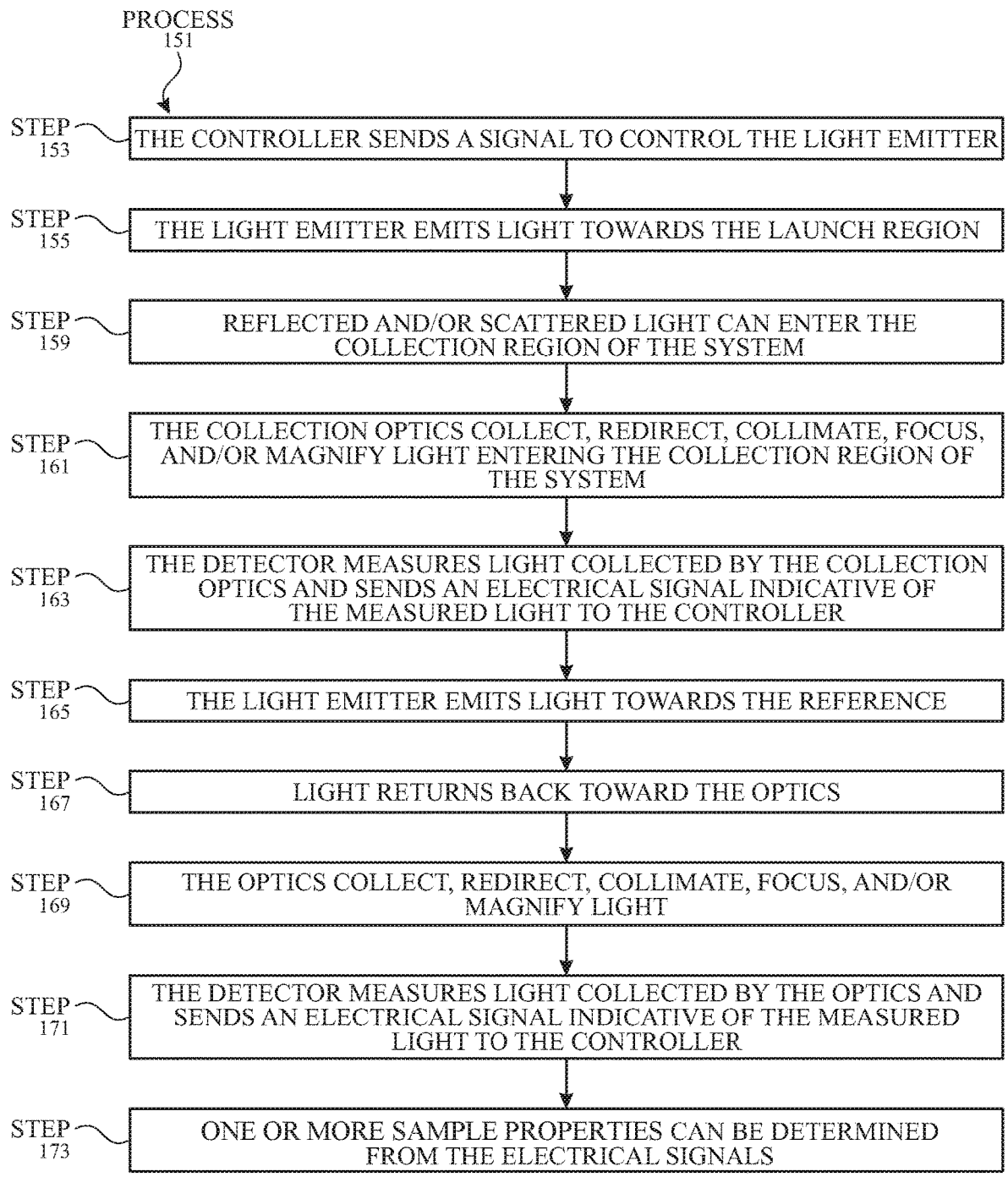
FIG. 1B illustrates an exemplary process flow for measuring sample properties according to examples of the disclosure.

FIG. 1A illustrates a block diagram of an exemplary system according to examples of the disclosure. FIG. 1B illustrates an exemplary process flow for measuring sample properties according to examples of the disclosure. The system 100 can include an interface 180, an optical unit 190, a light emitter 107, a detector 130, and a controller 140. The interface 180 can include an external surface (e.g., system interface 380 illustrated in FIG. 3A) of a device which can accommodate light transmission there through. The interface 180 can include a launch region 182, a reference 108 (optional), and a detection region 156. In some examples, the launch region 182 can include an aperture layer including one or more features (e.g., openings) configured to shape one or more of the location(s), angle(s), and/or shape(s) of light exiting the system 100. In some examples, the detection region 156 can include an aperture layer configured to limit the locations and/or angles of light entering the system 100. By limiting the location and/or angles of light entering, the light incident on, or exiting from, a measured sample volume 120 can be selectively limited. The optical unit 190 can include an absorber or light blocker 192, optics 191 (e.g., lenses), optics 194 (e.g., a negative micro-lens), and light collection optics 116 (e.g., a positive microlens). While operating the system 100, the measured sample volume 120 can be located near, close to, or touching at least a portion (e.g., system interface) of the system 100. The light emitter 107 can be coupled to the controller 140. The controller 140 can send a signal (e.g., current or voltage waveform) to control the light emitter 107, which can emit light (step 153 of process 151). The light emitter 107 can include a plurality of waveguides (discussed below). The light emitter 107 can emit light towards the launch region 182 (step 155 of process 151).

The launch region 182 can be configured to allow light to exit the system 100 to be incident on the measured sample volume 120. Depending on the nature of the measured sample volume 120, light can penetrate a certain depth into the measured sample volume 120 to reach one or more scattering sites and can return (e.g., reflect and/or scatter back) towards the system 100. The return light can enter back into the system 100 at the detection region 156 (step 159 of process 151). The return light that enters back into the system 100 can be collected by light collection optics 116, which can direct, collimate, focus, and/or magnify the return light (step 161 of process 151). The return light can be directed towards the detector 130. The detector 130 can detect the return light and can send an electrical signal indicative of the amount of detected light to the controller 140 (step 163 of process 151).

Additionally or alternatively, the light emitter 107 can optionally emit light towards the reference 108 (step 165 of process 151). The reference 108 can redirect light towards optics 194 (step 167 of process 151). The reference 108 can include, but is not limited to, a mirror, a filter, and/or a sample with known optical properties. Optics 194 can direct, collimate, focus, and/or magnify light towards the detector 130 (step 169 of process 151). The detector 130 can measure light reflected from the reference 108 and can generate an electrical signal indicative of this reflected light (step 171 of process 151).

The controller 140 can be configured to receive one or more electrical signals from the detector 130. In some instances, the detector 130 can receive at least two electrical signals, where one electrical signal can be indicative of light reflected/scattered from the measured sample volume 120, and another electrical signal can be indicative of light reflected from the reference 108. The different electrical signals can be a time-multiplexed signal, for example. The electrical signal at a given instance in time can be based on whether the light is sent to the measured sample volume or the reference. In other instances, two or more electrical signals can be received by different detector pixels simultaneously and may include different light information. The controller 140 (or another processor) can determine the properties of the sample from the electrical signals (step 173 of process 151).

In some examples, when the system is measuring the properties of the sample and the reference, light emitted from the light emitter 107 can reflect off a surface of the sample back into the system 100. Light reflected off the system interface (e.g., interface where the system contacts the sample) can be referred to as the interface reflected light 184. In some examples, interface reflected light 184 could be light emitted from the light emitter 107 that returns from the measured sample volume 120 or the reference 108 and can be due to light scattering within the system 100. Since the interface reflected light 184 can be unwanted, the absorber or light blocker 192 can prevent the interface reflected light 184 from being collected by the optics 194 and the light collection optics 116. In this manner, the system can prevent the interface reflected light 184 from being measured by the detector 130.

Launch Beam

In some applications, the measurements of a relatively small sample volume may not lead to an analysis that is representative of the sample as a whole. For example, the measurement of a heterogeneous sample using light that undergoes diffuse scattering within the sample may lead to inaccurate measurements and analysis. To enhance the measurement accuracy, a launch beam that is elongated for measuring a larger sample volume may be desired.

Figure 2A:
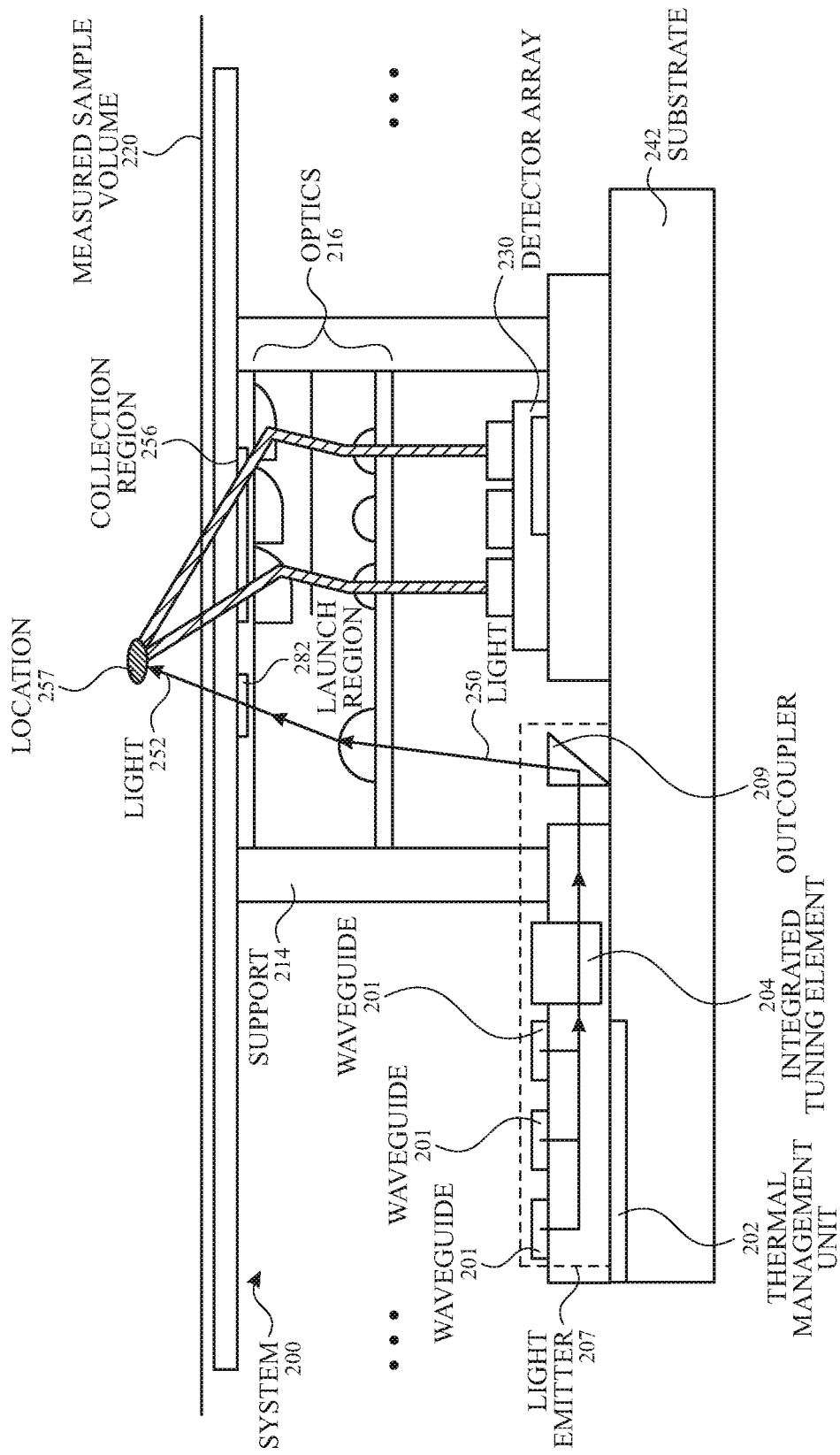
FIG. 2A illustrates a cross-sectional view of an exemplary system with multi-layered optics according to examples of the disclosure.

FIG. 2A illustrates a cross-sectional view of an exemplary portion of a system with multi-layered optics according to examples of the disclosure. While operating the system, the measured sample volume 220 can be located close to the system interface. The measured sample volume 220 can include one or more locations, such as location 257. In some examples, a location within the sample can include a scattering site associated with a scattering event. The system 200 can be configured to reconstruct the optical paths in the measured sample volume 220. For example, the system 200 can be configured to reconstruct the angles and locations of light received at the detection region to another plane (e.g., a plane located closer to the detector array 230). Reconstruction of the optical paths can be performed using one or more layers of optics (e.g., optics 216). The system 200 can include two layers of optics, for example, as shown in the figure. The system 200 can include a support 214 to support the optics 216. Located below (i.e., opposite the surface of the system interface) the optics 216 can be a detector array 230. Located between the optics 216 can be air, vacuum, or any medium with a refractive index that contrasts the refractive indices of the optics 216. Although the figure illustrates a system including two-layers of optics, examples of the disclosure can include, but are not limited to, any number (e.g., one, three, four, etc.) of layers of optics. As another example, the system may associate certain detector pixels with different optical path lengths to determine (e.g., estimate) the optical properties (e.g., absorbance) of the measured sample volume 220.

The system 200 can include a light emitter 207. The light emitter 207 can be configured to emit light 250. The light emitter 207 can include any light source (including one or more waveguides 201) capable of generating light. In some instances, the light source can be a single light source. In other instances, the light emitter 207 can include a plurality of discrete light sources. A light source can include, but is not limited to, a lamp, laser, light emitting diode (LED), organic light emitting diode (OLED), electroluminescent (EL) source, quantum dot (QD) light emitter, super-luminescent diode, super-continuum source, fiber-based source, or a combination of one or more of these sources. In some examples, the light emitter 207 can be capable of emitting a single wavelength of light. In some examples, the light emitter 207 can be capable of emitting a plurality of wavelengths of light. In some examples, the light emitter 207 can be any tunable source capable of generating a short-wave infrared (SWIR) signature. In some examples, each of the waveguides 201 included in the light emitter 207 can output a different wavelength range of light (e.g., different colors in the spectrum). In some examples, a waveguide 201 can include a III-V material, such as Indium Phosphide (InP), Gallium Antimonide (GaSb), Gallium Arsenide Antimonide (GaAsSb), Aluminum Arsenide (AlAs), Aluminum Gallium Arsenide (AlGaAs), Aluminum Indium Arsenide (AlInAs), Indium Gallium Phosphide (InGaP), Indium Gallium Arsenide (InGaAs), Indium Arsenide Antimonide (InAsSb), Indium Phosphide Antimonide (InPSb), Indium Arsenide Phosphide Antimonide (InAsPSb), and Gallium Iridium Arsenide Antimonide Phosphide (GaInAsSbP).

Light from the waveguides 201 may also be controlled using an integrated tuning element 204. The integrated tuning element 204 may be part of the light emitter 207 as shown, or may be a component separate from the light emitter 207 (not shown). Light from the waveguides 201 can be combined using optical traces (not shown) and a multiplexer (not shown). In some examples, the integrated tuning element 204, the optical traces, and the multiplexer can be disposed on a substrate 242 or included in a single optical platform, such as an integrated silicon photonics chip. In some examples, the system 200 may include one or more of optical attenuators, phase modulators, splitters, and the like (discussed below).

The system 200 can also include a thermal management unit 202 for controlling (e.g., heating or cooling) the temperature of the light emitter 207. The light emitter 207 may include one or more outcouplers 209. The outcoupler 209 can optionally be configured to focus, collect, collimate, and/or condition (e.g., shape) light from the waveguides 201 towards at least a portion of the optics 216. In some examples, the outcoupler 209 can be configured as a single mode waveguide that directs the light beam towards optics 216 in such a manner that the angles of exiting light are restricted. In some examples, light 250 from the outcoupler 209 can be a launch sheet light beam (discussed below). The optics 216 can receive light 250 and can collimate and/or tilt the light beam towards the launch region 282 and towards one or more locations (e.g., location 257) in the measured sample volume 220. In some examples, the optics 216 can include a lens having a bottom surface (i.e., surface facing the outcoupler 209) that is flat or almost flat (e.g., within 10%) and a top surface (i.e., surface facing away from the outcoupler 209) that is convex. Light can be emitted from the waveguides 201, collimated by the outcoupler 209, transmitted through optics 216, and exit the system 200 through launch region 282 can be referred to as light 252.

In some instances, light that interacts with the measured sample volume 220 can undergo one or more scattering events before exiting the measured sample volume 220. The system can increase the percentage of measured signals having targeted optical path lengths and targeted optical sampling depths and/or limit the light rays included in the analysis to those that have undergone a single scattering event. FIGS. 2B-2C illustrate exemplary light that have undergone a single large-angle scattering event according to examples of the disclosure. For example, as illustrated in FIG. 2B, light ray 252A can be emitted light that undergoes a single large-angle scattering event at scattering site 258A, resulting in the light ray 254A. Neither light ray 252A nor light ray 254A may undergo other scattering events, so the system can include the signals associated with a targeted optical path length and targeted optical sampling depth (e.g., via selecting the light ray(s) based on the angles of the emitted light ray 252A and the detected light ray 254A) included in the sample analysis.

In some instances, emitted light, detected light, or both can experience multiple scattering events. For example, as illustrated in FIG. 2C, the emitted light ray 252B can undergo multiple small-angle scattering events at the scattering sites 258C before reaching the scattering site 258B. The small-angle scattering events can create a small (e.g., less than 30°) change in the angle of light relative to its trajectory, where the direction of light can remain the same. At the scattering site 258B, the light ray 252B can undergo a single large-angle scattering event, resulting in the detected light ray 254B. In some examples, the scattering site 258B may be at a different location than the scattering site 258A (e.g., due to small changes in angles associated with the small-angle scattering events). The single large-angle scattering event can change the direction of light. Additionally or alternatively, the detected light ray 254B may undergo multiple small-angle scattering events at the scattering sites 258C before reaching the detection region 256. In some examples, the small-angle scattering events can lead to the detected light ray 254B entering the detection region 256 at a different location than the detected light ray 254A.

With light undergoing multiple small-angle scattering events, the optical path length can change (e.g., increase) slightly, but may have a minimal effect on the measurement accuracy. To ensure the effect is minimal, the system can be configured to include more return light that has the targeted optical path lengths and the targeted optical sampling depths in the sample analysis (e.g., to determine the sample properties). The emitted light exiting the launch region 282 (and emitted from the system to the sample) and the light entering the detection region 256 (which exited the sample) can be selected based on whether the optical path length of the return light is within a threshold range from the targeted optical path length. In some instances, light that have undergone multiple small-angle scattering events can be selectively allowed to pass through the detection region 256 to the detector (e.g., detector 130), and the system can prevent (or remove from the analysis) light that have undergone multiple large-angle scattering events from reaching the detector.

In some instances, the ratio of the number of small-angle to large-angle scattering events can be 10:1 or 20:1. In some examples, one or more criteria can be associated with one or more beam parameters including, but are not limited to, a range of areas (e.g., the area occupied by the detection region of the system) and a range of angles of light entering the system (and exiting the sample).

Figure 3A:
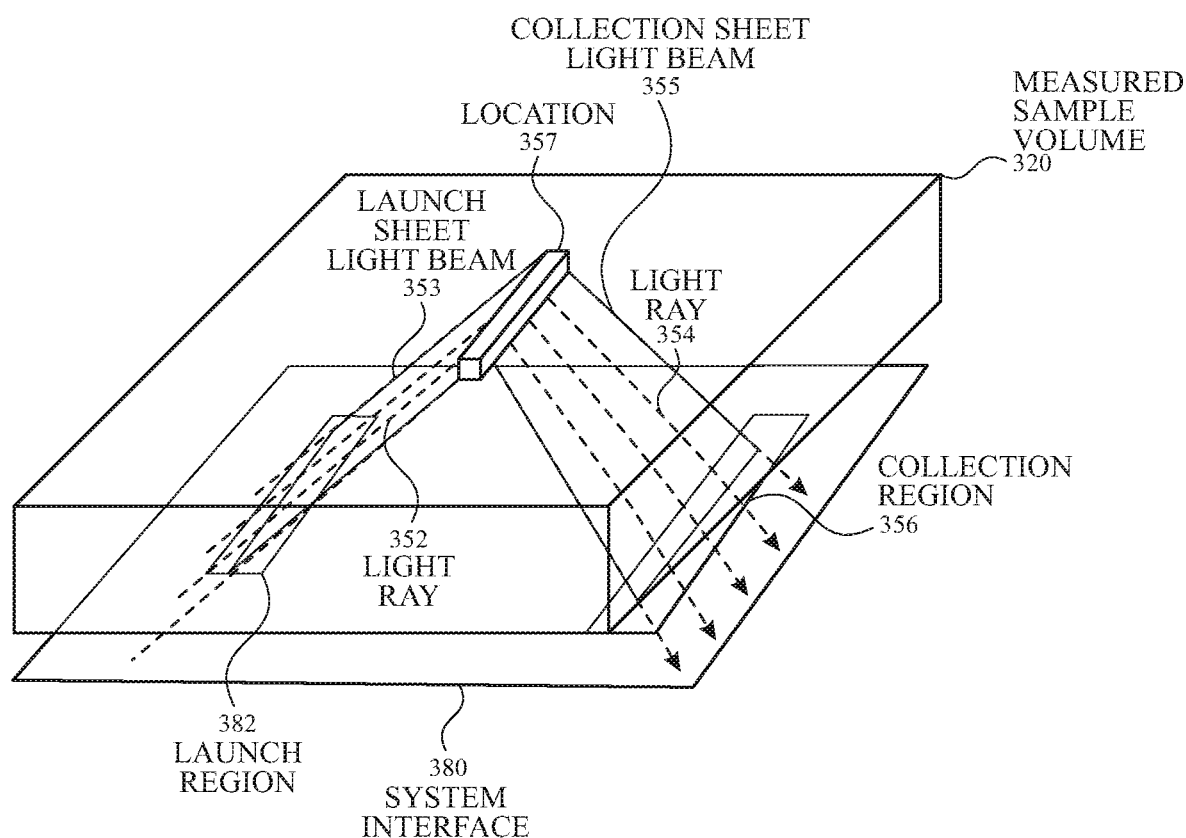
FIG. 3A illustrates a planar view of an exemplary system interface and sample according to examples of the disclosure.
Figure 3B:
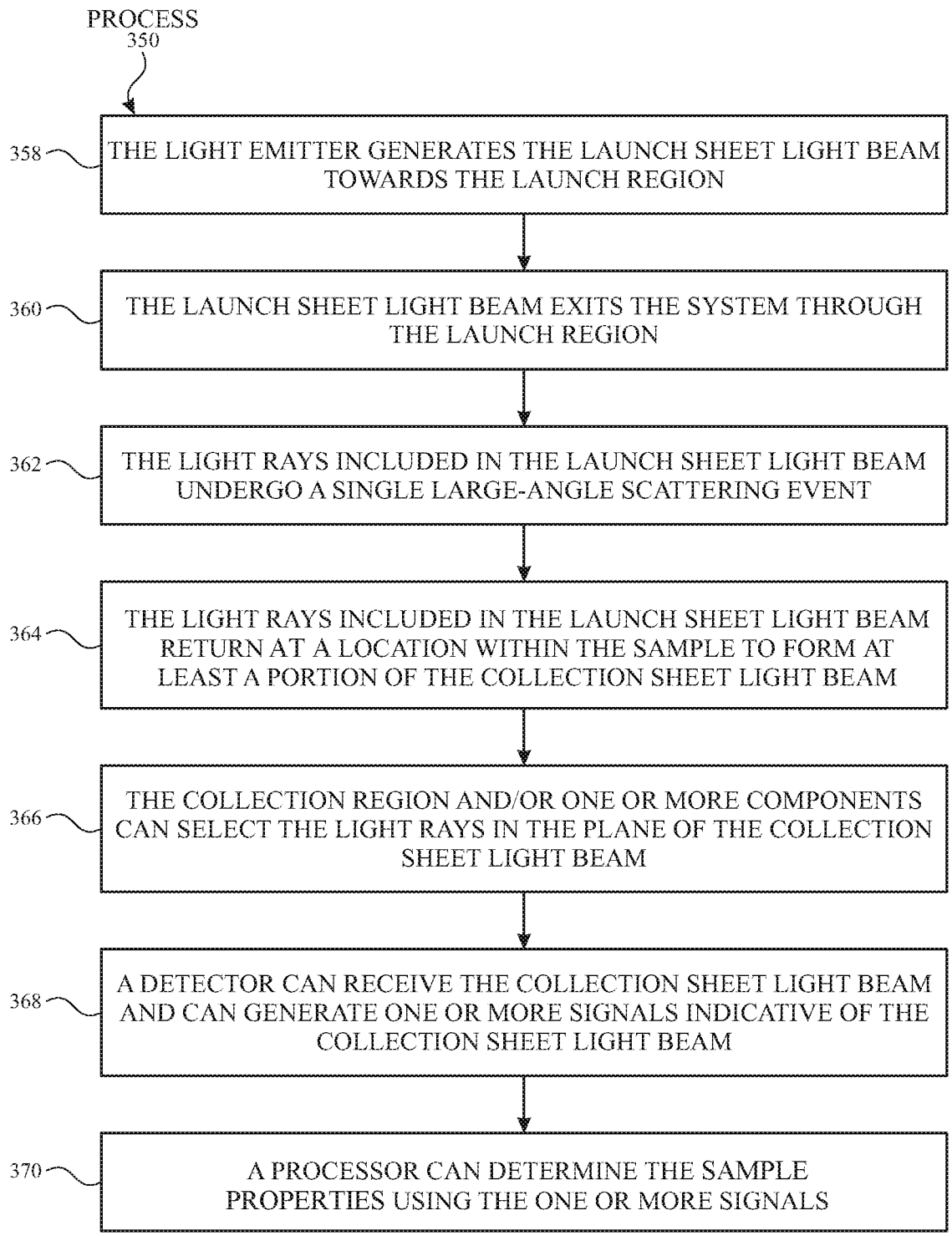
FIG. 3B illustrates an exemplary process flow for measuring sample properties using the system according to examples of the disclosure.

FIG. 3A illustrates a planar view of an exemplary system interface and measured sample volume according to examples of the disclosure. FIG. 3B illustrates an exemplary process flow for measuring sample properties using the system according to examples of the disclosure. The system interface 380 can include a launch region 382 and a detection region 356, where the regions can be configured such that one dimension is elongated relative to the other dimensions. For example, the launch region 382 can be rectangular (i.e., a stripe geometry) with the y-dimension being elongated relative to the x-dimension. For example, the launch region 382 can have a length that is multiple factors (e.g., 10, 15, 20, 25, etc.) greater than its width.

The light emitter (e.g., light emitter 207 of FIG. 2A) can be configured to generate multiple light rays 352 (step 358 of process 350). In some examples, the light rays 352 can collectively form a launch sheet light beam 353 (instead of a linear light beam). The launch sheet light beam 353 can be formed by a single light emitter or multiple light emitters. In some examples, the system can be configured (e.g., by including spherical or cylindrical lenses) such that some or all of light rays 352 can be oriented parallel or within a spreading range (e.g., within ±5°) from each other. The distribution of the light rays 352 can be along the elongated y-direction. In this manner, the light rays 352 can extend in the y-direction creating a scatter voxel within the measured sample volume 320 at the location 357. The scatter voxel can be a volume within the measured sample volume 320 where the launch sheet light beam 353 intersects with the detection sheet light beam 355.

The launch sheet light beam 353 can exit the system through the launch region 382 (step 360 of process 350). Light may undergo one or more small-angle scattering events before reaching the location 357. Light (e.g., light rays 352) included in the launch sheet light beam 353 can undergo a single large-angle scattering event at the location 357 within the measured sample volume 320 (step 362 of process 350). In some examples, the scatter voxel at location 357 can be longer (e.g., in the y-dimension) than the launch region 382 due to the spreading of the light rays 352. For example, the scatter voxel can be 0.5 mm longer in the y-dimension than the launch region 382. The spreading may be due to one or more scattering events causing a change in angles of some of the light rays. Some of the light rays 352 included in the launch sheet light beam 353 can reflect at the location 357 to form the light rays 354. The light rays 354 can collectively form at least a portion the detection sheet light beam 355 (instead of a linear light beam) (step 364 of process 350). In some instances, the light rays 354 included in the detection sheet light beam 355 can undergo multiple small-angle scattering events before reaching the detection region 356.

The detection region 356 and/or one or more components of the system (e.g., optical unit 190 illustrated in FIG. 1A) can constrain or select light in the plane of the detection sheet light beam 355 (step 366 of process 350). The detection sheet light beam 355 can enter the system through the detection region 356. The detection region 356 can also be configured such that one dimension is elongated relative to the other dimensions. The elongated dimension can be the y-dimension, which can be the same elongated dimension as the launch region 382. In some examples, the size and shape of the launch region 382 and the detection region 356 can be the same. In some examples, the detection region 356 can be longer (e.g., in the y-dimension) than the launch region 382 to collect more light that may undergo multiple small-angle scattering events (discussed earlier). For example, the detection region 356 can be 1 mm longer in the y-dimension than the launch region 382. A detector can receive the detection sheet light beam 355 and can generate one or more signals indicative of the detection sheet light beam 355 (step 368 of process 350). A processor can use the signals to determine the sample properties (step 370 of process 350).

Additionally or alternatively, the optics (e.g., optics 194) can be configured to constrain or select the scattering angles in the plane of the detection sheet light beam 355. In some instances, the angle(s) of the light rays 352 included in launch sheet light beam 353 may change at location 357. The change in angle(s) can be along the plane (e.g., with respect to the elongated portion of the detection region 356) of the detection sheet light beam 355. The optics can be configured to selectively accept (e.g., allow light to pass through to the detector) changes in angle(s) that are within a threshold range of angles. That is, light included in the detection sheet light beam 355 can meet a change in angle criteria. Selectively acceptance can include rejecting (e.g., preventing light from reaching the detector) changes in angle(s) outside of a threshold range of angles. In some examples, the detection region 356 and/or optics can include one or more apertures that can, additionally or alternatively, accept changes in angle(s) within the threshold range of angles.

Figure 3C:
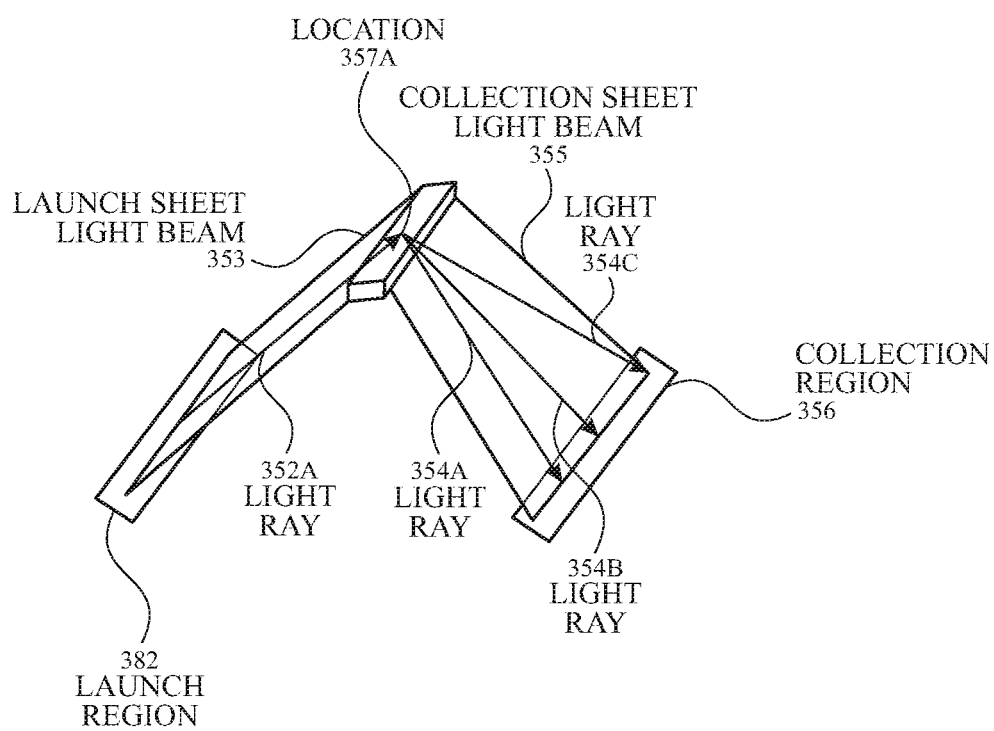
FIG. 3C illustrates an exemplary instance of accepting collected light within a threshold range of angles along the plane of the detection sheet light beam according to examples of the disclosure.

FIG. 3C illustrates an exemplary instance of accepting collected light within a threshold range of angles along the plane of the detection sheet light beam according to examples of the disclosure. The light ray 352A can have a first angle of incidence (e.g., parallel to an edge of the launch sheet light beam 353) at the location 357A, where a scattering event can occur. The scattering event can result in the light ray 354A, which can have a second angle as the angle of return. In some instances, the threshold range of angles can be centered around the second angle, and the system can allow the light ray 354A to pass through the detection region 356. Alternatively, a single large-angle scattering event, multiple small-angle scattering events, or both within the sample can lead to the light ray 354B, which may have a third angle as the angle of reflection. If the third angle is within the threshold range of angles, the optics can allow the light ray 354B to pass through to the detection region 356.

Some light, such as the light ray 354C, may have an angle outside of the threshold range of angles. In some instances, the detection region 356 can reject the light ray 354C. In some examples, the light ray 354C may pass through the detection region 356, and the optics can prevent the light ray 354C from passing through to the detector. The threshold range of angles can ensure that the optical path lengths of the light rays used in the analysis or analyses of the sample properties are controlled.

The threshold range of angles can be based on one or more factors such as the targeted optical path length. For example, although the light ray 354B could have a longer optical path length than the light ray 354A, the difference between the optical path lengths of the light ray 354A and the light ray 354B may not have a significant effect on the measurement accuracy. The light ray 354C may have an unwanted impact (e.g., the optical path length may be too long, light may have has undergone multiple large-angle scattering events, etc.), so the system can prevent the detector from measuring the light right 354C (and/or prevent the controller from including such information in the analysis). A configuration of optics (for rejecting light with angles outside of the threshold range of angles) can include, but is not limited to, multiple cylinder lenses and a spherical lens with an aperture located between the spherical lens and the detector.

The system can be capable of emitting light that collectively form the launch sheet light beam 353 and capable of selectively measuring light that collectively form the detection sheet light beam 355. As discussed above, light in the plane of the launch sheet light beam 353 and the detection sheet light beam 355 can have optical path length(s) within a threshold range from the targeted optical path length. To account for variations in the sample properties for, e.g., a heterogeneous sample, the system can average the signals indicative of the detected light from the detection sheet light beam 355, where the stripe geometry can allow for increased spatial averaging. Increasing emitted light, detected light, or both can enhance the measurement accuracy (e.g., such that noise can be averaged out). In some examples, the illumination intensity of the emitted light can be uniform. In some examples, the detected light can be processed with some or all of light having the same weight.

Figure 4A:
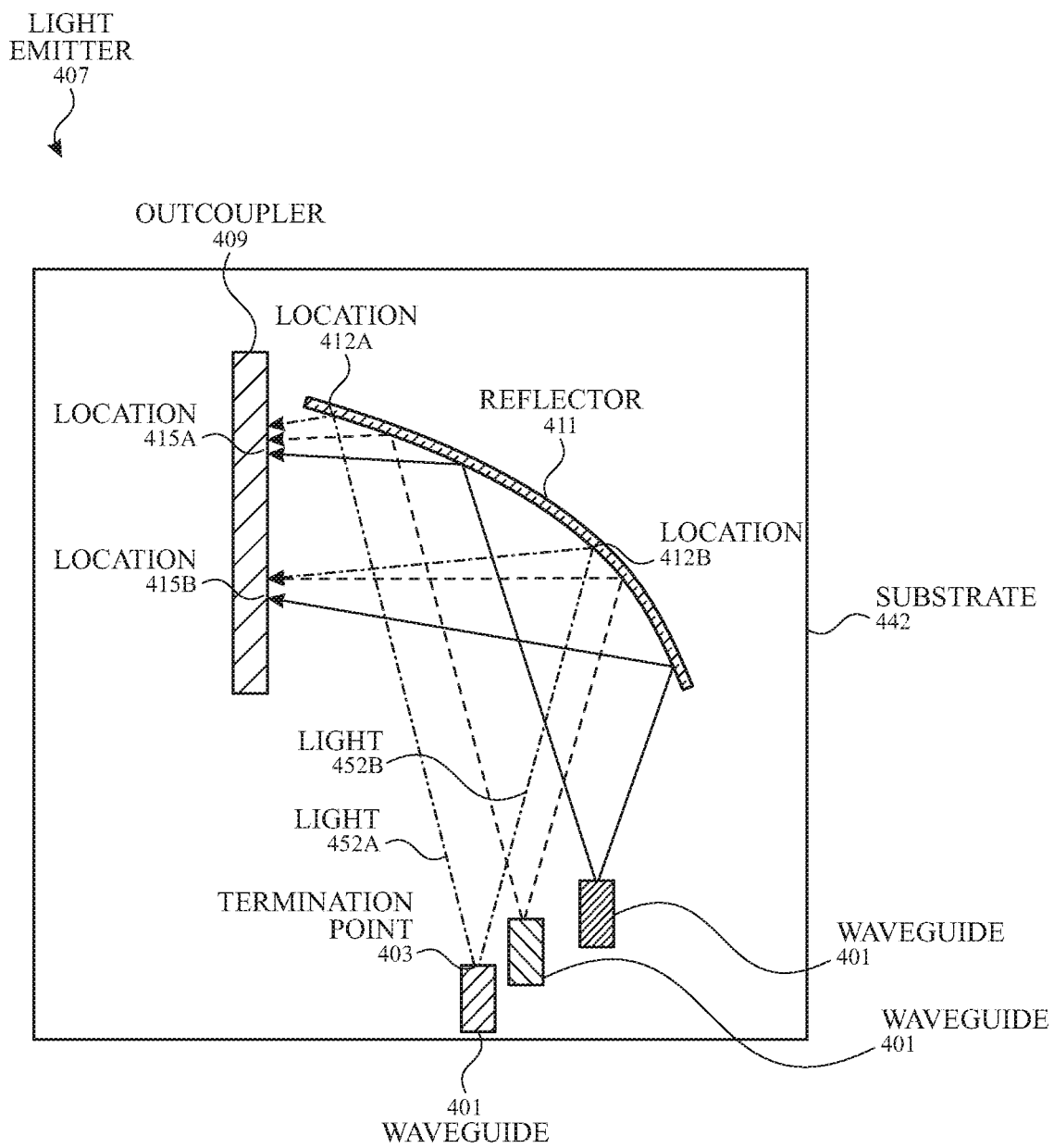
FIGS. 4A-4D illustrate top views of exemplary light emitter configurations for forming a launch sheet light beam according to examples of the disclosure.

FIG. 4A illustrates a top view of an exemplary light emitter configuration for forming a launch sheet light beam according to examples of the disclosure. FIG. 4E illustrates an exemplary process flow for forming a launch sheet light beam using a light emitter according to examples of the disclosure. The light emitter 407 can include one or more waveguides 401, which can be single mode waveguides located in a plane (e.g., plane 513 illustrated in FIG. 5A) of the substrate 442. The waveguides 401 can be terminated at respective termination points 403 for each waveguide, which can be a transition point to a free propagation region. The transition to the free propagation region can cause light output by the waveguides 401 to diffract with a divergence angle (e.g., ±1°, ±2°, ±3°, ±5°, etc.). For example, light from a waveguide 401 can diffract at the termination point 403 to form a divergent light beam including light 452A and light 452B (step 454 of process 450). A layer (not shown) (e.g., a layer including an oxide material) can be disposed on the substrate 442 (e.g., a silicon substrate) to guide light from the waveguides 401 in the plane of the substrate 442, so the diffraction of the emitted light can be limited to in-plane divergence.

The light can be incident on a reflector 411 (step 456 of process 450). The reflector 411 can be a facet (e.g., a parabolic facet) configured to direct (e.g., turn at least some of light by 90°) and collimate the diverged beam towards the outcoupler 409 (step 458 of process 450). The reflector 411 can be an etched and/or metalized material such as a mirror. In some instances, the reflector 411 can have a curved shape, such as a parabolic shape, and can reflect light based on total internal reflection (TIR). The outcoupler 409 can direct the light out of the plane (e.g., perpendicular to the plane of the substrate 442, 60° relative to the plane of the substrate 442, 45° relative to the plane of the substrate 442, etc.) toward optics (e.g., optics 216 illustrated in FIG. 2A), a launch region (e.g., launch region 182 illustrated in FIG. 1), and a sample (e.g., measured sample volume 220 illustrated in FIG. 2A) (step 460 of process 450). In some examples, the outcoupler 409 can include one or more angled facets. In this manner, a collimated beam can be generated in a first plane (e.g., plane 513 illustrated in FIG. 5A) and output in a second plane (e.g., perpendicular to the first plane, 60° relative to the first plane, 45° relative to the first plane, etc.). In some instances, the outcoupler 409 can direct the light out of the plane at a pre-determined angle, which may be selected based on the system design (as discussed below).

The waveguides 401 (and termination points) can be positioned at different locations on the plane of the substrate 442 (as shown), and light exiting the same termination point can be incident on reflector 411 at different locations. That is, the waveguides 401 can be located on the same plane as the reflector 411 and can output light along the same plane, but the light can be incident at different locations along the reflector 411. For example, one waveguide (e.g., left most waveguide 401 shown in the figure) can be located closer to the outcoupler 409 and can output light which may be incident on the reflector 411 at a location closer to the outcoupler 409.

There can be any number (e.g., 1, 3, 16, etc.) of waveguides 401 and termination points. In some examples, light incident at different locations of the reflector 411 can reflect to different locations along the outcoupler 409. For example, light 452A and light 452B can exit the same termination point 403. Light 452A can be incident on the reflector 411 at location 412A and can be directed to location 415A of the outcoupler 409. Light 452B can be incident on the reflector 411 at location 412B and can be directed to location 415B of the outcoupler 409. In some instances, different locations at the outcoupler 409 can be associated with different locations along the sample (e.g., the outcoupler 409 can direct light to a different plane without changing the angles of light). In this manner, light from the same waveguide can pass through the launch region (e.g., launch region 382 illustrated in FIG. 3C) and enter the sample at different locations. Light emitted in the plane of the substrate 442 can cross each other, as illustrated in the figures, and can exit the launch region at multiple angles. In some examples, light from the same waveguide 401 can pass through the launch region at the same location, but can have different angles. In this manner, the system may be configured to measure different locations within the measured sample volume and/or the same location, but with light having different angles.

Figure 4B:
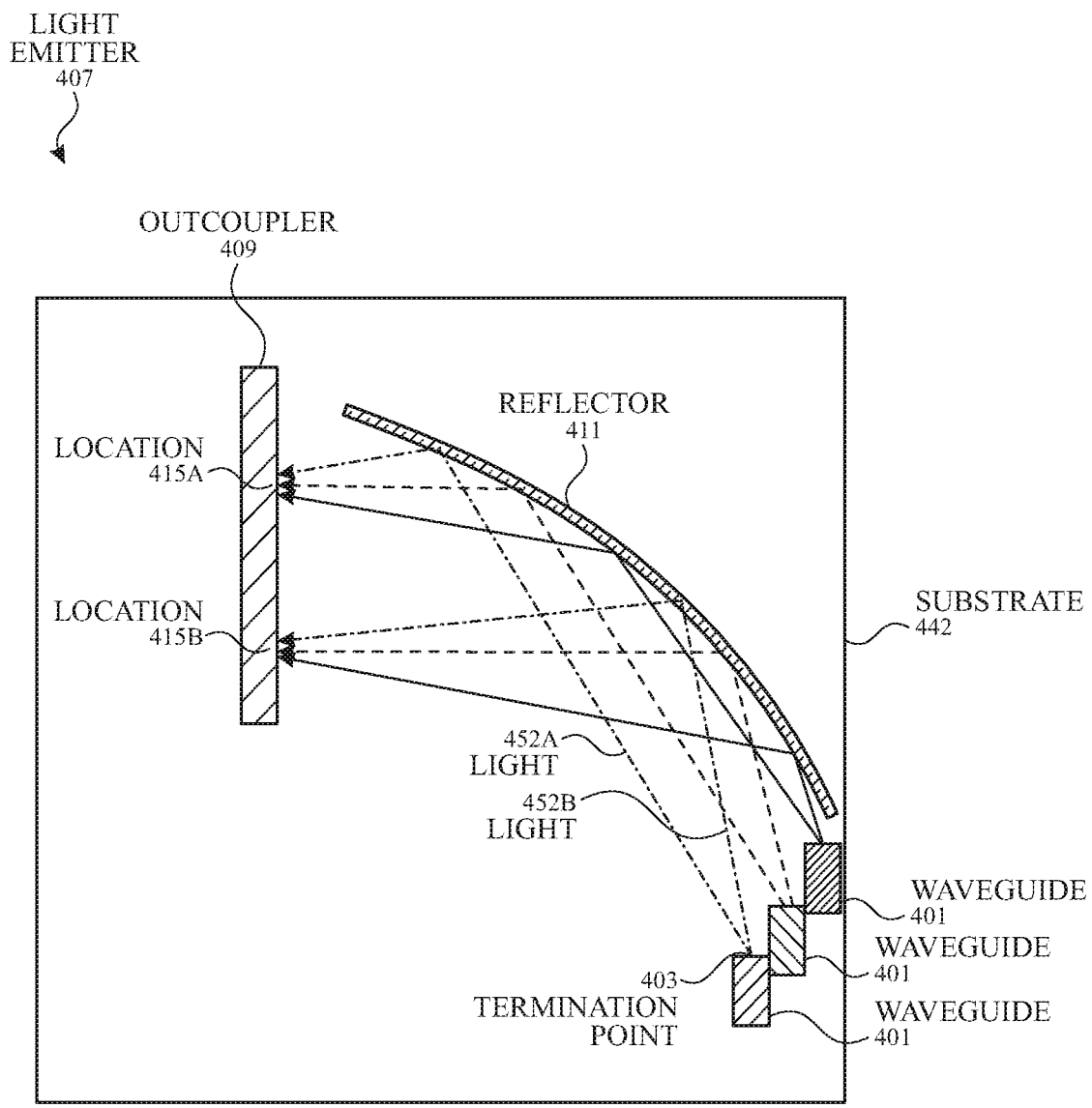

In some examples, the reflector can be configured to turn light by less than 90°, as illustrated in FIG. 4B, due to, e.g., its curvature and/or length. Turning light by less than 90° may lead to a wider spread of light along the outcoupler 409 (and along the sample). The curvature and/or length of the reflector can be configured based on the size of the outcoupler 409, the dimensions of the elongated portion of the launch region, etc. The waveguides 401 can be located, for example, proximate to the reflector 411 and can include facets oriented perpendicular to the outcoupler 409.

Figure 4C:
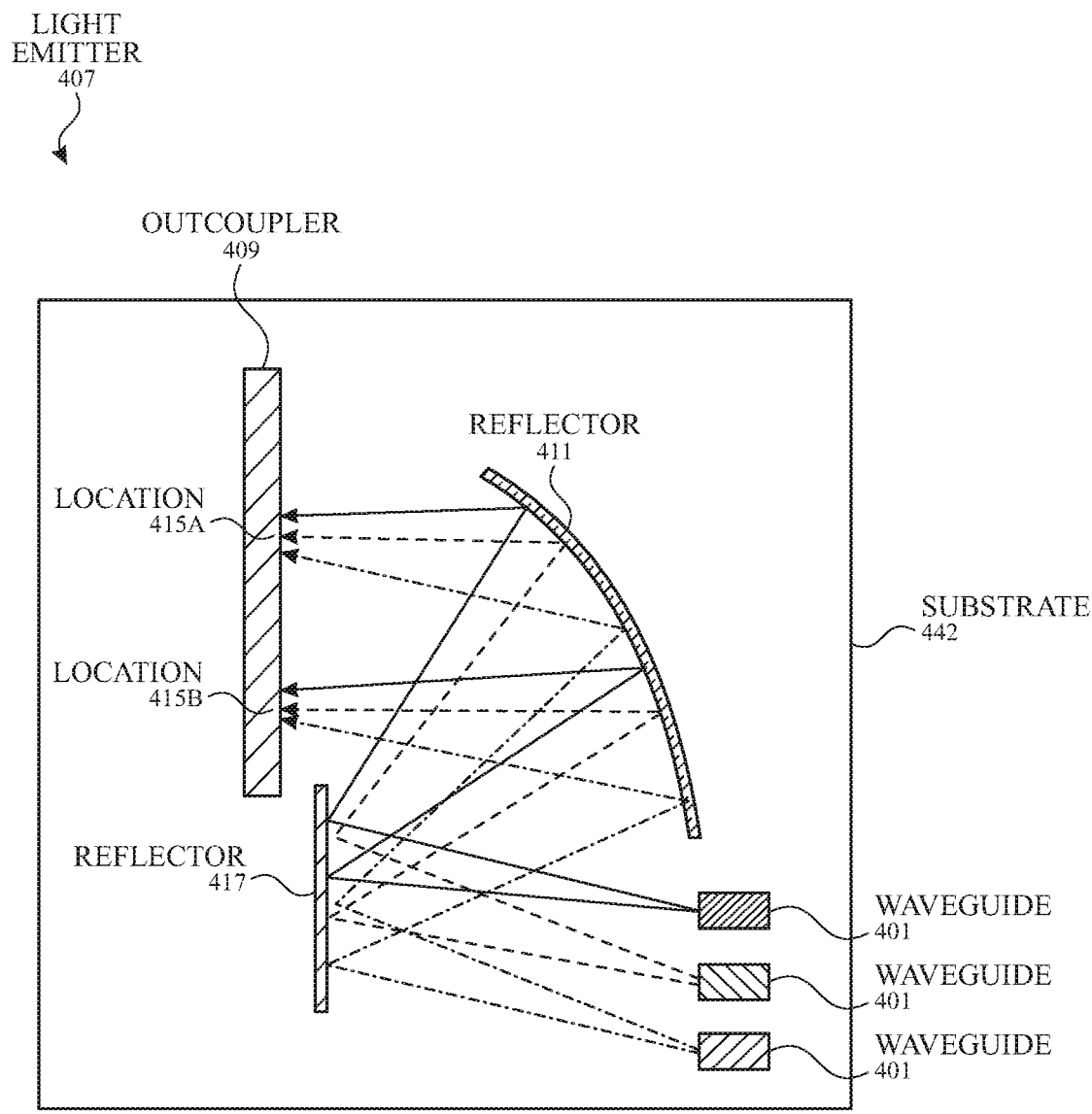

In some examples, the system can include multiple reflectors (e.g., reflector 411 and reflector 417), as illustrated in FIG. 4C. Multiple reflectors can be used to turn light by more than 90° and/or can include multiple turns. In some examples, the facets of the waveguides 401 can be oriented parallel to the outcoupler 409. The waveguides 401 can direct light towards the reflector 417, which can turn light to be incident on the reflector 411. In some instances, the reflector 417 may be a flat mirror, while the reflector 411 may be a parabolic mirror. A configuration including multiple reflectors and multiple turns can be suitable when space is limited.

Figure 4D:
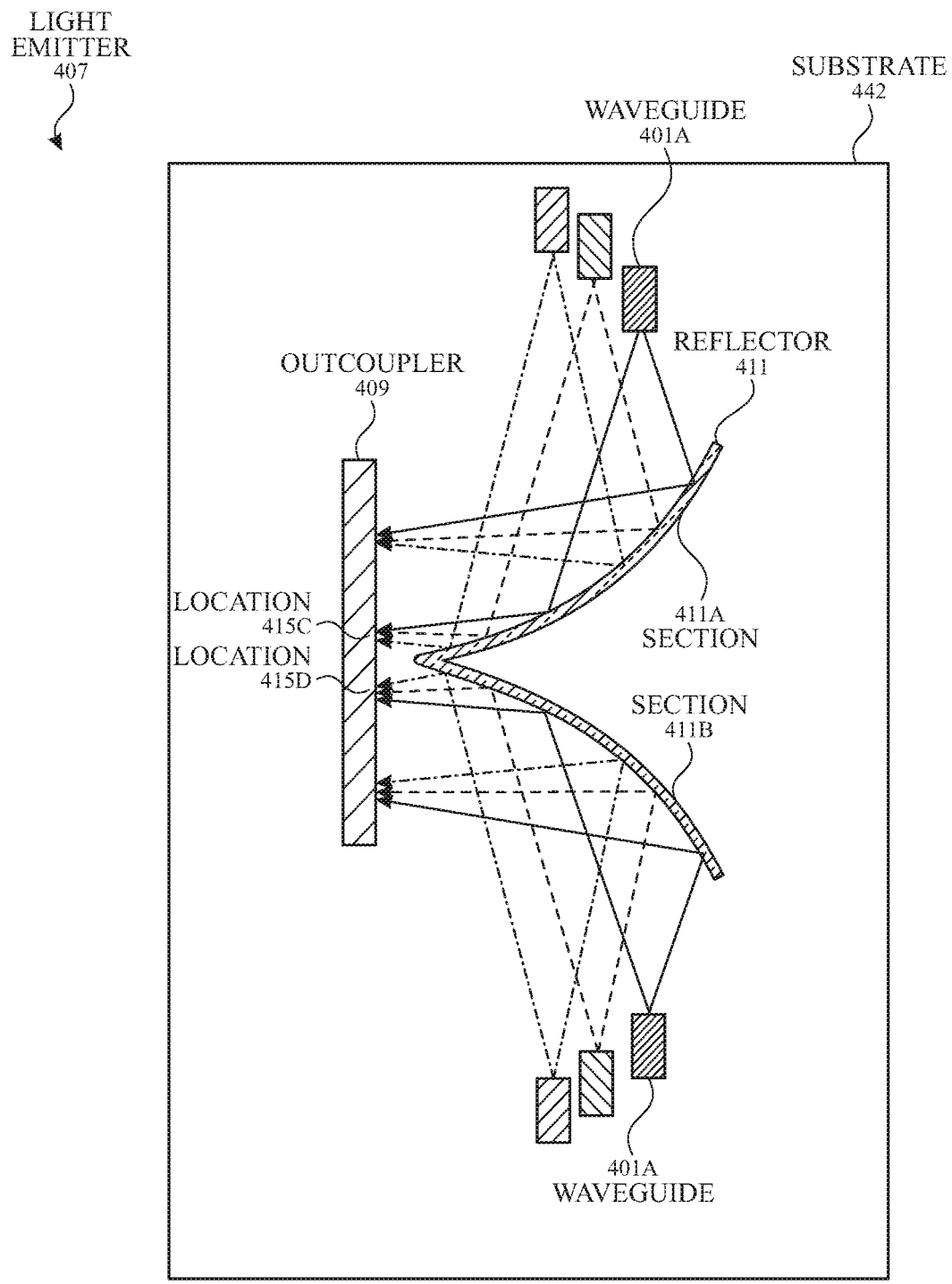
Figure 4E:
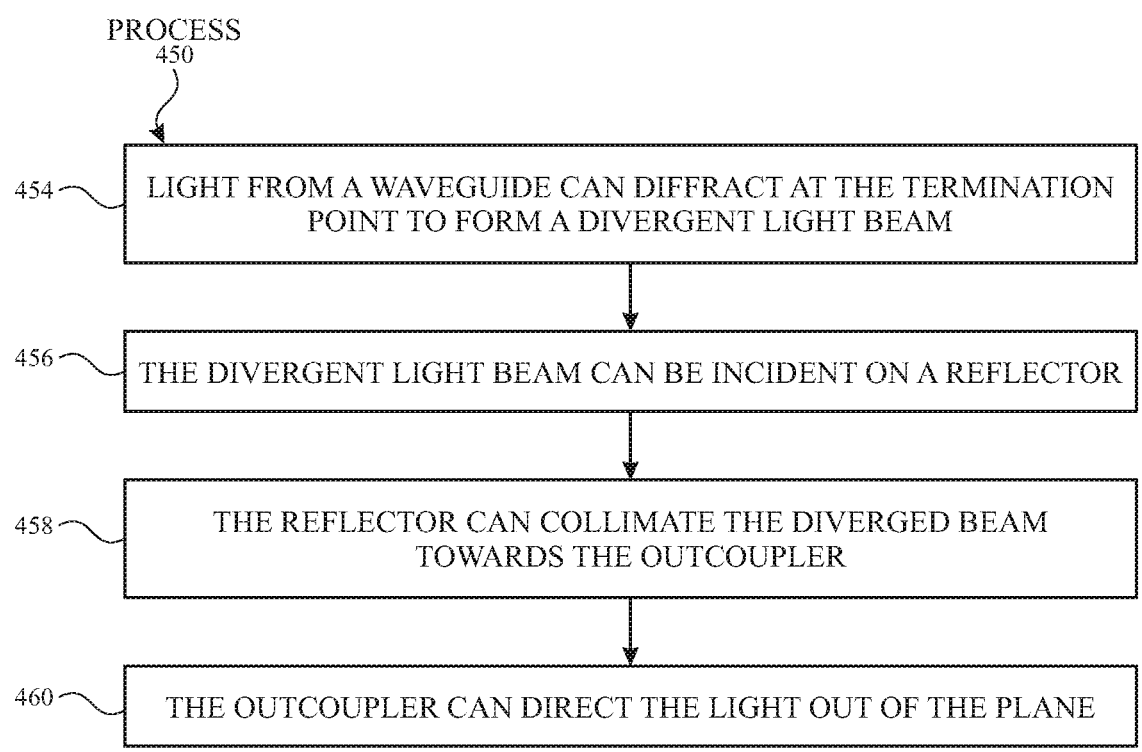
FIG. 4E illustrates an exemplary process flow for forming a launch sheet light beam using a light emitter according to examples of the disclosure.

FIG. 4D illustrates an exemplary configuration where the waveguides may route light from multiple sides (e.g., top and bottom) of the substrate 442. The reflector 411 can include a plurality of sections, such as section 411A and section 411B. The sections may be arranged differently. For example, the section 411A may be arranged with a different (e.g., 90°) principal of axis than the section 411B. The section 411A may direct light from one side (e.g., the top) of the substrate 442 to the outcoupler 409, and the section 411B may direct light from another side (e.g., the bottom) of the substrate 442.

Figure 5A:
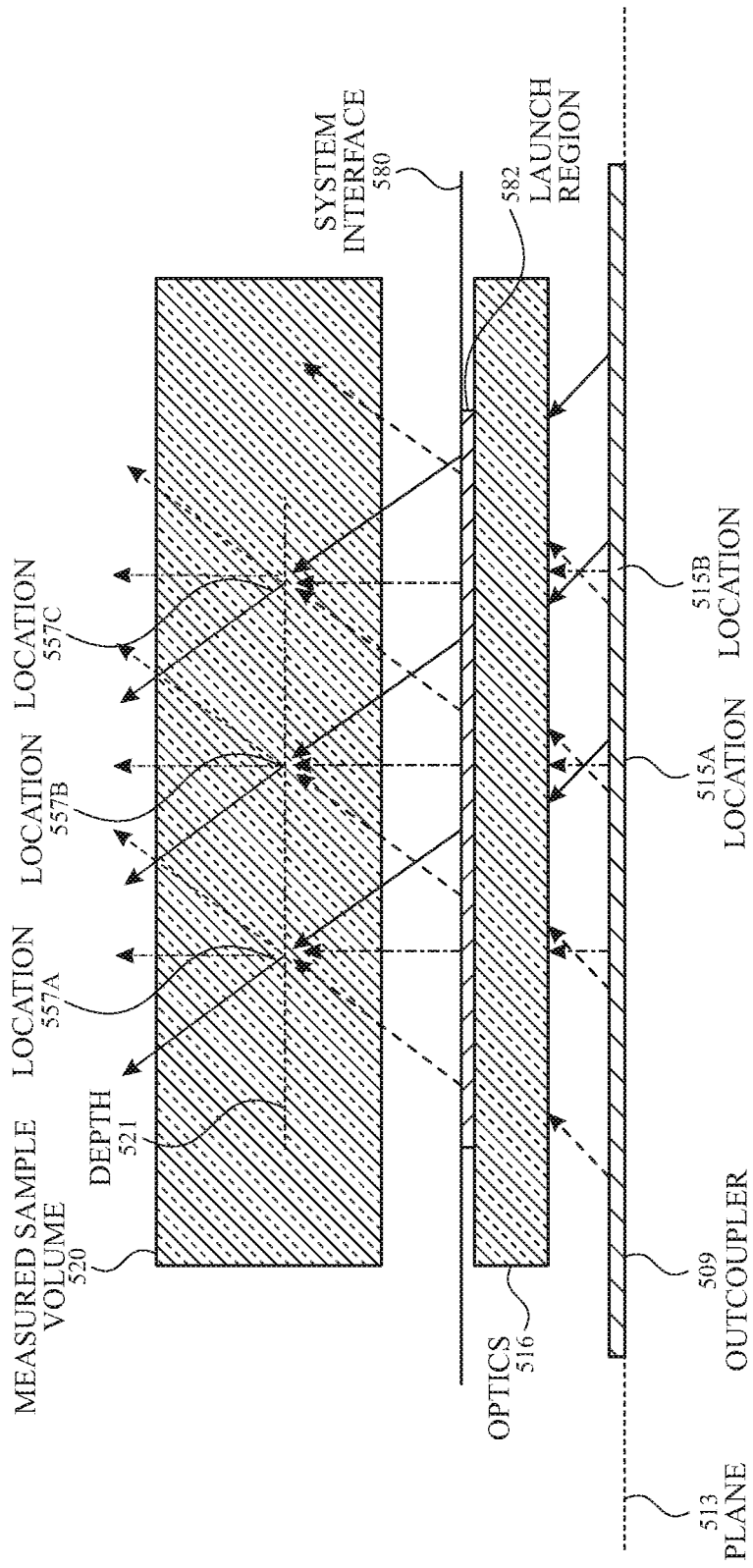
FIG. 5A illustrates a cross-sectional view of an exemplary system configured such that light intersect at a targeted location within the sample according to examples of the disclosure.

The system can be configured based on the intersection points of light having the same optical path lengths. FIG. 5A illustrates a cross-sectional view of an exemplary system configured such that light intersect at a targeted location within the sample according to examples of the disclosure. The outcoupler 509, the plane 513, optics 516, the measured sample volume 520, the system interface 580, and the launch region 582 can be similar to correspondingly labeled elements from the other figures. The waveguides (not shown) can be configured to output light towards the outcoupler 509 at multiple locations (e.g., location 515A and location 515B). Light can pass through optics 516 and can exit the system interface 580 at the launch region 582. Light can intersect at multiple locations (e.g., location 557A, location 557B, and location 557C) within the measured sample volume 520. The locations can have a depth 521. As illustrated in the figure, light, which can have different angles of incidence, can cross at a location and can scatter from their respective locations towards the detector (e.g., detector 130 illustrated in FIG. 1A).

In some examples, the average widths of the light beams in the measured sample volume 520 can be less than the average widths of the light beams at the optics 516. The average widths of the light beams at the optics 516 can be less than the average widths of the light beams at the outcoupler 509 and the reflector (not shown). In some examples, the average widths of the light beams at the detector (not shown) can be less than the average widths of the light beams at the optics 516. In this manner, the detector size (not shown) can be reduced at the tradeoff of a larger outcoupler 509. This configuration (where light intersect within the sample) can be suitable for systems with a moderately sized detector, outcoupler, and launch region. In some examples, the width of the outcoupler 509 can be greater than the width of the optics 516.

Figure 5B:
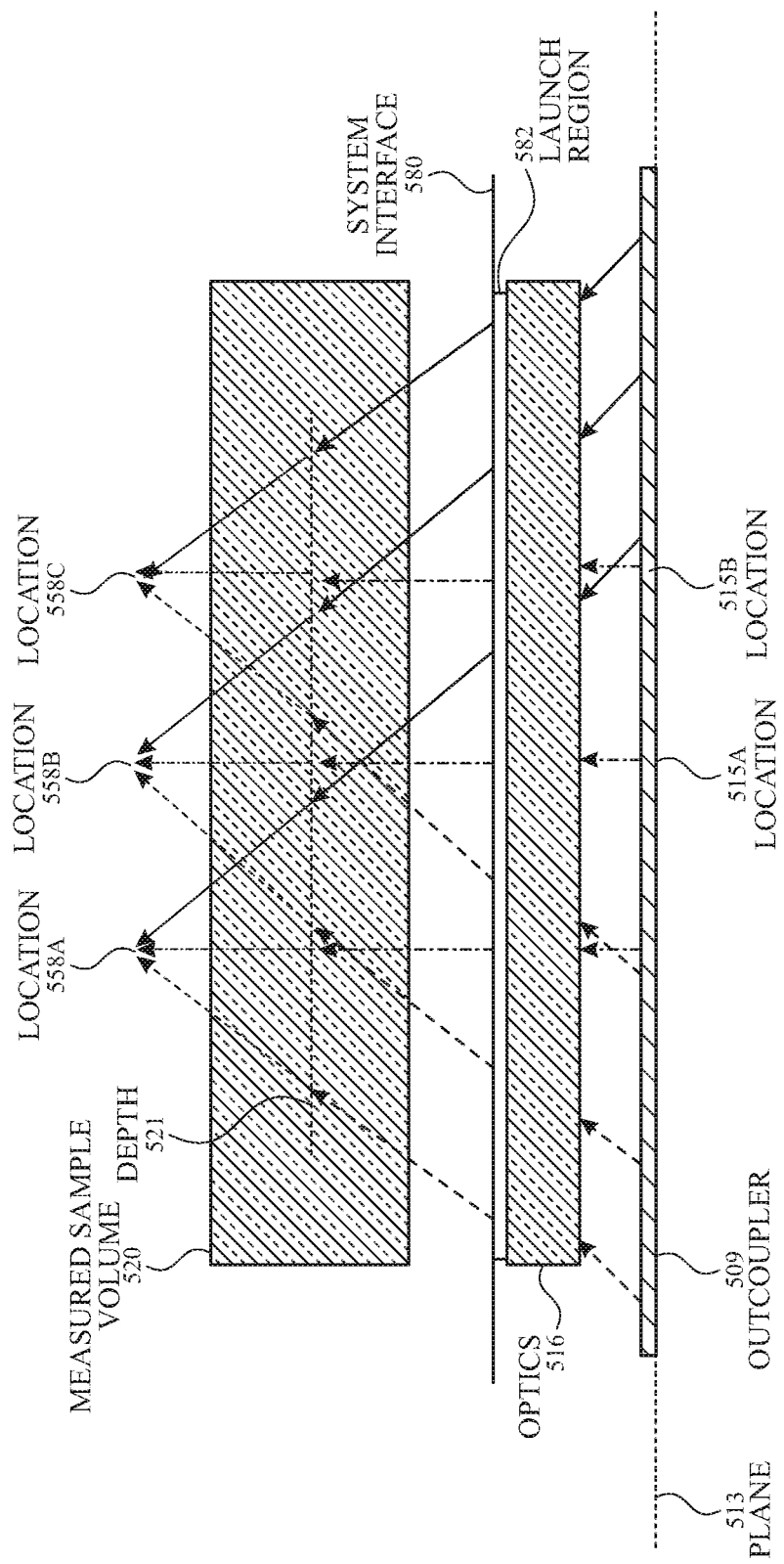
FIG. 5B illustrates a cross-sectional view of an exemplary system configured such that light intersect at the detector according to examples of the disclosure.

Examples of the disclosure include configuring the system such that light intersect at intersection points (e.g., at the detector) after undergo scattering events, as illustrated in FIG. 5B. That is, light may intersect at multiple locations (e.g., location 558A, location 558B, and location 558C) at the detector. Light may cross at the outcoupler 590, optics 516, the launch region 582, and the measured sample volume 520. In some examples, the average widths of the light beams can decrease as the light beams are further away from the reflector (not shown). For example, the average widths of the light beams, optics 516, and/or the outcoupler 509 can be greater than the average widths at the detector within the measured sample volume. In this manner, the detector size (not shown) can be reduced at the tradeoff of a larger outcoupler 509. This configuration (where light intersect at the detector) can be suitable for systems with a small detector and/or large outcoupler.

Figure 5C:
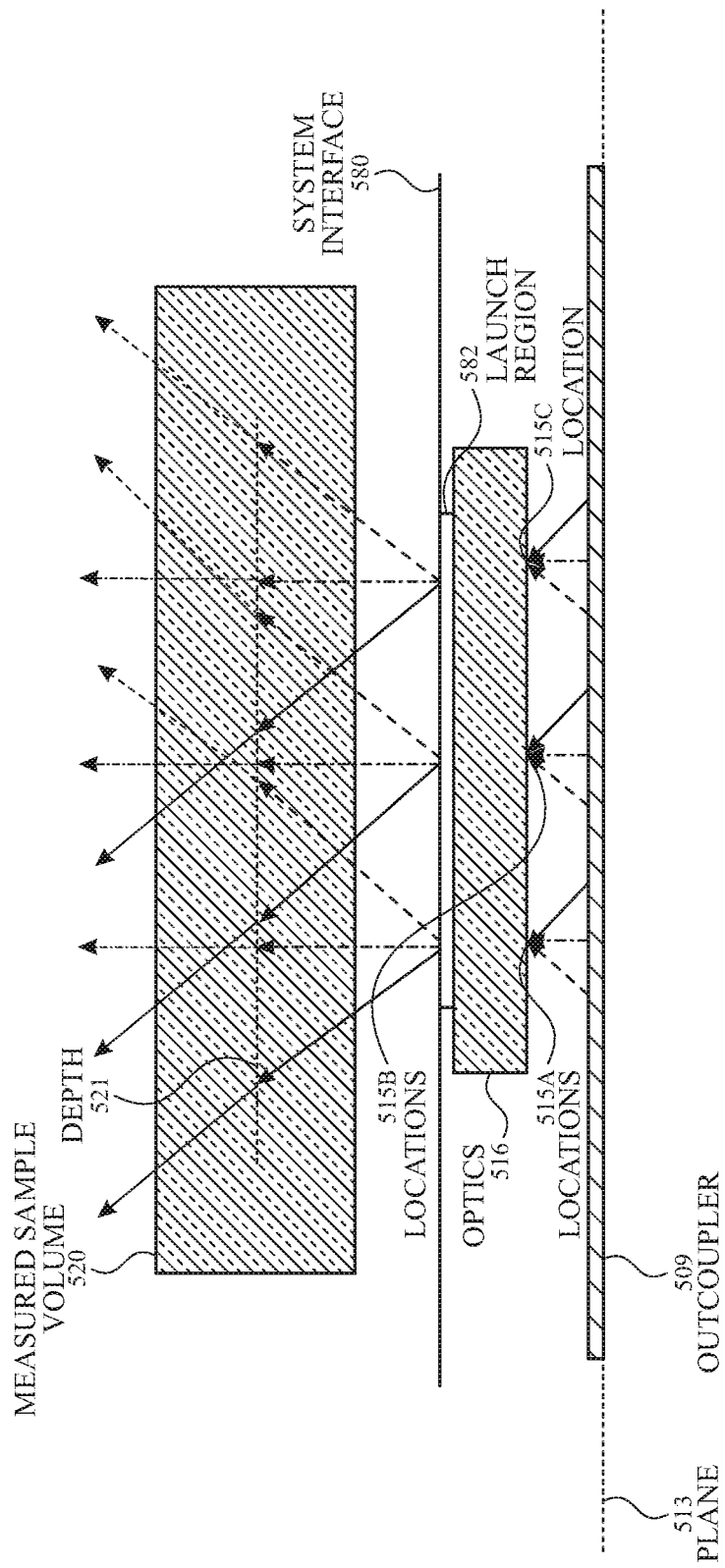
FIG. 5C illustrates a cross-sectional view of an exemplary system configured such that light intersect at the outcoupler according to examples of the disclosure.

FIG. 5C illustrates another exemplary configuration where light intersect at the optics according to examples of the disclosure. Light may intersect at multiple locations, including location 515A, location 515B, and location 515C, along the optics 516. After intersecting, light may diverge creating average widths (of the light beams) that increase after the outcoupler 509. The average widths may be smallest at the outcoupler 509 and largest at the detector (not shown). In this manner, the detector can be larger at the tradeoff of a smaller outcoupler 509, the launch region 582, optics 516, and/or the integrated photonics chip. This configuration (where light intersect at the optics) can be suitable for systems with a larger detector and/or optics. Although FIGS. 5A-5C illustrate configurations where light intersect within the sample, at the detector, and at the optics, examples of the disclosure can include light intersecting at any other locations such as the outcoupler.

In the above-disclosed configurations, examples of the disclosure can include light splitting at the intersection points, where light can split evenly across waveguides. Additionally or alternatively, examples of the disclosure can include the separation distance between the waveguides (e.g., waveguide 401A) and the reflector(s) being equal to the focal length of the reflector. The intersection points can be located a distance equal to the focal length relative to the reflector. The space between the intersection points and the reflector can include the reflector, the outcoupler, the sample, and/or the detector. For example, in FIG. 5A, the intersection points, located at depth 521, can be located a distance away from the reflector equal to the focal length of the reflector. That is, the sum of the separation distance(s) from the reflector to the outcoupler, from the outcoupler to the optics, and from the optics to the target depth in the sample can be equal to the focal length of the reflector. Each distance can be normalized to the refractive index of the respective material(s).

As another example, in FIG. 5B where the intersection points are located at the detector, the separation distance (e.g., accounting for the change in plane at the outcoupler) between the detector and the reflector can be equal to the focal length of the reflector. In this manner, the distance from the reflector to the outcoupler in one plane along with the distance from the outcoupler to the system interface (e.g., the launch region) in another plane, the targeted optical sampling depth, and the distance from the system interface (e.g., the detection region) to the detector can be equal to the focal length of the reflector. In FIG. 5C, the separation distances from the reflector to the outcoupler 509 and from the outcoupler 509 to the optics 516 can be equal to the focal length of the reflector. The sum of the separation distance(s) can be normalized to the refractive index of the respective material(s).

Figure 6A:
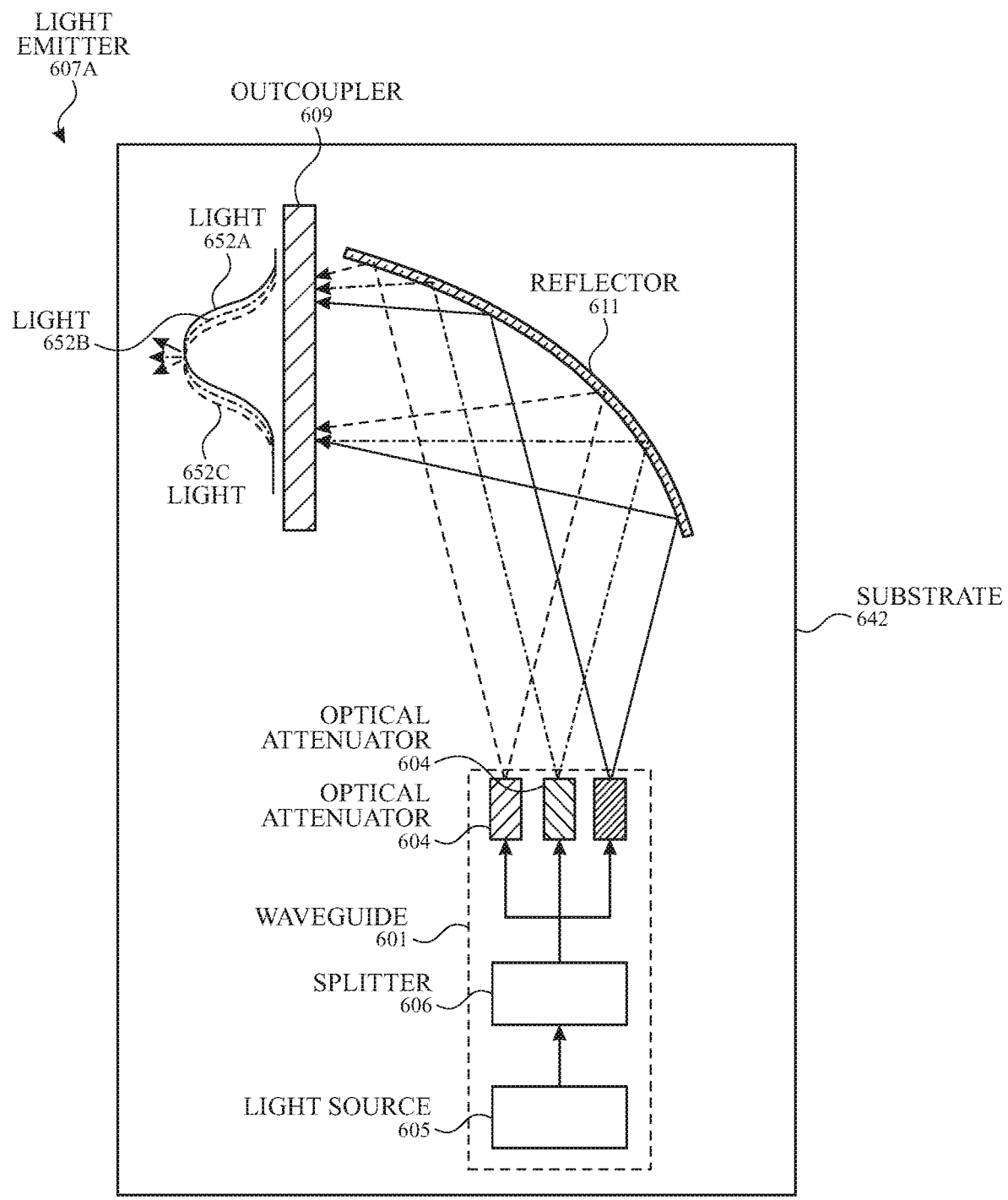
FIGS. 6A-6C illustrate top views of exemplary incoherent light emitters including one or more coherent waveguides according to examples of the disclosure.
Figure 6B:
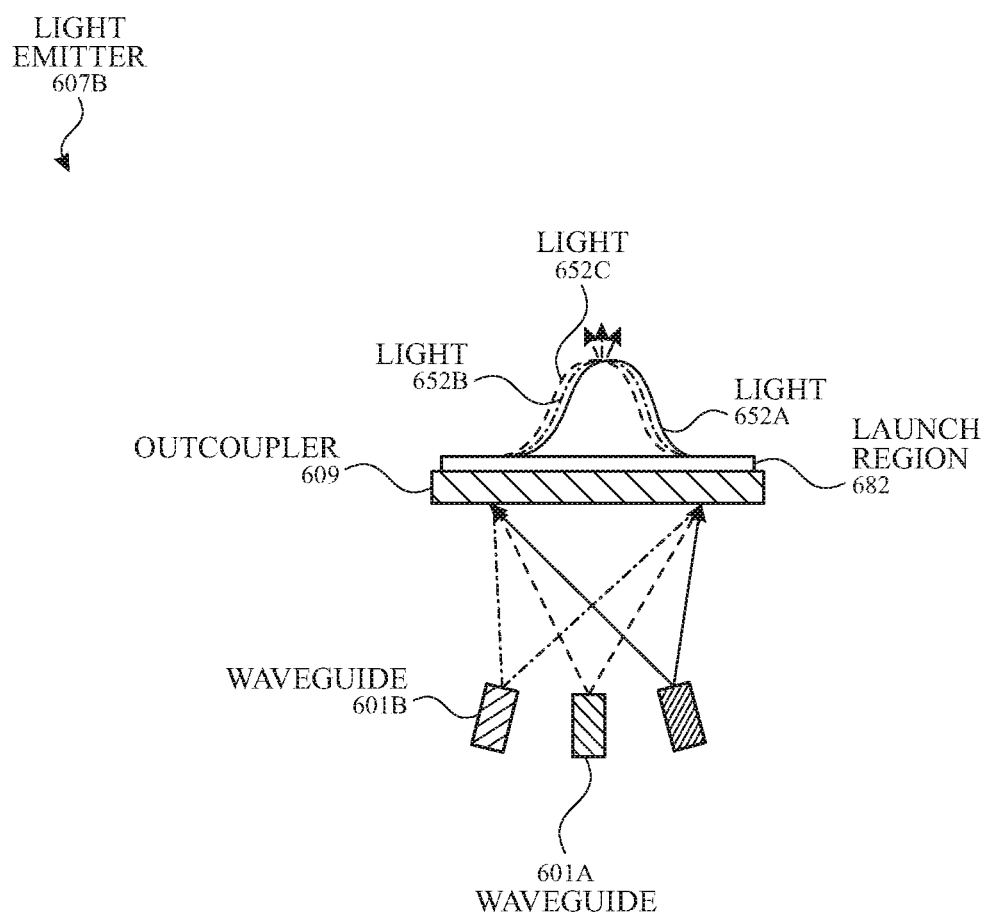
Figure 6C:
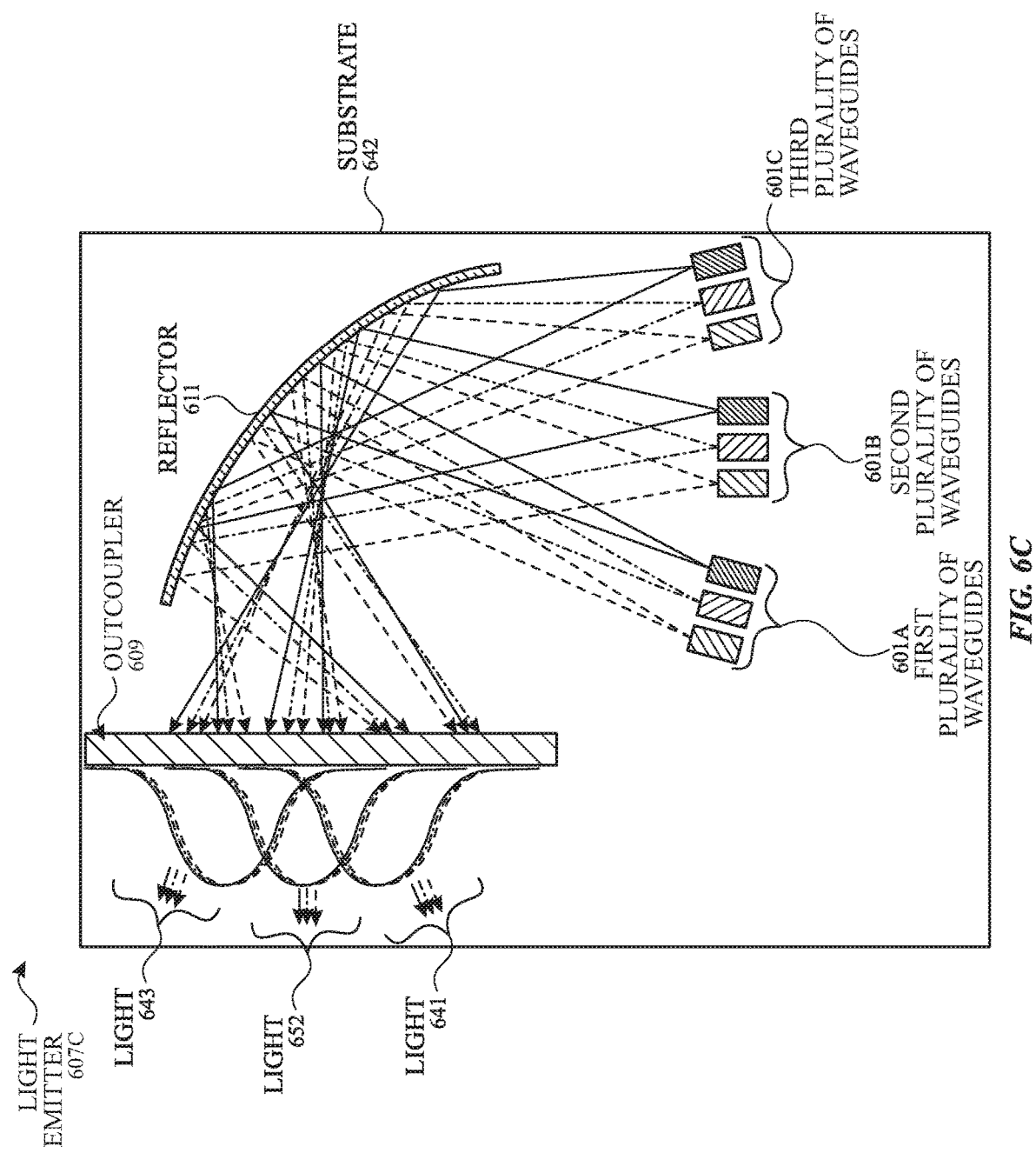

In some instances, the light emitter can include a plurality of coherent sources that collectively approximate an incoherent source. FIGS. 6A-6C illustrate exemplary configurations of an incoherent light emitter including one or more coherent waveguides according to examples of the disclosure. As illustrated in FIG. 6A, light emitter 607A can include an outcoupler 609, a waveguide 601, and a reflector 611, which can be similar to correspondingly labeled elements from the other figures. The waveguide 601 can further include a plurality of optical attenuators 604 and a splitter 606.

A splitter 606 can be optionally included in the light emitter and can be configured to split the light emitted by the light sources 605. In some examples, the light emitted by the light source can be along a first plane. In some examples, the light emitter can include a plurality of discrete light sources (not shown), and the splitter 606 may be omitted. The outputs of the splitter 606 can be fed into the optical attenuators 604. The light emitter 607A can include one or more waveguide termination points (not labeled in the figure), which can be transition points to a free propagation region. The transition to the free propagation region can cause light output by the waveguide 601, e.g., at the optical attenuators 604, to diffract with a divergence angle (e.g., ±1°, ±2°, ±3°, ±5°, etc.).

Light exiting the optical attenuators 604 can be directed by the reflector 611 towards the outcoupler 609. Instead of sequentially outputting light from the waveguides (e.g., by using switches and/or modulators), the light source 607 can output light while the optical attenuators 604 can block or allow light to reach the reflector 611. Alternatively, the light emitter 607A can include one or more phase modulators (not shown) to induce a phase shift (e.g., 180°) in at least one of light.

The light emitter 607A can emit multiple light beams, such as light 652A, light 652B, and light 652C. The system can average the signals to reduce or eliminate the noise pattern. In this manner, the light emitter 607A can be a source that is coherent in one dimension (e.g., in the plane of the substrate 642) and incoherent in another dimension (e.g., in the plane of the light 652A, light 652B, and light 652C). Although the figure illustrates light 652A, light 652B, and light 652C as emitted from the outcoupler 609 in the plane of the substrate 642, examples of the disclosure can include the light beams emitted in other planes (e.g., the plane perpendicular to the plane of the substrate 642). Other exemplary configurations for reducing noise are discussed below.

In some instances, the light emitter may include a multiplexer for spatially combining multiple wavelengths of light. The multiplexer may cause optical losses and/or consume space on the integrated photonics chip. FIG. 6B illustrates an exemplary light emitter with spatially combined wavelengths of light that excludes a multiplexer according to examples of the disclosure. The light emitter 607B can include multiple waveguides 601. The waveguides 601 can include facets placed in close proximity to one another while arranged such that the facets are angled differently with respect to the outcoupler 609. For example, the facet of the waveguide 601A can be oriented parallel to the outcoupler 609, while the facet of the waveguide 601B can be tilted (e.g., 5°) with respect to the same side of the outcoupler 609. Light from at least two of the waveguides 601 can output in different directions, where the differences can create a shift in the light beams, as illustrated with light 652A, light 652B, and light 652C. In some examples, the waveguides 601 can be oriented such that the light beams exit the launch region (e.g., launch region 582 illustrated in FIG. 5A) at different angles. In some examples, the waveguides 601 can be oriented such that the light beams exit at different locations of the launch region. Examples of the disclosure can include one or more reflectors (not shown) to turn light (discussed above).

In some examples, the light emitter can include sets of waveguides, as illustrated in FIG. 6C. The light emitter 607C can include the first plurality of waveguides 601A, the second plurality of waveguides 601B, and the third plurality of waveguides 601C, where the pluralities of waveguides can be oriented such that the facets of the waveguides within a set are angled differently with respect to the other sets of waveguides. For examples, the first plurality of waveguides 601A can be oriented at a first angle with respect to the principal axis of the reflector, while the second plurality of waveguides 601B can be oriented at a second angle, and the third plurality of waveguides 601C can be oriented at a third angle. In some examples, at least two (e.g., all) waveguides included in the same set can output a different wavelength of light. The different wavelengths of light in the same set can create a plurality of light beams (e.g., light 641, light 643, and light 653) each having different wavelengths. In some examples, waveguides within a set can be different, while each set can include the same type of waveguides as the other sets.

In some examples, the plurality of waveguides can be oriented such that the light beams exit the launch region (e.g., launch region 582 illustrated in FIG. 5A) at different angles. For example, light 643 can include a plurality of wavelengths, where at least two of the wavelengths can be output from different waveguides. Light 652 can also include the plurality of wavelengths, where at least two of the wavelengths can be output from different waveguides. Light 652 can exit the launch region at a first angle, while light 643 can exit the launch region at a second angle. In some examples, the pluralities of waveguides 601 can be oriented such that the light beams exit at different locations of the launch region 682.

As discussed earlier, the light emitter can emit light having different angles. In some examples, the different angles can be multiplexed angles. For example, the light emitter can be configured to emit multiple plane waves. Emitting multiple plane waves can be achieved by, e.g., using a collimating parabolic reflector.

Figure 7A:
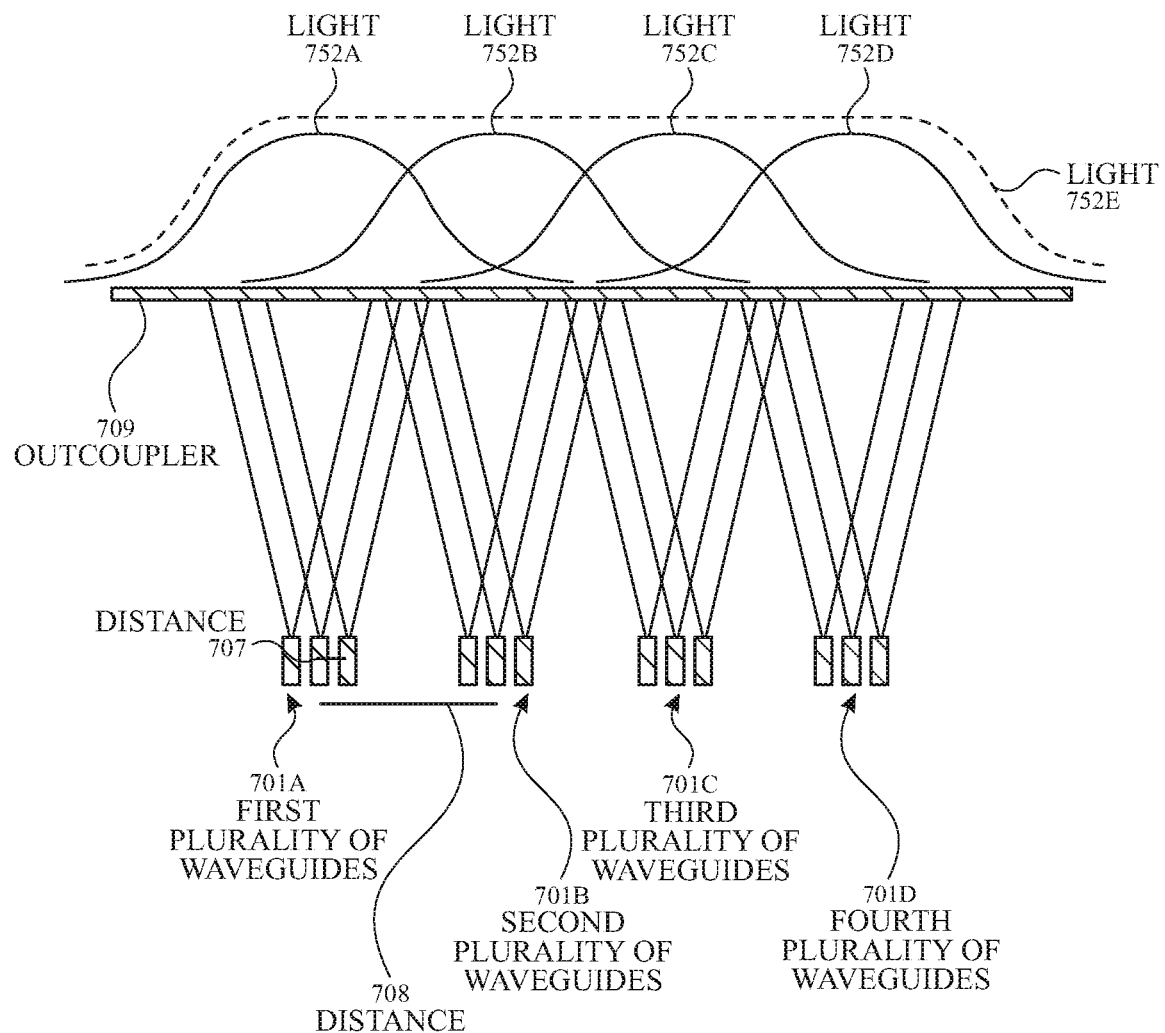
FIG. 7A illustrates an exemplary light emitter configuration where light collectively form a flat intensity distribution according to examples of the disclosure.
Figure 7B:
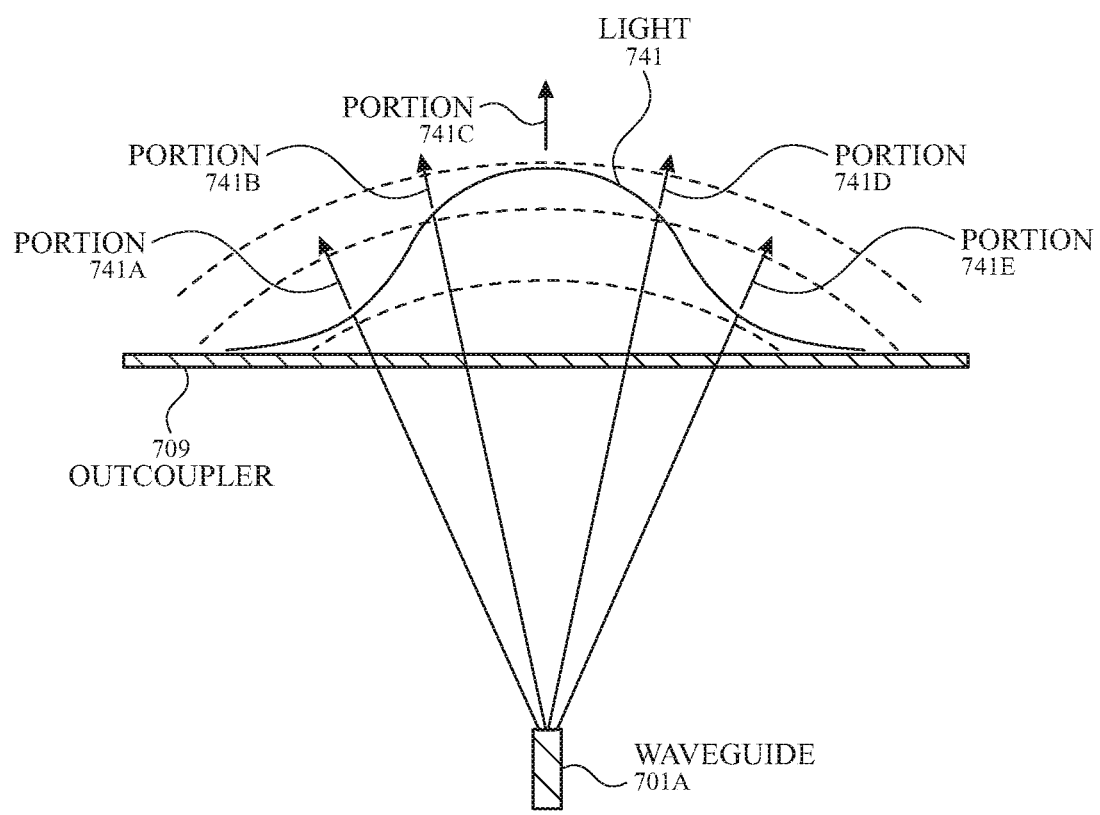
FIG. 7B illustrates an exemplary light emitter configuration having a spherical wavefront including multiple portions pointing in different directions according to examples of the disclosure.
Figure 7C:
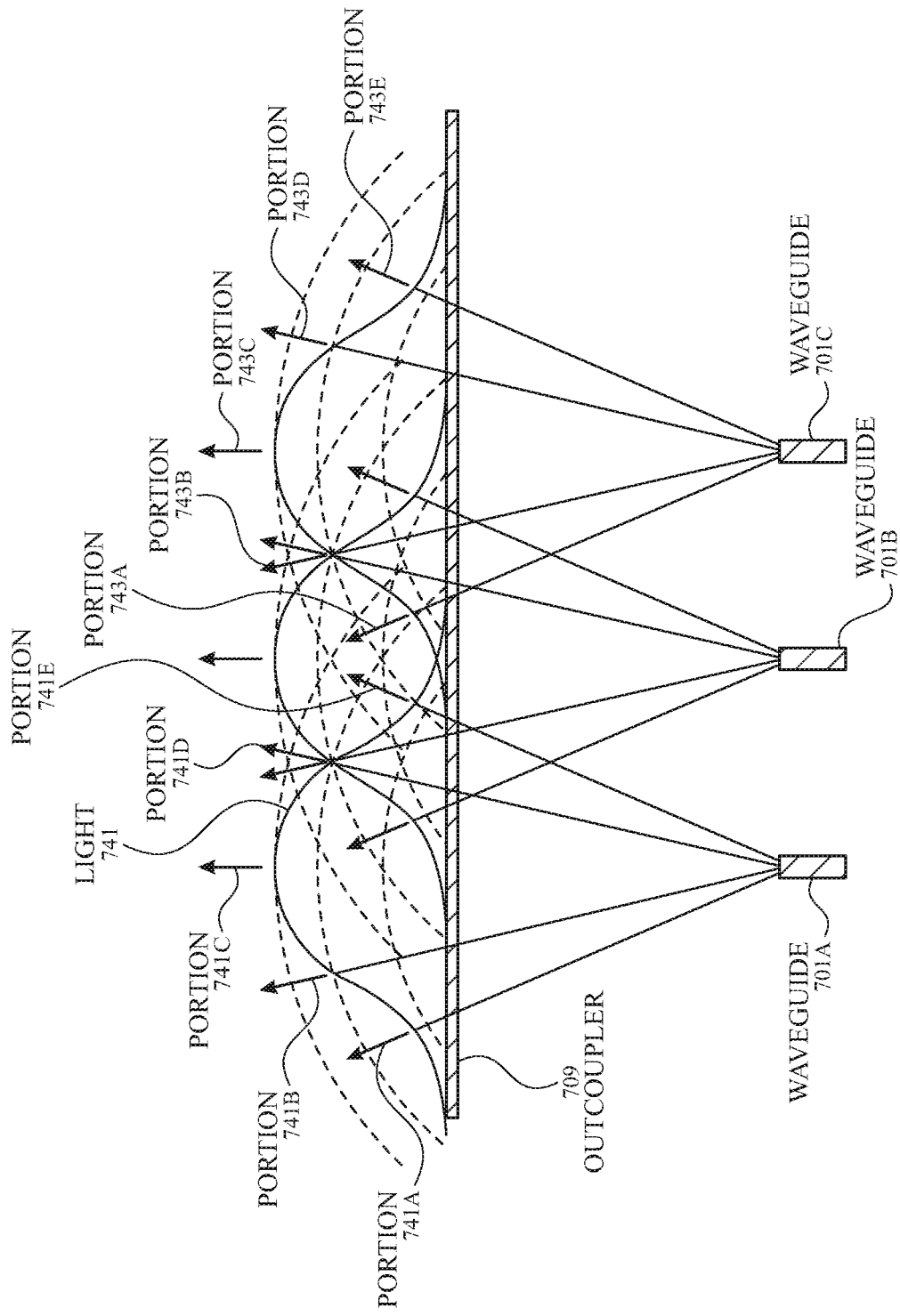
FIG. 7C illustrates an exemplary light emitter capable of emitting light at multiple angles and along multiple locations according to examples of the disclosure.

In some examples, the light emitter can be configured to emit multiple spherical waves, as shown in FIGS. 7A-7C. FIG. 7A illustrates an exemplary light emitter configuration where light can collectively form a flat intensity distribution according to examples of the disclosure. The light emitter can include one or more sets of waveguides (e.g., a first plurality of waveguides 701A, a second plurality of waveguides 701B, a third plurality of waveguides 701C, and a fourth plurality of waveguides 701D). Each set of waveguides 701 can be configured to output light having a wavefront toward the outcoupler 709, which can direct the wavefront in a different plane, for example. For example, the plurality of first waveguides 701A can form light 752A, and the plurality of second waveguides 701B can form light 752B. Similarly, the third plurality of waveguides 701C can output light 752C, and the fourth plurality of waveguides can output light 752D. Although not shown in the figure, each waveguide within a set (e.g., the first plurality of waveguides 701A) may form a different wavefront, where the different wavefronts may be shifted slightly in output location.

Light 752A, light 752B, light 752C, and light 752D can collectively form light 752E. In some examples, the distances between adjacent sets of waveguides can be such that light 752E has a flat (e.g., less curvature than the wavefronts of light 752A, light 752B, light 752C, and light 752D) wavefront. One or more parameters of the configuration can be adjusted to achieve certain properties for light 752E. The one or more parameters can include, but are not limited to, the spacing between waveguides within a set (e.g., distance 707, which can be based on a decorrelation distance), the spacing between sets of waveguides (e.g., distance 708), the number of waveguides, the total width of a given set of waveguides (e.g., can be based on the size of the outcoupler 709), the width of a waveguide, the dimensions (e.g., length) of the free-propagation region, the waveguide tilt, the waveguide facet tilt, and the waveguide steering. Additionally or alternatively, each waveguide within a set can be configured to output a different range of wavelengths.

FIG. 7B illustrates an exemplary light emitter configuration having a spherical wavefront including multiple portions pointing in different directions according to examples of the disclosure. The waveguide 701A can be configured to output light 741. Light 741 can include a plurality of portions such as portion 741A, portion 741B, portion 741C, portion 741D, and portion 741E. The spherical wavefront of each diffracting beam from waveguide 701A can cause each portion to be directed towards a different direction. For example, the portion 741A can be directed at a divergence angle of 30° relative to the portion 741C. The divergence angle may be determined by the waveguide design (e.g., width) and optical wavelength, for example.

Multiple waveguides and the corresponding portions of the spherical wavefront pointing in different directions can be combined to form a light emitter capable of emitting light at multiple angles and along multiple locations, as illustrated in FIG. 7C. For example, the spherical wavefront of light output by the waveguide 701A can include a portion 741B directed at a first angle and towards a first location. The spherical wavefront of light output by the waveguide 701C can include a portion 743B directed at the same first angle, but towards a second location, different from the first location. As another example, the spherical wavefront of light output by the waveguide 701B can include a portion 741E directed at a second angle and towards a second location. The spherical wavefront of light output by waveguide 701C can include a portion 743D directed at the same second location, but at a third angle, different from the second angle. In some examples, the one or more light emitter configurations discussed above can include one or more reflectors (not shown).

Noise

In some examples, optical measurements can include noise. Noise can take multiple forms including incoherent and coherent. Incoherent noise can be due to diffuse scattering that may occur as light transmits through the sample, and its properties may be independent of the phases of light incident on the detector. In some instances, the sample may be inhomogeneous, where the sample properties may vary across different volumes in the sample. The inhomogeneity of the sample may contribute to incoherent noise through random distributions of diffuse scattering and more. Incoherent noise may also vary depending on wavelength. Coherent noise can be due to, e.g., speckle, and its properties can depend on the phases of light incident on the detector along with the spectral density of the source power. In some architectures, both incoherent and coherent noise may be present and may be with varying percentages. An optical sampling architecture capable of reducing both incoherent and coherent noise may be desired.

Figure 8:
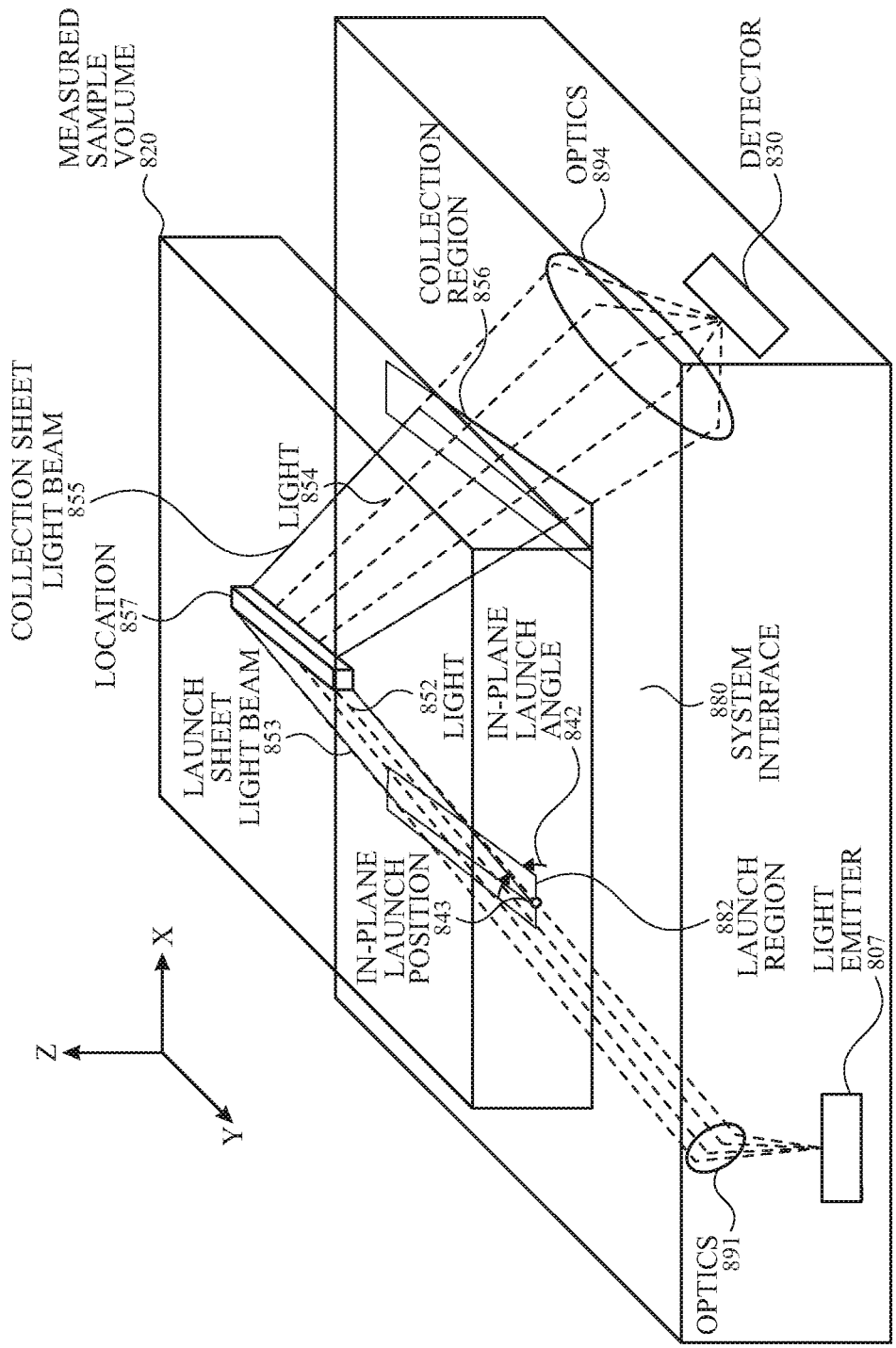
FIG. 8 illustrates a planar view of an exemplary system interface and sample according to examples of the disclosure.

FIG. 8 illustrates a planar view of an exemplary system interface and sample according to examples of the disclosure. FIG. 8 may be similar to FIG. 2 and may illustrate additional components included in the system such as the light emitter, optics, the detector, etc. The system interface 880 can include a launch region 882 and a detection region 856, where the regions can be configured such that one dimension is elongated relative to the other dimension. For example, the launch region 882 can be rectangular (i.e., a stripe geometry) with the y-dimension being elongated relative to the x-dimension. For example, the launch region 882 can have a length that is multiple factors (e.g., 10, 15, 20, 25, etc.) greater than its width.

The light emitter 807 can be configured to generate light 852, where optics 891 can direct, collimate, focus, and/or magnify light 852. Optics 891 can include, for example, collimating optics and/or an outcoupler (discussed below). In some examples, light 852 can collectively form a launch sheet light beam 853 (instead of a linear light beam). The launch sheet light beam 853 can be formed by a single light emitter or multiple light emitters. In some examples, the system can be configured (e.g., by including spherical or cylindrical lenses) such that some or all of light 852 can be oriented parallel or within a spreading range (e.g., within ±5°) from each other.

The launch sheet light beam 853 can exit the system through the launch region 882. The angle and position that light 852 exits at the launch region 882 along the x-plane can be referred to as the in-plane launch angle 842 and in-plane launch position 843, respectively. The angle and position that light 852 exits at the launch region 882 along the y-plane can be referred to as the out-of-plane launch angle and the out-of-plane launch position, respectively (not shown).

Light may undergo one or more small-angle scattering events before reaching the location 857. Light (e.g., light 852) included in the launch sheet light beam 853 can undergo a single large-angle scattering event at the location 857 within the measured sample volume 820. The distribution of light 852 can be along the elongated y-direction. In this manner, light 852 can extend in the y-direction creating a scatter voxel within the measured sample volume 820 at location 857. The scatter voxel can be the volume within the measured sample volume 820 where the launch sheet light beam 853 intersects with the detection sheet light beam 855.

In some examples, the scatter voxel at location 857 can be longer (e.g., in the y-dimension) than the launch region 882 due to spreading of light 852. For example, the scatter voxel can be 0.5 mm longer in the y-dimension than the launch region 882. The spreading may be due to one or more scattering events causing a change in angles of some of the light. Some of light 852 included in the launch sheet light beam 853 can reflect at the location 857 to form light 854. Light 854 can collectively form at least a portion of the detection sheet light beam 855 (instead of a linear light beam). In some instances, light 854 included in the detection sheet light beam 855 can undergo multiple small-angle scattering events before reaching the detection region 856.

The detection region 856 and/or the optics 894 can constrain or select light in the plane of the detection sheet light beam 855. The detection sheet light beam 855 can enter the system through the detection region 856. The detection region 856 can be configured such that one dimension is elongated relative to the other dimensions. The elongated dimension can be the y-dimension, which can be the same elongated dimension as that of the launch region 882. In some examples, the size and shape of the launch region 882 and the detection region 856 can be the same. In some examples, the detection region 856 can be longer (e.g., in the y-dimension) than the launch region 882 to collect more light that may undergo multiple small-angle scattering events. A detector 830 can receive the detection sheet light beam 855 and can generate one or more signals indicative of the detection sheet light beam 855.

Outcoupler Array Geometry

In some instances, optical measurements can include noise. Noise can take multiple forms including incoherent and coherent. Incoherent noise can be due to diffuse scattering that may occur as light transmits through the sample, and its properties may be independent of the phases of light incident on the detector. The correlation may be a property determined by the sample, and may not be an inherent property of the light beams. Properties determined by the sample can include, but are not limited to, decorrelation angles, decorrelation distances, etc. In some instances, the sample may be inhomogeneous, where the sample properties may vary across different volumes in the sample. The inhomogeneity of the sample may contribute to incoherent noise through random distributions of diffuse scattering and the like. Incoherent noise may also vary depending on wavelength. Coherent noise can be due to, e.g., speckle, and its properties can depend on the phases of light incident on the detector along with the spectral density of the source power. In some architectures, both incoherent and coherent noise may be present and may be with varying percentages.

Figure 9A:
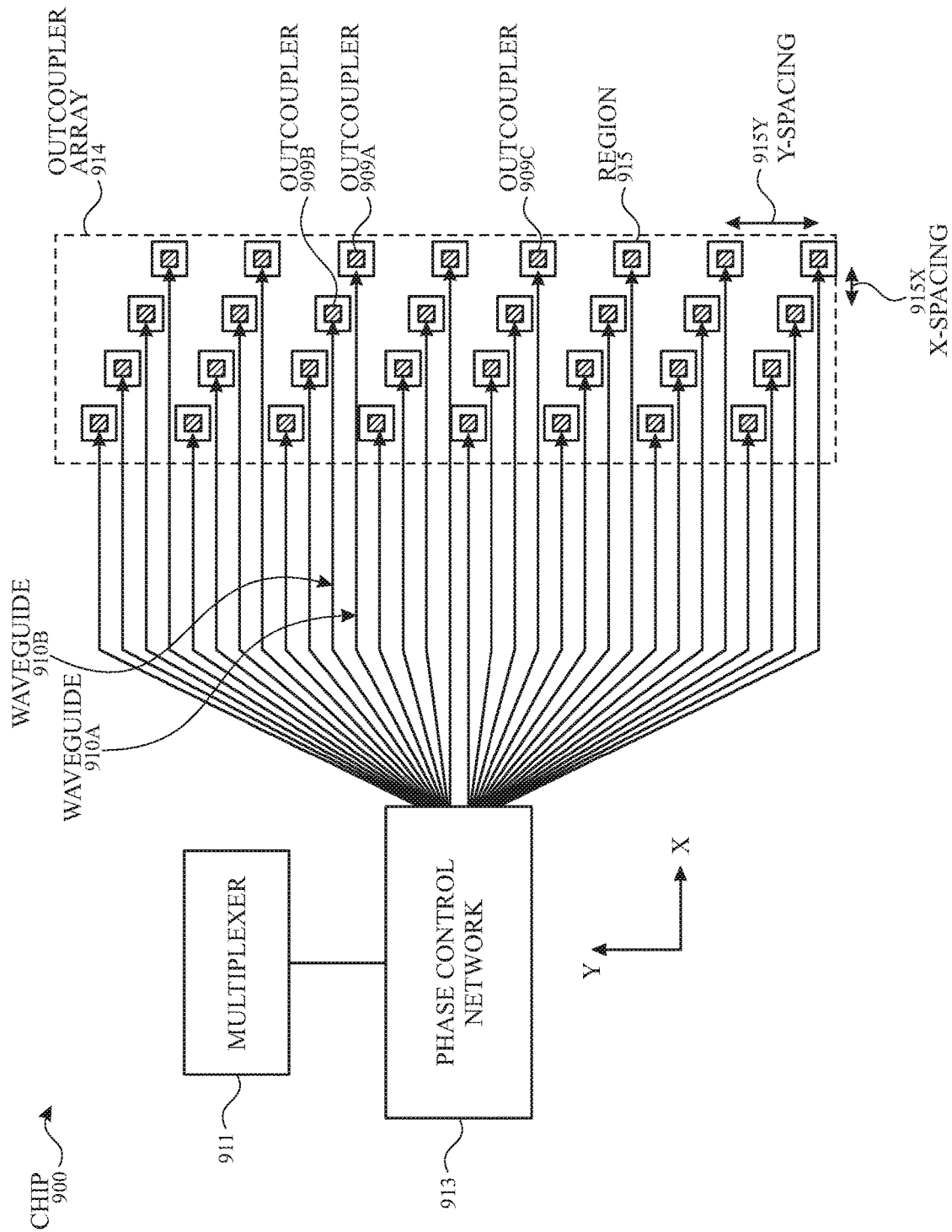
FIG. 9A illustrates a top view of an exemplary integrated photonics chip including an outcoupler array according to examples of the disclosure.

One way to reduce incoherent noise can be to sum together multiple, uncorrelated light beams, which can be created by using an outcoupler array. FIG. 9A illustrates a top view of an exemplary integrated photonics chip including an outcoupler array according to examples of the disclosure. The chip 900 can include multiple components including, but not limited to, a multiplexer 911, a phase control network 913, and an outcoupler array 914. The multiplexer 911 can receive light and can be configured to selectively output one or more light rays. In some examples, the multiplexer 911 can be connected to a light emitter and/or phase control network 913 using one or more optical traces. The phase control network 913 (discussed in more detail below) can be configured to receive one or more light rays from the multiplexer 911 and can be configured to control the phase of at least some of the one or more light rays. The phase control network 913 can output light to the outcoupler array 914 using one or more waveguides 910.

The outcoupler array 914 can include a plurality of outcouplers 909. The outcoupler array 914 can include a high-etendue outcoupler array geometry. The high etendue can include both spatial and angular spreading. The plurality of outcouplers 909 can be configured to redirect received light, which can be light that has propagated through the one or more waveguides 910. In some instances, the integrated photonics chip can be arranged such that light emitted from the one or more light emitters can propagate through one or more waveguides in one plane (e.g., x-y plane) and can be redirected to another plane (e.g., y-z plane) by the plurality of outcouplers 909.

The outcoupler array 914 can create light beams having multiple different launch positions. One exemplary arrangement for creating different in-plane launch positions can be a staggered arrangement, such as shown in the FIG. 9A. The staggered arrangement can include two adjacent outcouplers 909 have different locations (i.e., launch position) along the x-dimension. For example, outcoupler 909A and outcoupler 909B may be located in different locations along the x-dimension. As such, the outcoupler 909A may have a longer waveguide 910A than the waveguide 910B coupled to the outcoupler 909B. The staggered arrangement can include sets of a plurality of staggered outcouplers 909, where the outcouplers 909 within a set are staggered with respect to the outcouplers 909 included in the same set, as shown in the figure. Examples of the disclosure can include the outcouplers 909 of different sets having the same location in the x-dimension, but different locations in the y-dimension. For example, the outcoupler 909A can have the same x-dimension as the outcoupler 909C, but the two outcouplers can be included in different sets. As an example, the figure illustrates the outcoupler array 914 as including eight sets, each set having four outcouplers 909.

Figure 9B:
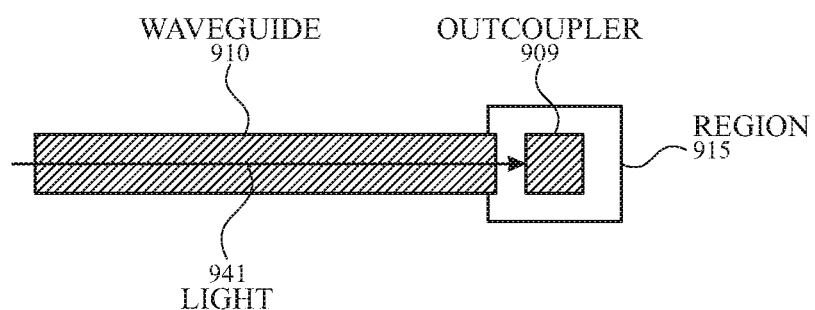
FIGS. 9B-9C illustrate top and cross-sectional views, respectively, of an exemplary outcoupler and waveguide according to examples of the disclosure.
Figure 9C:
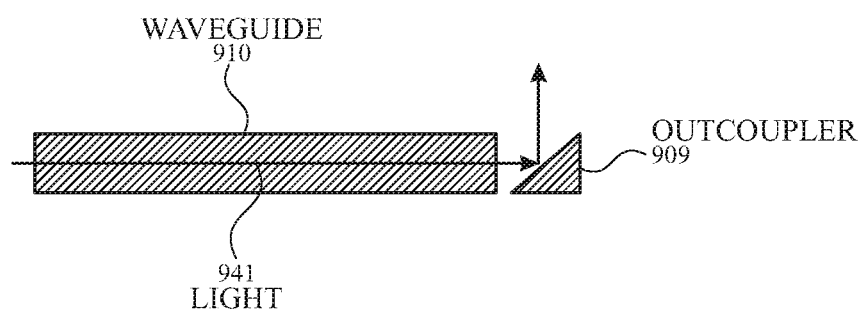

FIGS. 9B-9C illustrate top and cross-sectional views, respectively, of an exemplary outcoupler and waveguide according to examples of the disclosure. The waveguide 910 can be configured to propagate light 941 emitted by one or more light emitters in one plane. Light 941 can exit the waveguide 910 at a termination point and can be incident on a reflecting surface of the outcoupler 909. The outcoupler 909 can redirect light 941 to another plane towards, e.g., the system interface (e.g., system interface 880 illustrated in FIG. 8). One or more of the plurality of outcouplers 909 can have a region 915. The region 915 can be an area of the chip 900 where other components, such as other outcouplers 909, waveguides 910, etc., may be excluded.

The one or more waveguides 910 can have a minimum spacing. Referring back to FIG. 9A, the spacing between the center of adjacent waveguides can be x-spacing 915X, for example. The spacing between the centers of two adjacent waveguides having the same x-location (e.g., same column) can be referred to as y-spacing 915Y. In some instances, at least one region 915 may have a separation distance, along one or both dimensions (e.g., x- and y-dimensions), equal to the minimum required spacing between waveguides 910. Examples of the disclosure can include a separation distance of the launch positions being more than the correlation length of position-dependent scattering variations (e.g., coherent or incoherent noise) sources within the sample.

Figure 10:
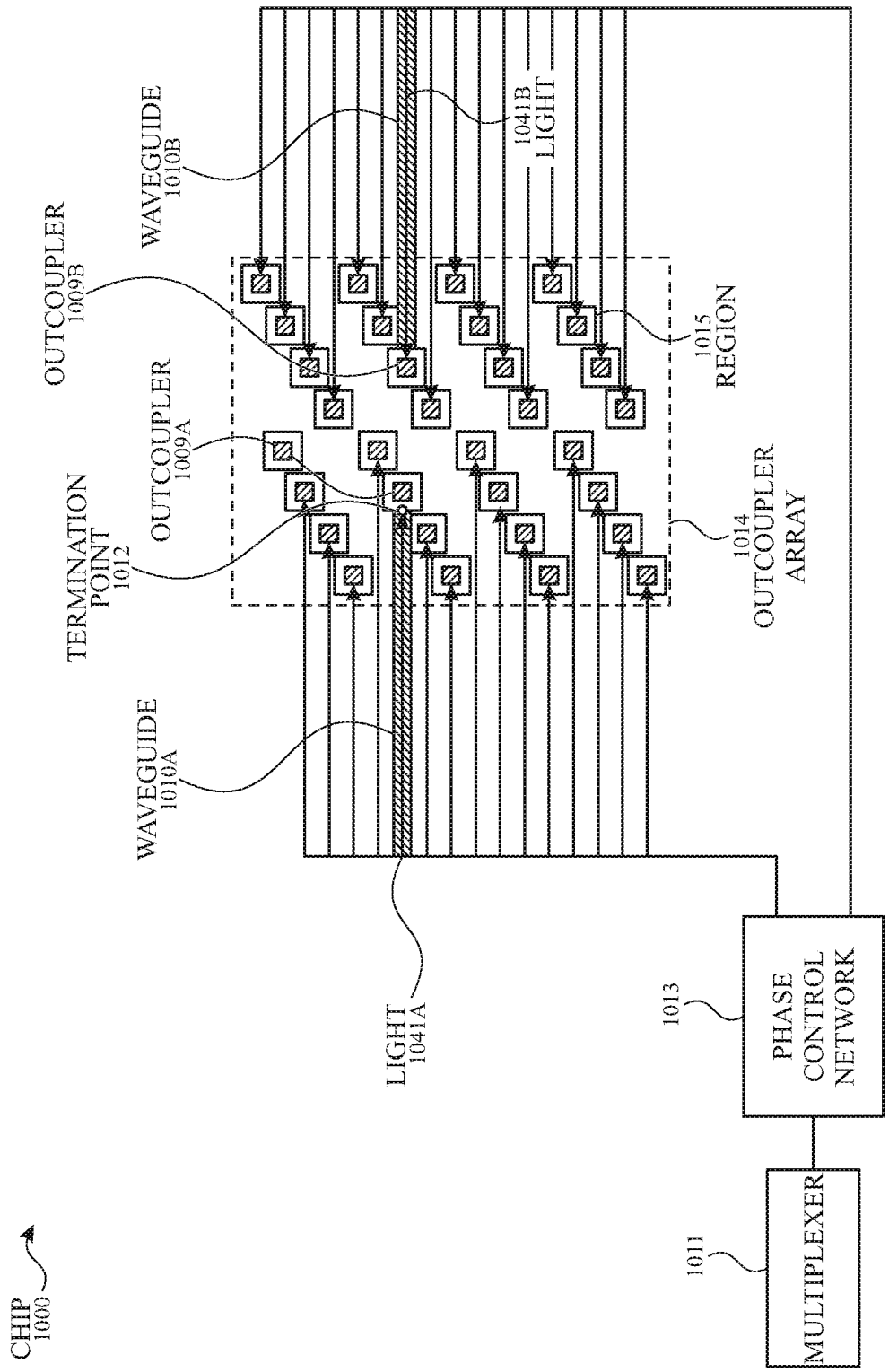
FIG. 10 illustrates a top view of an exemplary integrated photonics chip including a two-sided outcoupler array according to examples of the disclosure.

In some examples, the outcoupler array can be arranged as a two-sided array. FIG. 10 illustrates a top view of an exemplary integrated photonics chip including a two-sided outcoupler array according to examples of the disclosure. The chip 1000 can include multiple components such as a multiplexer 1011 and a phase control network 1013. The multiplexer 1011 and the phase control network 1013 can be similar in function and/or structure as the multiplexer 911 and the phase control network 913 described above with respect to FIG. 9A.

The chip 1000 can also include an outcoupler array 1014, which can include a plurality of outcouplers 1009, and one or more waveguides 1010. The one or more waveguides 1010 can include one or more termination points 1012. The plurality of outcouplers 1009A, associated waveguides 1010A, and associated light 1041A can be located on one side (e.g., the left side). The plurality of outcouplers 1009B, associated waveguides 1010B, and associated light 1041B can be located on another side (e.g., the right side). The outcouplers and waveguides of a given side can be oriented such that light from one side (e.g., light 1041A) propagates in a different (e.g., opposite) direction than light from another side (e.g., light 1041B). Corresponding components can be similarly situated. For example, the plurality of outcouplers 1009A can have one or more reflecting surfaces that face the left side, whereas the plurality of outcouplers 1009B can have one or more reflecting surfaces that face the right side.

Examples of the disclosure can further include arranging the outcouplers and waveguides in a staggered arrangement, having a certain spacing (e.g., based on minimum spacing between waveguides), and the like. In this manner, by arranging the outcoupler array in a two-sided geometry, the density of the outcouplers can be increased and/or the footprint size of the outcoupler array can be decreased. Although the figure illustrates two-sided geometry, examples of the disclosure can include any number of sides for an arrangement such as three-sided or four-sided. In some examples, the outcoupler may be capable of creating a high etendue launch beam while controlling the path length distribution.

Launch Regions

Another way to reduce incoherent noise can be to create light beams having multiple different in-plane launch angles. In some examples, the in-plane launch angles can be separated (i.e., have a non-zero difference) by angles greater than the correlation angle in the x-dimension. The outcoupler can also create light beams having multiple different out-of-plane launch angles, which may, e.g., be separated by angles greater than the correction angle in the y-dimension.

Figure 11:
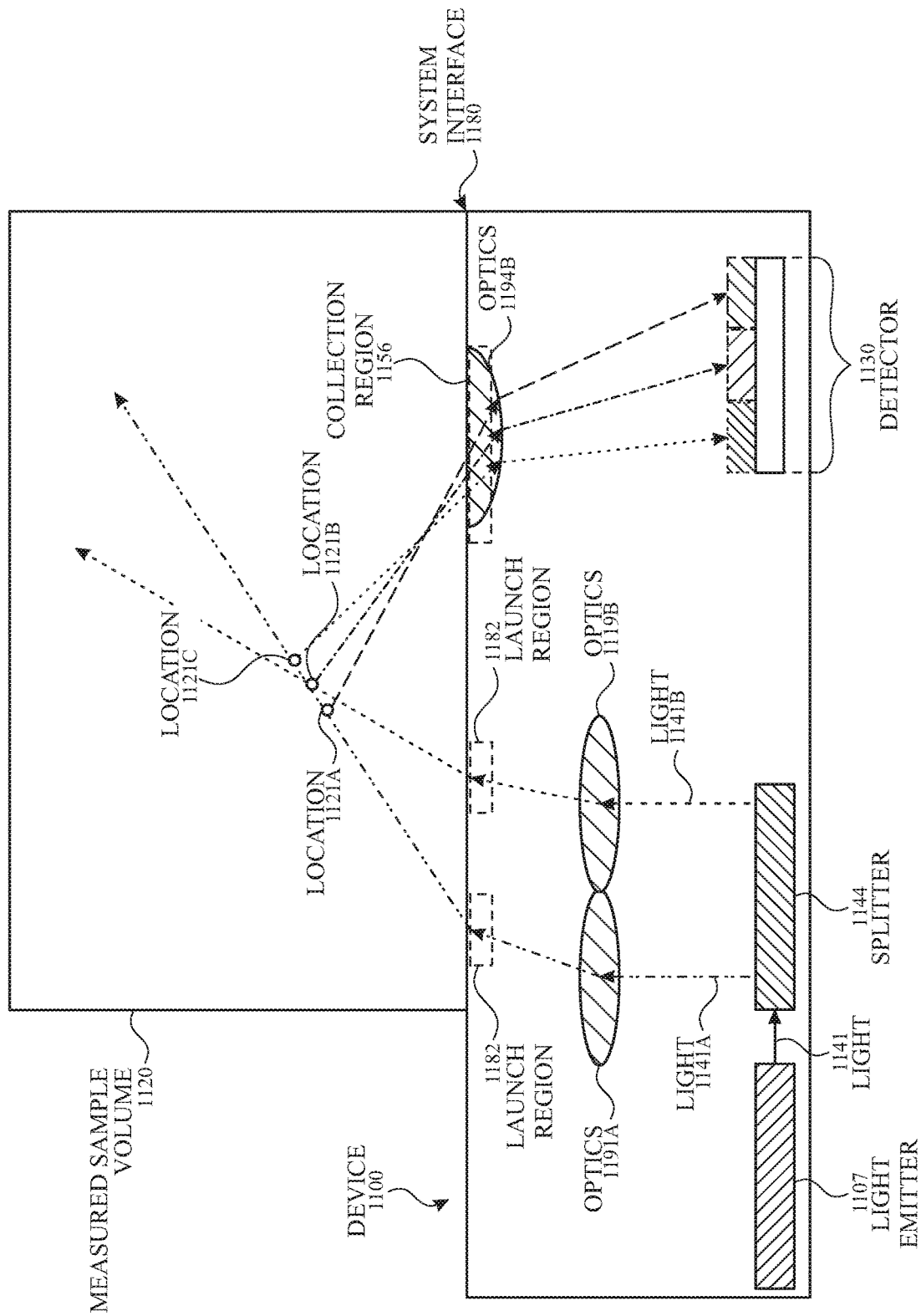
FIG. 11 illustrates a cross-sectional view of an exemplary integrated photonics chip including a plurality of emissions regions according to examples of the disclosure.

FIG. 11 illustrates a cross-sectional view of an exemplary integrated photonics chip including a plurality of emissions regions according to examples of the disclosure. The device 1100 can include a detection region 1156, optics 1194, optics 1191, a light emitter 1107, and a detector 1130 that can be similar to correspondingly labeled elements from the other figures. The device 1100 can further include multiple launch regions 1182. Although the figure illustrates two launch regions 1182 that are spatially separated, examples of the disclosure can include a single continuous launch region.

The light emitter(s) 1107 can emit light 1141. Light 1141 may be split into a plurality of light beams, such as light 1141A and light 1141B, by a splitter 1144. The splitter 1144 may be configured to split the light in any proportion, such as half of light 1141 to light 1141A and the other half to light 1141B; examples can include other proportions. In some examples, light 1141A and light 1141B may be incoherent.

The plurality of light beams 1141 may be incident on optics 1191. The optics 1191 can include multiple lenses or other types of optics. For example, light 1141A can be incident on optics 1191A, and light 1141B can be incident on optics 1191B. As shown in the figure, light 1141A may interrogate the same location of the measured sample volume 1120 as light 1141B, where the light beams may be uncorrelated. In some instances, light 1141A and light 1141B may intersect at a location 1121B. The location 1121A and the location 1121C can be scattering sites, in some examples. A portion of the light beam(s) may return to the system interface 1180. Light 1141A and light 1141B may also have other scattering sites where light (e.g., light 1141C, light 1141D, light 1141E) can return to the system interface 1180 to be measured by the detector 1130.

Detection Regions

Figure 12:
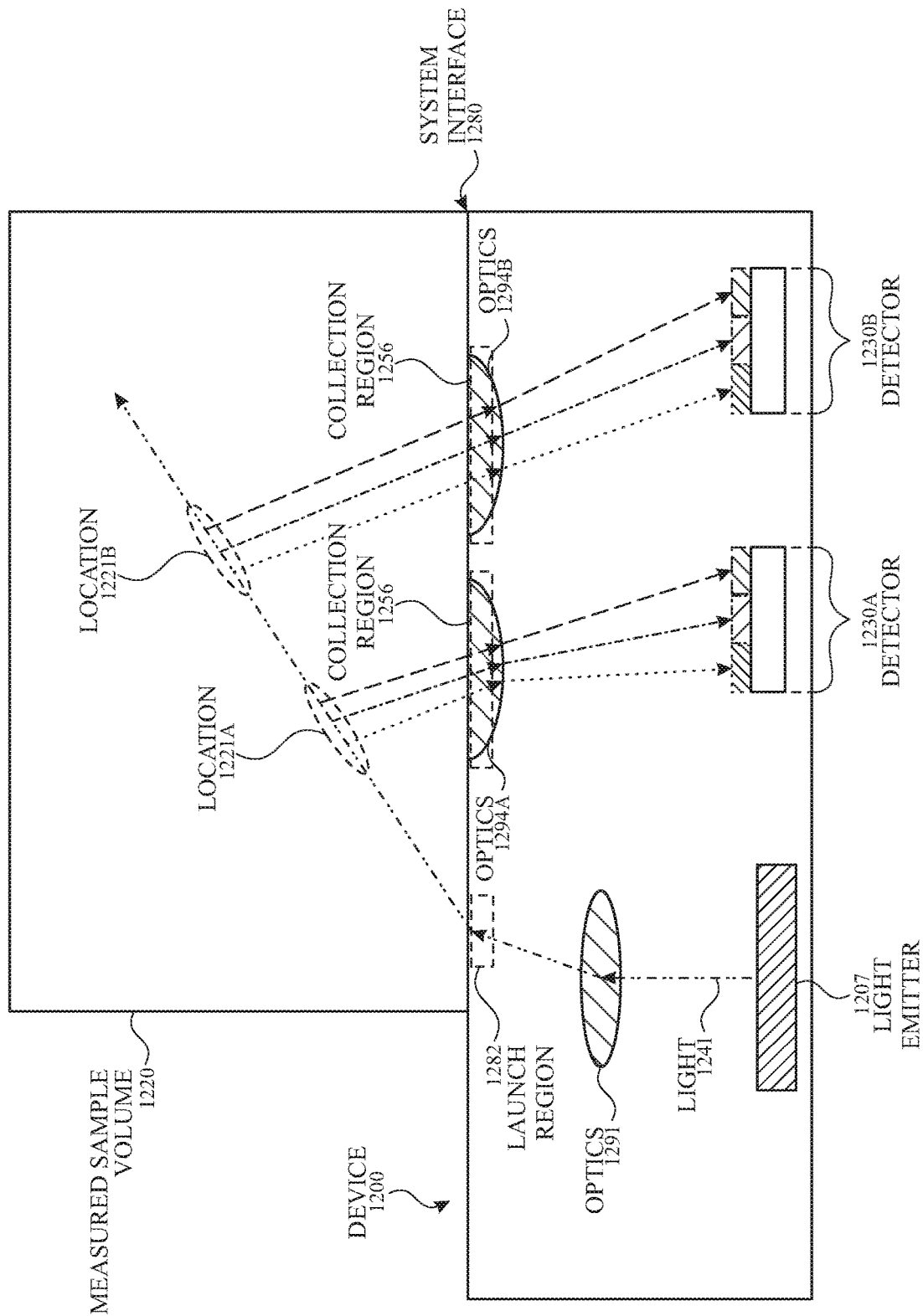
FIG. 12 illustrates a cross-sectional view of an exemplary integrated photonics chip including a plurality of detection regions according to examples of the disclosure.

The device can also include multiple detection regions. FIG. 12 illustrates a cross-sectional view of an exemplary integrated photonics chip including a plurality of detection regions according to examples of the disclosure. The device 1200 can include a launch region 1282, optics 1294, optics 1291, a light emitter 1207, and detectors 1230 that can be similar to correspondingly labeled elements from the other figures. The device 1200 can further include multiple detection regions 1256 and multiple optics 1294A and 1294B. Although the figure illustrates two detection regions 1282 that are spatially separated, examples of the disclosure can include a single continuous detection region.

The light emitter 1207 can emit light 1241 towards optics 1291. After optics 1291, light 1241 can exit the device 1200 at the launch region 1282. In some instances, light 1241 may interrogate a different location of the measured sample volume 1220. For example, light received by optics 1294A and detector 1230A can be return light from location 1221A, and light received by optics 1294B and detector 1230B can be return light from location 1221B. The detector 1230A and the detector 1230B can be spatially distinct, so the associated noise can be incoherent and uncorrelated.

Optics

Figure 13:
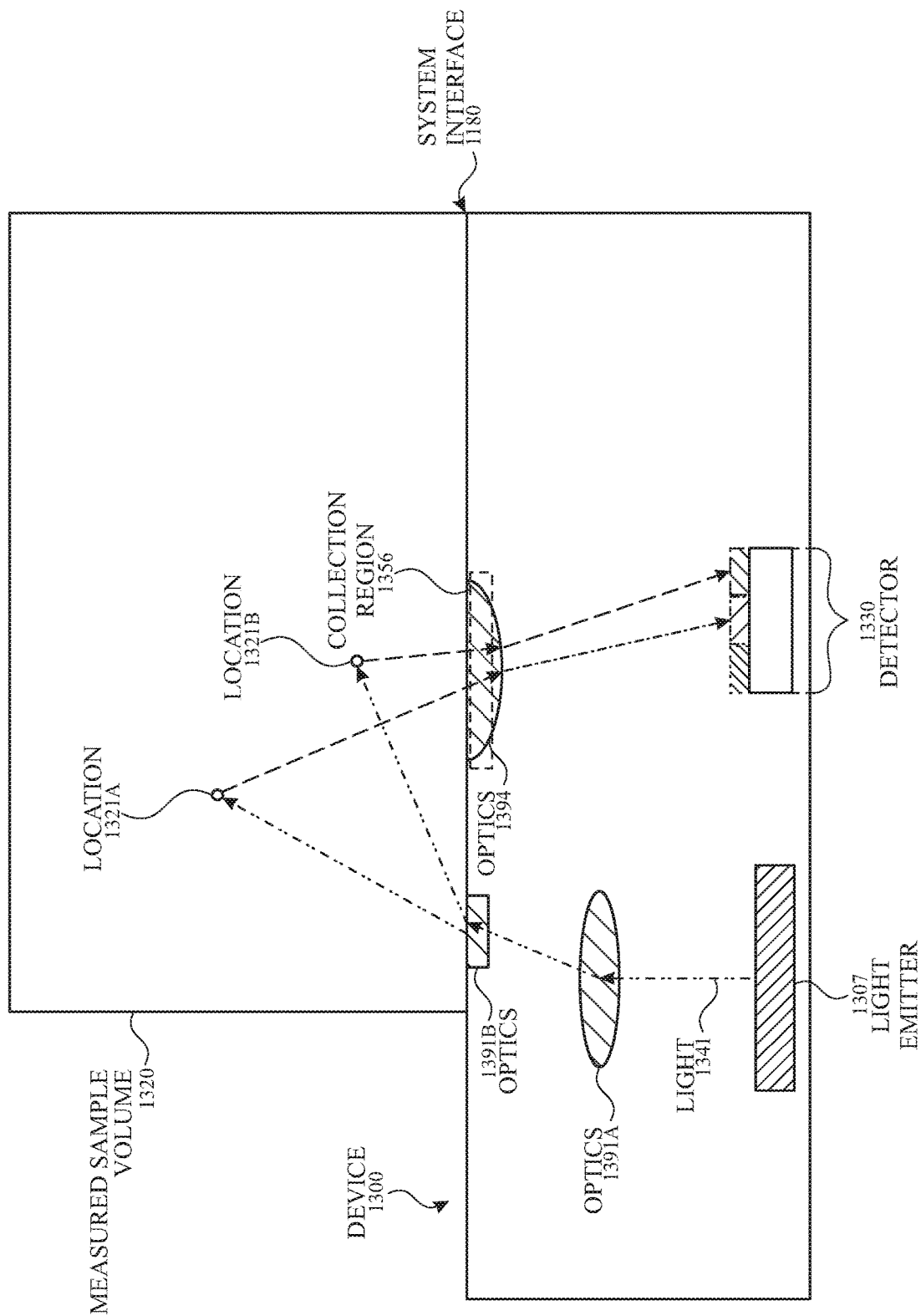
FIG. 13 illustrates a cross-sectional view of an exemplary integrated photonics device including one or more optics having properties for increasing entendue according to examples of the disclosure.

The properties of one or more optics can be configured such that they increase the etendue, as illustrated in the cross-sectional view of an exemplary integrated photonics device of FIG. 13. The device 1300 can include a detection region 1356, optics 1394, a light emitter 1307, and a detector 1330 that can be similar to correspondingly labeled elements from the other figures.

The device 1300 can also include the optics 1391A and optics 1391B. The optics 1391A can include one or more functions and/or characteristics similar to optics 191, optics 291, optics 591, and optics 691 discussed above. The optics 1391B (i.e., divergence optics) can be configured to change the angles of light 1341 to create divergence, thereby increasing the etendue. For example, the optics 1391B can include a diverging lens, a diffuser, etc. The change in angles can allow light 1341 to interrogate multiple locations, at location 1321A and location 1321B, of the measured sample volume 1320. The return light, from location 1321A and location 1321B, can travel through system interface 1380 and optics 1394 to detector 1330. In some examples, the device 1300 can be configured such that optics 1391B can expand the angles of light 1341 along the x-plane at the system interface 1380 and/or interface of the measured sample volume 1320. The device 1300 can also be configured such that the angles of light 1341 can be de-cohered along the y-plane before light 1341 reaches the system interface 1380.

Phase Control Network

A group delay network can be used to make multiple light emitters incoherent. Examples of the disclosure can include an interleaved group delay network and a direct phase control network, each discussed in more detail below. In some examples, the group delay network can be configured such that the frequency bandwidth can be inversely related to the length delay between outcouplers (e.g., outcouplers 909 illustrated in FIG. 9A).

Figure 14:
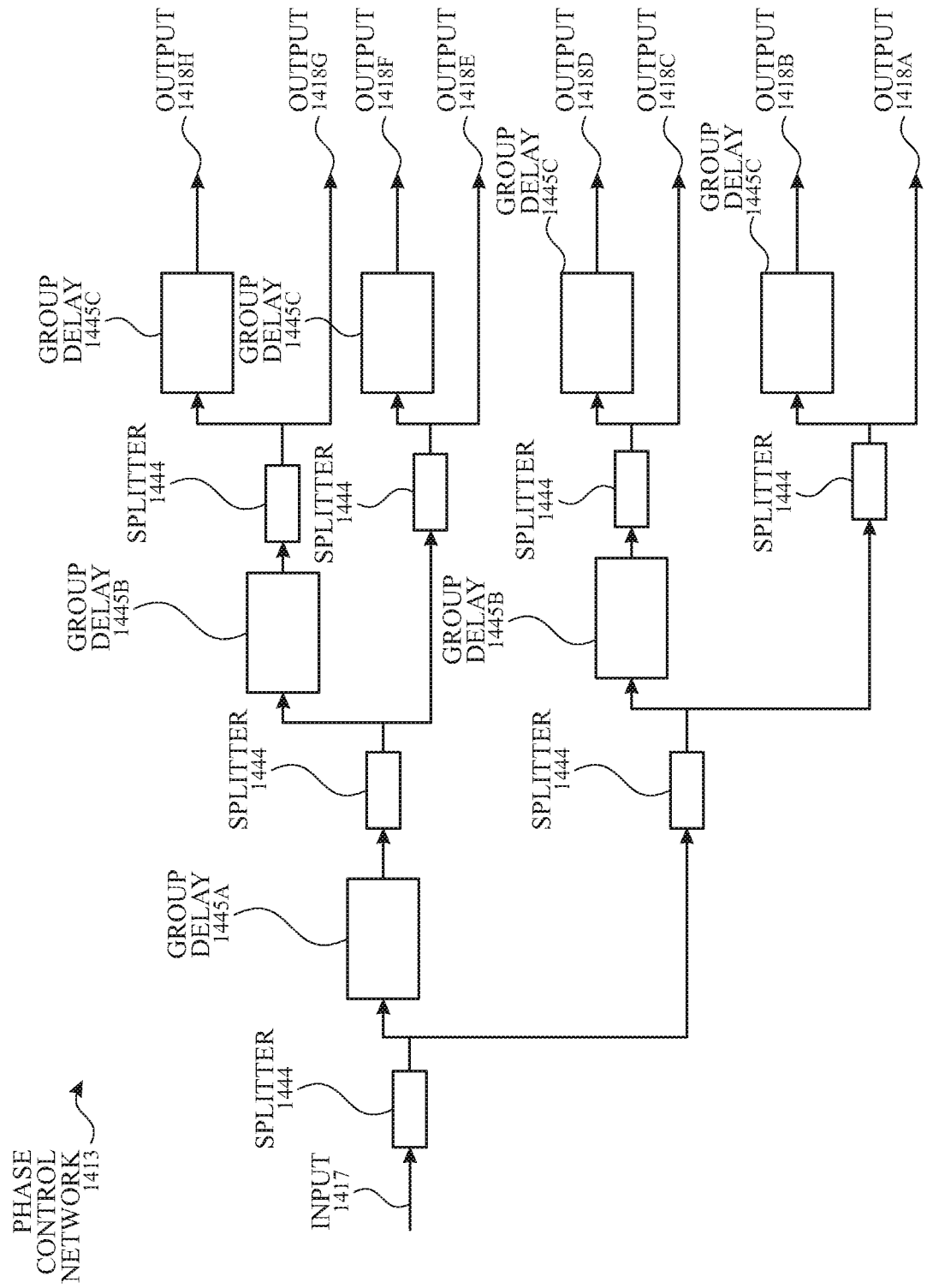
FIG. 14 illustrates a block diagram of an exemplary phase control network using an interleaved group delay according to examples of the disclosure.

FIG. 14 illustrates a block diagram of an exemplary phase control network using an interleaved group delay according to examples of the disclosure. Phase control network 1413 can include an input 1417, which can be an optical signal received from a multiplexer (e.g., multiplexer 911 illustrated in FIG. 9A, multiplexer 1011 illustrated in FIG. 10, etc.). The phase control network 1413 can include a plurality of splitters 1444 and a plurality of group delays, such as group delay 1445A, group delay 1445B, and group delay 1445C. The plurality of splitters 1444 can be interleaved with the plurality of group delays 1445. Although the figure illustrates a plurality of group delays, examples of the disclosure can include a phase control network including a plurality phase shifters.

The plurality of splitters 1444 can split the input into multiple (e.g., two) outputs. In some instances, the plurality of splitter 1444 can be optical splitters. At least two of the plurality of group delays 1445 can introduce different group delays. For example, the group delay 1445A can introduce a 4× group delay, the group delays 1445B can introduce a 2× group delay, and the group delays 1445C can introduce a 1× group delay. In this manner, the phase control network 1413 can receive a first number (e.g., one) of inputs and can create a second number (e.g., eight) of outputs from the inputs, where at least two of the outputs can have different group delays. As one example, as shown in the figure, the outputs 1418 can each have different delays. Output 1418A can have no change in delay, output 1418B can have 1× change in delay, output 1418C can have 2× change in delay, output 1418D can have 3× change in delay, output 1418E can have 4× change in delay, output 1418F can have 5× change in delay, output 1418G can have a 6× change in delay, and output 1418H can have a 7× change in delay. The plurality of outputs 1418 can be inputs to a plurality of waveguides (e.g., waveguides 910 illustrated in FIG. 9A). The plurality of outcouplers (e.g., outcouplers 909 illustrated in FIG. 9A) of the outcoupler array can then receive light having different group delays that originated from the same light emitter.

Figure 15:
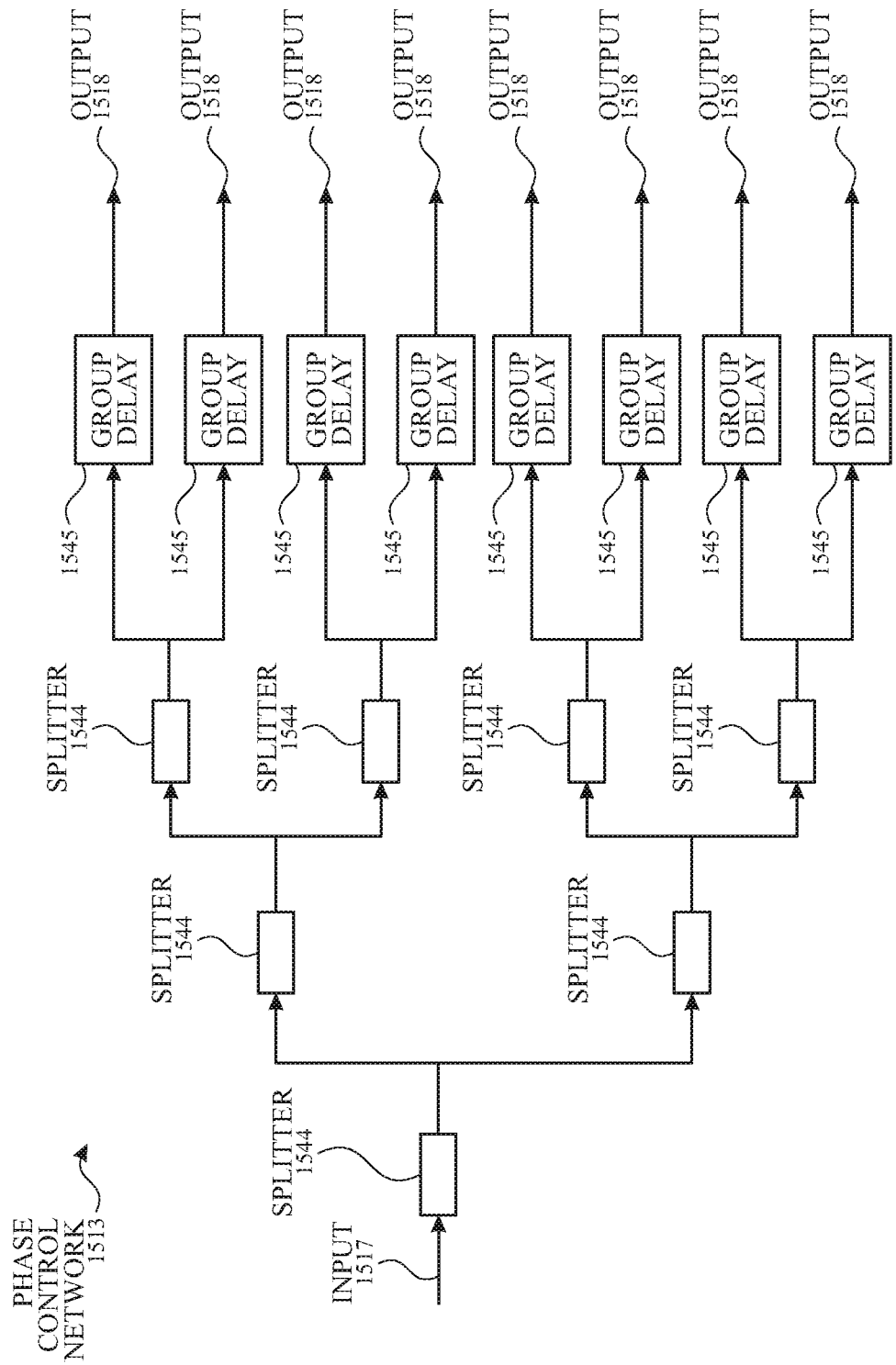
FIG. 15 illustrates a block diagram of an exemplary direct phase control network according to examples of the disclosure.

FIG. 15 illustrates a block diagram of an exemplary direct phase control network according to examples of the disclosure. Phase control network 1513 can include an input 1517, which can be an optical signal received from a multiplexer (e.g., multiplexer 911 illustrated in FIG. 9A, multiplexer 1011 illustrated in FIG. 10, etc.). The optical signals input to the multiplexer can be output from one or more tunable light sources. The phase control network 1513 can include a plurality of splitters 1544 and a plurality of group delays 1545.

The plurality of splitters 1544 can split an input into multiple (e.g., two) outputs. At least one (e.g., each) of the plurality of group delays 1545 can have a one-to-one correspondence with an output 1518. In some examples, at least two (e.g., each) of the plurality of group delays 1545 can introduce different group delays. As one example, each of the plurality of group delays 1545 can introduce a different group delay than another group delay 1545 within the same set of outputs 1518. In this manner, the plurality of outcouplers (e.g., outcouplers 909 illustrated in FIG. 9A) of the outcoupler array can then receive light having different group delays that originated from the same light emitter.

Examples of the disclosure can include have multiple sets of outputs, where at least two sets can be coupled to different phase control networks. Examples of the disclosure can also include one output that does not have a phase shifter located at the output of the splitter.

Alternatively, in some examples, the phase control network can be configured with an active phase shifter coupled to each output 1518.

Combined Outcoupler Array and Phase Control Network

Figure 16:
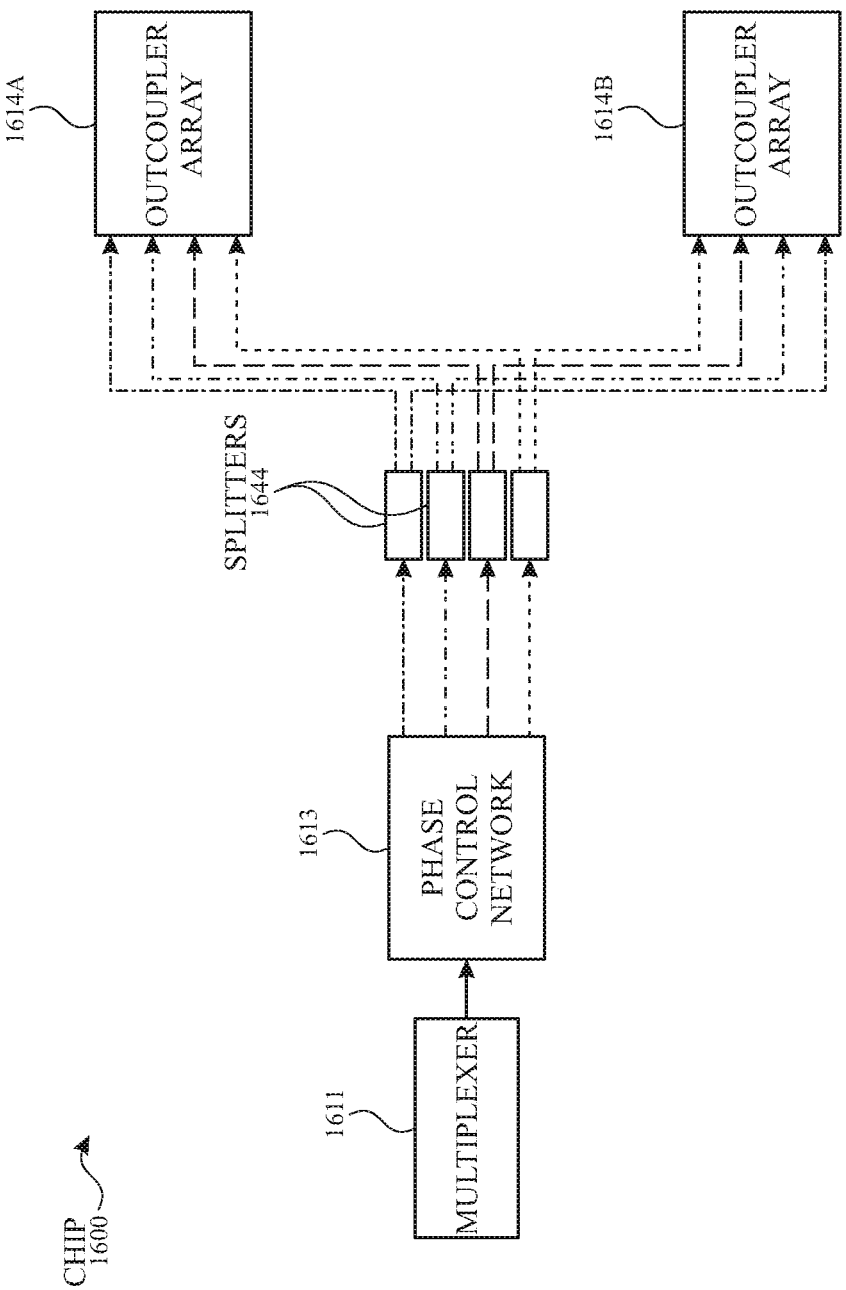
FIG. 16 illustrates an exemplary integrated photonics chip including outputs from a phase control network used for multiple outcoupler arrays according to examples of the disclosure.

Examples of the disclosure can include using the phase control network for multiple outcoupler arrays. FIG. 16 illustrates an exemplary integrated photonics chip including outputs from a phase control network used for multiple outcoupler arrays according to examples of the disclosure. The chip 1600 can include a multiplexer 1611, a phase control network 1613, and a plurality of outcoupler arrays 1614 that can be similar to correspondingly labeled elements from the other figures.

The outcoupler array 1614A can be associated with different locations of the measured sample volume (e.g., measured sample volume 820 illustrated in FIG. 8) and detector (e.g., detector 830 illustrated in FIG. 8) than the outcoupler array 1614B. As a result, the signals from the different outcoupler arrays can be incoherent and uncorrelated. In some examples, since the signals are incoherent and uncorrelated, the same phase control network 1613 can be used for multiple (e.g., both) outcoupler arrays. The chip 1600 can include a plurality of splitters 1644 to allow sharing of the outputs from the same phase control network 1613.

Figure 17:
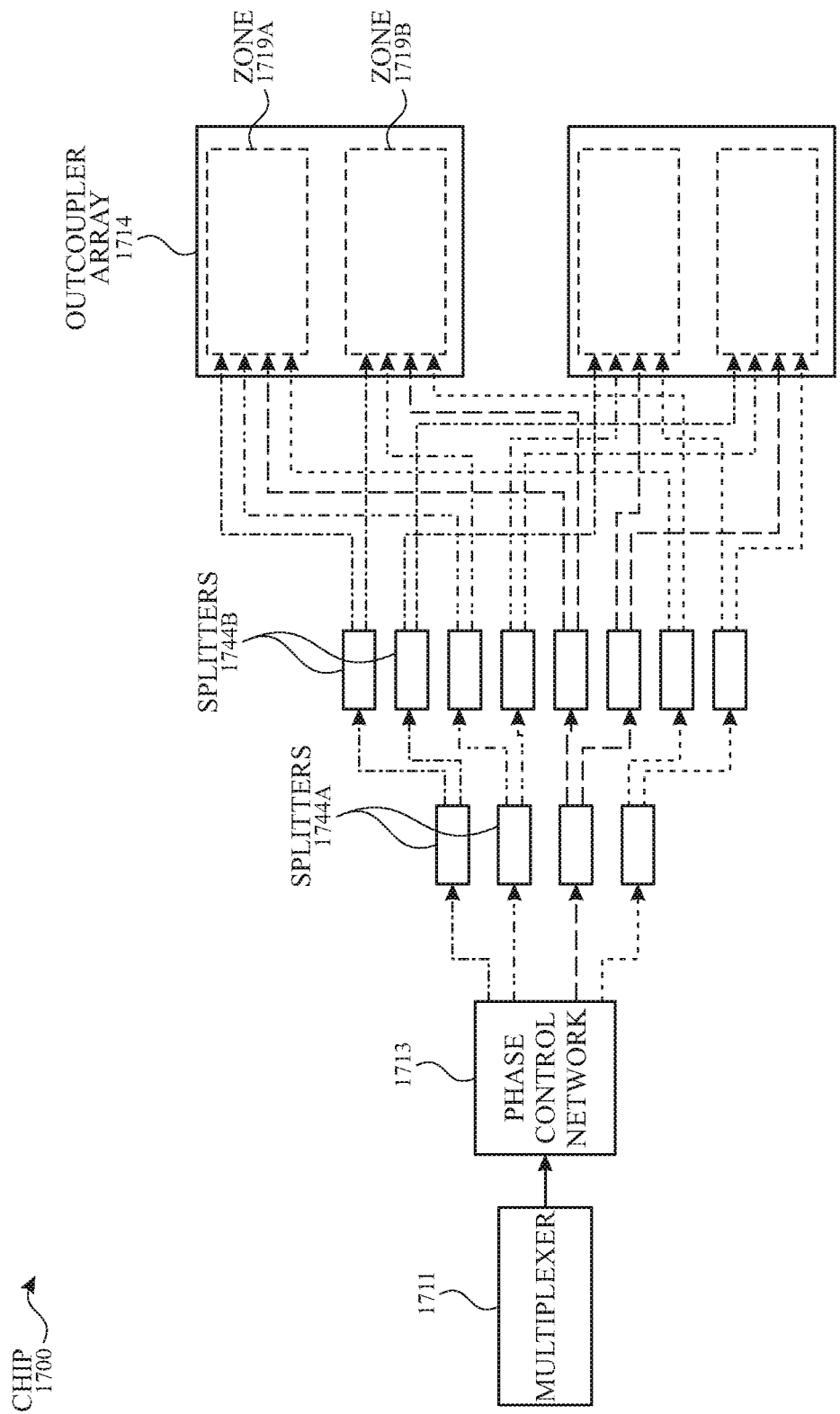
FIG. 17 illustrates an exemplary integrated photonics chip including outputs from a phase control network used for outcoupler arrays including multiple zones according to examples of the disclosure.

In some instances, an outcoupler array can include multiple zones, such as when the device is configured to have a launch sheet light beam with a larger amount of elongation in the y-dimension. Light from the multiple zones can be spatially aggregated to create the launch sheet light beam. FIG. 17 illustrates an exemplary integrated photonics chip including outputs from a phase control network used for outcoupler arrays including multiple zones according to examples of the disclosure. The chip 1700 can include a multiplexer 1711, a phase control network 1713, and a plurality of splitters 1744 that can be similar to correspondingly labeled elements from the other figures.

A plurality of splitters 1744B can split the same outputs from the phase control network 1713 to different zones of the same outcoupler array 1714. At least one of the outcoupler arrays 1714 can be include multiple zones. For example, outcoupler array 1714 can include zone 1719A and zone 1719B. The zone 1719A can be associated with a first location of the measured sample volume, such as the location associated with light 1141A and optics 1191A of FIG. 11. The zone 1719B can be associated with a second location of the measured sample volume, such as the location associated with light 1141B and optics 1191B of FIG. 11. That is, the same outcoupler array can be used to send light having different properties (e.g., launch angle).

In some instances, the different zones associated with a given outcoupler array can be associated with different regions (e.g., pixels) of a detector. The signals received by the different regions of the detector can be incoherent and uncorrelated. Examples of the disclosure can further include using one or more additional group delays (not shown) to change the group delay within a zone. The additional group delay can be used to reduce coherent noise.

In some examples, the zones can be optimized with a certain size. The size may be related to a point spread function of the system. The point spread function may represent the properties (e.g., size and shape) of the light beam caused by diffraction, where the properties may be determined based on the scattering properties within the sample.

Operation of the Integrated Photonics Device

Figure 18:
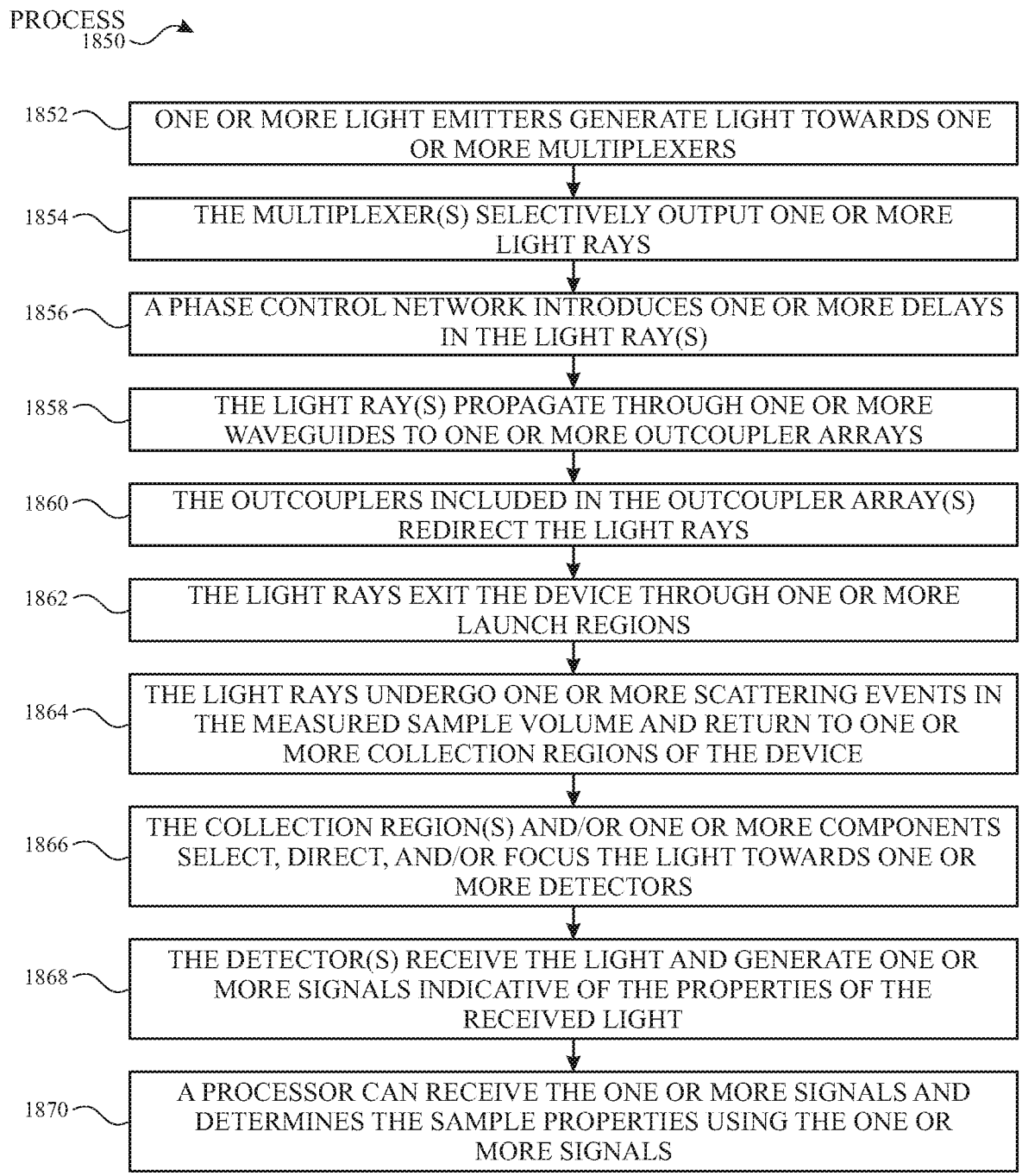
FIG. 18 illustrates an exemplary process flow for measuring sample properties using an integrated photonics device having an optical sampling architecture according to examples of the disclosure.

The operation of the integrated photonics device will be described. FIG. 18 illustrates an exemplary process flow for measuring sample properties using an integrated photonics device having an optical sampling architecture according to examples of the disclosure. One or more light emitters (e.g., light emitter 807 illustrated in FIG. 8) can generate light towards one or more multiplexers (step 1852 of process 1850). One or more multiplexers (e.g., multiplexer 911 illustrated in FIG. 9A) can receive light from one or more light emitters and can selectively output one or more light rays to a phase control network (e.g., phase control network 913 illustrated in FIG. 9A) (step 1854 of process 1850).

The phase control network can introduce one or more delays in the light ray(s) (e.g., light 941 illustrated in FIGS. 9B-9C) (step 1856 of process 1850). In some examples, the delays can include fixed group delays where the light emitter(s) is a tunable light source. In other examples, the light emitter(s) may emit light of a fixed wavelength, and the phase can be actively controlled via, e.g., sequencing through multiple phase states of the outputs of the phase control network.

The light rays can propagate through one or more waveguides (e.g., waveguides 910 illustrated in FIG. 9A) to one or more outcoupler arrays (e.g., outcoupler array 914 illustrated in FIG. 9A) (step 1858 of process 1850). In some examples, one or more splitters (e.g., splitters 1644 illustrated in FIG. 16) can split and/or direct the light rays to different outcoupler arrays and/or zones (e.g., zone 1719A illustrated in FIG. 17) within the same outcoupler array. The outcouplers included in the outcoupler array(s) can redirect the light (step 1860 of process 1850).

The light rays can exit the device through one or more launch regions (e.g., launch region 882 illustrated in FIG. 8) (step 1862 of process 1850). The light rays can undergo one or more scattering events in the measured sample volume and can return to one or more detection regions (e.g., detection region 856 illustrated in FIG. 8) of the device (step 1864 of process 1850). The detection region and/or one or more components can select, direct, and/or focus the light towards one or more detectors (step 1866 of process 1850). The detector(s) can receive the light and generate one or more signals indicative of the properties of the received light (step 1868 of process 1850). A processor can receive the signal(s) and determine the sample properties using the signal(s) (step 1870 of process 1850).

One or more of the functions described above can be performed, for example, by firmware stored in memory and executed by a processor or controller. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

A system is disclosed. The system can comprise: at least one light emitter that emits light; a system interface including: a launch region from which the light emitted by the at least one light emitter is capable of exiting the system, wherein the launch region includes a first dimension and a second dimension, the second dimension of the launch region is elongated relative to the first dimension of the launch region, wherein the launch region is configured to form, from the light emitted by the at least one light emitter, a first light beam having a second dimension that is elongated relative to a first dimension of the first light beam as the first light beam exits the system, and a detection region through which light is capable of entering the system, wherein the detection region includes a first dimension and a second dimension, the second dimension of the detection region elongated relative to the first dimension of the detection region, wherein the second dimension of the launch region is elongated along a same direction that the second dimension of the detection region is elongated, and wherein the detection region is configured to form, from the light entering the system, a second light beam within the system, the second light beam having a second dimension that is elongated relative to a first dimension of the second light beam; a detector that detects at least a portion of the second light beam and generates one or more signals indicative of the portion of the second light beam; and logic that determines one or more sample properties from the one or more signals. Additionally or alternatively, in some examples, a size and a shape of the launch region is same as a size and a shape of the detection region. Additionally or alternatively, in some examples, the second dimension of the detection region is longer than the second dimension of the launch region. Additionally or alternatively, in some examples, the system further comprises: optics selectively allowing the portion of the second light beam to pass through to the detector, wherein the portion of the second light beam meets a change in angle criteria. Additionally or alternatively, in some examples, the change in angle criteria includes a threshold range of angles based on a targeted optical path length. Additionally or alternatively, in some examples, the detection region forms the second light beam by selectively allowing light, from the light entering the system, that meets a change in angle criteria. Additionally or alternatively, in some examples, the at least one light emitter includes one or more outcouplers and a reflector, the one or more outcouplers located a first separation distance from the reflector, wherein the one or more outcouplers are located a second separation distance from the launch region, wherein the detector is located a third separation distance from the detection region, and wherein a total of a targeted optical path length, the first separation distance, the second separation distance, and the third separation distance are equal to a focal length of the reflector. Additionally or alternatively, in some examples, the system further comprises: a multiplexer that: receives the light emitted by the at least one light emitter, forms, from the light emitted by the at least one light emitter, a third light beam, and outputs the third light beam; a phase control network that: receives the third light beam, and controls a phase of at least a portion of the third light beam; and an outcoupler array including a plurality of outcouplers, the outcoupler array redirecting the third light beam to the launch region. Additionally or alternatively, in some examples, the third light beam has one or more of: different in-plane launch angles and in-plane launch locations.

A light emitter is disclosed. The light emitter can comprise: one or more light sources that emit light along a first plane; one or more waveguides that output the light emitted by the one or more light sources; and one or more outcouplers that direct the light, output by the one or more waveguides, to a second plane, wherein the light directed by the one or more outcouplers is a first light beam having different properties relative to the light output by the one or more waveguides, the properties including in-plane launch angles, in-plane launch locations, or both; wherein the first light beam has a second dimension that is elongated relative to a first dimension of the first light beam. Additionally or alternatively, in some examples, the light emitter further comprises: one or more reflectors receiving the light emitted by the one or more light sources and directing the light emitted by the one or more light sources along the first plane to the one or more outcouplers, wherein the one or more reflectors include a first location and a second location, wherein the one or more outcouplers include a first location and a second location; wherein a first portion of the light emitted by the one or more light sources is incident at the first location of the reflector and the first location of the one or more outcouplers, and wherein a second portion of the light emitted by the one or more light sources is incident at the second location of the reflector and the second location of the one or more outcouplers. Additionally or alternatively, in some examples, the one or more waveguides include: a first waveguide that outputs the first portion of the light emitted by the one or more light sources, and a second waveguide that outputs the second portion of the light emitted by the one or more light sources, wherein the first location of the one or more outcouplers and the second location of the one or more outcouplers are different. Additionally or alternatively, in some examples, the one or more waveguides include: a first waveguide that outputs the first portion of the light emitted by the one or more light sources, and a second waveguide that outputs the second portion of the light emitted by the one or more light sources, wherein the first location of the one or more outcouplers and the second location of the one or more outcouplers are the same, and the first portion of the light emitted by the one or more light sources and the second portion of the light emitted by the one or more light sources have different angles. Additionally or alternatively, in some examples, a separation distance between at least one of the one or more waveguides and at least one of the one or more reflectors is equal to a focal length of the at least one of the one or more reflectors. Additionally or alternatively, in some examples, the one or more waveguides include: a splitter that receives and splits the light outputted by the one or more waveguides into a plurality of light rays; a plurality of optical attenuators that: receive the plurality of light rays, and block or allow at least some of the plurality of light rays. Additionally or alternatively, in some examples, the one or more waveguides include at least two waveguides located such that facets of the at least two waveguides have different angles with respect to the one or more outcouplers. Additionally or alternatively, in some examples, the one or more waveguides include a first plurality of waveguides and a second plurality of waveguides, wherein the first plurality of waveguides are located such that facets of the first plurality of waveguides have an angle with respect to the one or more outcouplers different than facets of the second plurality of waveguides.

A method for using a system is disclosed. The method can comprise: emitting light using at least one light emitter; forming a first light beam from the light emitted by the at least one light emitter using a launch region, wherein the launch region includes a first dimension and a second dimension, the second dimension of the launch region is elongated relative to the first dimension of the launch region; allowing the first light beam to exit the system through the launch region, wherein the first light beam has a second dimension that is elongated relative to a first dimension of the first light beam as the first light beam exits the system; allowing light to enter through the system through a detection region, wherein the detection region includes a first dimension and a second dimension, the second dimension of the detection region elongated relative to the first dimension of the detection region, wherein the second dimension of the launch region is elongated along a same direction that the second dimension of the detection region is elongated; forming a second light beam from the light entering the system using the detection region, wherein the second light beam has a second dimension that is elongated relative to a first dimension of the second light beam; detecting at least a portion of the second light beam by a detector; generating one or more signals indicative of the portion of the second light beam detected by the detector; and determining one or more sample properties from the one or more signals. Additionally or alternatively, in some examples, forming the first light beam includes selectively controlling one or more parameters of the light emitted by the at least one light emitter. Additionally or alternatively, in some examples, forming the second light beam includes selectively controlling one or more parameters of the light that has entered through the system using optics.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A system comprising:
  at least one light emitter that emits light;
  a system interface including:
    a launch region from which the light emitted by the at least one light emitter is capable of exiting the system, wherein the launch region includes a first dimension and a second dimension, the second dimension of the launch region is elongated relative to the first dimension of the launch region, wherein the launch region is configured to form, from the light emitted by the at least one light emitter, a first launch sheet light beam having a cross-section with a second dimension that is elongated relative to a first dimension of a cross-section of the first launch sheet light beam as the first light beam exits the system, and
    a detection region through which light is capable of entering the system, wherein the detection region includes a first dimension and a second dimension, the second dimension of the detection region elongated relative to the first dimension of the detection region, wherein the second dimension of the launch region is elongated along a same direction that the second dimension of the detection region is elongated, and wherein the detection region is configured to form, from the light entering the system, a second detection sheet light beam within the system, a cross-section of the second light beam having a second dimension that is elongated relative to a first dimension of a cross-section of the second detection sheet light beam;
  a detector that detects at least a portion of the second detection sheet light beam and generates one or more signals indicative of the portion of the second detection sheet light beam; and
  logic that determines one or more sample properties from the one or more signals.

2. The system of claim 1, wherein a size and a shape of the launch region is same as a size and a shape of the detection region.

3. The system of claim 1, wherein the second dimension of the detection region is longer than the second dimension of the launch region.

4. The system of claim 1, further comprising:
  optics selectively allowing the portion of the second detection sheet light beam to pass through to the detector, wherein the portion of the second light beam meets a change in angle criteria.

5. The system of claim 4, wherein the change in angle criteria includes a threshold range of angles based on a targeted optical path length.

6. The system of claim 1, wherein the detection region forms the second detection sheet light beam by selectively allowing light, from the light entering the system, that meets a change in angle criteria.

7. The system of claim 1, wherein the at least one light emitter includes one or more outcouplers and a reflector, the one or more outcouplers located a first separation distance from the reflector,
  wherein the one or more outcouplers are located a second separation distance from the launch region,
  wherein the detector is located a third separation distance from the detection region, and
  wherein a total of a targeted optical path length, the first separation distance, the second separation distance, and the third separation distance are equal to a focal length of the reflector.

8. The system of claim 1, further comprising:
  a multiplexer that:
  receives the light emitted by the at least one light emitter,
  forms, from the light emitted by the at least one light emitter, a third launch sheet light beam, and
  outputs the third launch sheet light beam;
  a phase control network that:
  receives the third launch sheet light beam, and
  controls a phase of at least a portion of the third launch sheet light beam; and
  an outcoupler array including a plurality of outcouplers, the outcoupler array redirecting the third launch sheet light beam to the launch region.

9. The system of claim 8, wherein the third launch sheet light beam has one or more of: different in-plane launch angles and in-plane launch locations.

10. A method for using a system, the method comprising:
  emitting light using at least one light emitter;
  forming a first launch sheet light beam from the light emitted by the at least one light emitter using a launch region, wherein the launch region includes a first dimension and a second dimension, the second dimension of the launch region is elongated relative to the first dimension of the launch region;

allowing the first launch sheet light beam to exit the system through the launch region, wherein a cross-section of the first launch sheet light beam has a second dimension that is elongated relative to a cross-section of a first dimension of the first launch sheet light beam as the first launch sheet light beam exits the system;

allowing light to enter through the system through a detection region, wherein the detection region includes a first dimension and a second dimension, the second dimension of the detection region elongated relative to the first dimension of the detection region, wherein the second dimension of the launch region is elongated along a same direction that the second dimension of the detection region is elongated;

forming a second detection sheet light beam from the light entering the system using the detection region, wherein a cross-section of the second detection sheet light beam has a second dimension that is elongated relative to a cross-section of a first dimension of the second detection sheet light beam;

detecting at least a portion of the second detection sheet light beam by a detector;

generating one or more signals indicative of the portion of the second detection sheet light beam detected by the detector; and determining one or more sample properties from the one or more signals.

11. The method of claim 10, wherein forming the first launch sheet light beam includes selectively controlling one or more parameters of the light emitted by the at least one light emitter.

12. The method of claim 10, wherein forming the second detection sheet light beam includes selectively controlling one or more parameters of the light that has entered through the system using optics.

* * * * *